(12) United States Patent
Addepalli et al.

(10) Patent No.: US 9,277,370 B2
(45) Date of Patent: Mar. 1, 2016

(54) SYSTEM AND METHOD FOR INTERNAL NETWORKING, DATA OPTIMIZATION AND DYNAMIC FREQUENCY SELECTION IN A VEHICULAR ENVIRONMENT

(71) Applicant: CISCO TECHNOLOGY, INC., San Jose, CA (US)

(72) Inventors: Sateesh K. Addepalli, San Jose, CA (US); Ashok K. Moghe, Pleasanton, CA (US); Flavio Bonomi, Palo Alto, CA (US); Marc Jean-Philippe Girardot, Issy-les-Moulineaux (FR); Vijaynarayanan Subramanian, Sunnyvale, CA (US); Lillian Lei Dai, Rockville, MD (US); Rong Pan, Sunnyvale, CA (US); Preethi Natarajan, Los Gatos, CA (US); Xiaoqing Zhu, Mountain View, CA (US); Pascal Thubert, La Colle sur Loup (FR); Chiu Ngok Eric Wong, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/242,122

(22) Filed: Apr. 1, 2014

(65) Prior Publication Data

US 2014/0215491 A1 Jul. 31, 2014

Related U.S. Application Data

(62) Division of application No. 13/104,737, filed on May 10, 2011, now Pat. No. 8,705,527.

(60) Provisional application No. 61/433,138, filed on Jan. 14, 2011.

(51) Int. Cl.
| | |
|---|---|
| *H04J 3/18* | (2006.01) |
| *H04W 4/04* | (2009.01) |
| *H04W 72/04* | (2009.01) |
| *H04W 52/12* | (2009.01) |
| *G06F 9/54* | (2006.01) |
| *H04W 48/06* | (2009.01) |
| *H04W 48/18* | (2009.01) |
| *B60W 50/10* | (2012.01) |
| *G06F 3/01* | (2006.01) |
| *G06F 3/16* | (2006.01) |
| *H04L 12/26* | (2006.01) |
| *H04L 29/06* | (2006.01) |
| *H04W 12/08* | (2009.01) |
| *G06F 21/45* | (2013.01) |
| *H04W 12/06* | (2009.01) |
| *H04W 28/02* | (2009.01) |
| *H04W 40/20* | (2009.01) |
| *H04W 48/02* | (2009.01) |
| *H04L 29/08* | (2006.01) |
| *B60R 16/023* | (2006.01) |
| *H04L 12/721* | (2013.01) |
| *H04L 29/12* | (2006.01) |
| *H04W 8/06* | (2009.01) |
| *H04W 8/08* | (2009.01) |
| *H04W 8/26* | (2009.01) |
| *H04W 40/02* | (2009.01) |
| *H04W 28/06* | (2009.01) |
| *H04W 84/00* | (2009.01) |
| *H04W 36/08* | (2009.01) |
| *H04W 52/14* | (2009.01) |
| *H04W 52/22* | (2009.01) |
| *H04W 52/24* | (2009.01) |
| *H04W 52/34* | (2009.01) |
| *H04W 84/12* | (2009.01) |
| *H04W 92/18* | (2009.01) |

(52) U.S. Cl.
CPC ............. *H04W 4/046* (2013.01); *B60R 16/023* (2013.01); *B60W 50/10* (2013.01); *G06F 3/017* (2013.01); *G06F 3/167* (2013.01); *G06F 9/542* (2013.01); *G06F 21/45* (2013.01); *H04L 12/266* (2013.01); *H04L 29/06578* (2013.01); *H04L 43/0811* (2013.01); *H04L 43/0876* (2013.01); *H04L 45/12* (2013.01); *H04L*

61/2592 (2013.01); *H04L 63/08* (2013.01); *H04L 63/107* (2013.01); *H04L 67/12* (2013.01); *H04L 67/32* (2013.01); *H04W 8/06* (2013.01); *H04W 8/08* (2013.01); *H04W 8/26* (2013.01); *H04W 12/06* (2013.01); *H04W 12/08* (2013.01); *H04W 28/0215* (2013.01); *H04W 40/02* (2013.01); *H04W 40/20* (2013.01); *H04W 48/02* (2013.01); *H04W 48/06* (2013.01); *H04W 48/18* (2013.01); *H04W 52/12* (2013.01); *H04W 72/0406* (2013.01); *H04W 72/0493* (2013.01); *H04W 28/06* (2013.01); *H04W 36/08* (2013.01); *H04W 52/143* (2013.01); *H04W 52/225* (2013.01); *H04W 52/241* (2013.01); *H04W 52/346* (2013.01); *H04W 72/042* (2013.01); *H04W 84/005* (2013.01); *H04W 84/12* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 5,428,666 A | 6/1995 | Fyfe et al. | |
| 5,604,787 A | 2/1997 | Kotzin et al. | |
| 5,737,215 A | 4/1998 | Schricker et al. | |
| 5,763,862 A | 6/1998 | Jachimowicz et al. | |
| 5,933,773 A | 8/1999 | Barvesten | |
| 5,987,325 A | 11/1999 | Tayloe | |
| 6,002,929 A | 12/1999 | Bishop et al. | |
| 6,078,652 A | 6/2000 | Barak | |
| 6,169,387 B1 | 1/2001 | Kaib | |
| 6,175,789 B1 | 1/2001 | Beckert et al. | |
| 6,285,869 B1 | 9/2001 | Shannon et al. | |
| 6,320,351 B1 | 11/2001 | Ng et al. | |
| 6,427,072 B1 | 7/2002 | Reichelt | |
| 6,427,073 B1 | 7/2002 | Kortesalmi et al. | |
| 6,484,082 B1 | 11/2002 | Millsap et al. | |
| 6,490,679 B1 | 12/2002 | Tumblin et al. | |
| 6,516,357 B1 | 2/2003 | Hamann et al. | |
| 6,526,272 B1 | 2/2003 | Bansal et al. | |
| 6,574,734 B1 | 6/2003 | Colson et al. | |
| 6,587,127 B1 | 7/2003 | Leeke et al. | |
| 6,604,140 B1 | 8/2003 | Beck et al. | |
| 6,643,504 B1 | 11/2003 | Chow et al. | |
| 6,668,179 B2 | 12/2003 | Jiang | |
| 6,714,799 B1 | 3/2004 | Park et al. | |
| 6,721,580 B1 | 4/2004 | Moon | |
| 6,735,506 B2 | 5/2004 | Breed et al. | |
| 6,757,262 B1 | 6/2004 | Weisshaar et al. | |
| 6,823,244 B2 | 11/2004 | Breed | |
| 6,868,282 B2 | 3/2005 | Carlsson | |
| 6,914,517 B2 | 7/2005 | Kinsella | |
| 6,925,425 B2 | 8/2005 | Remboski et al. | |
| 6,928,299 B1 | 8/2005 | Rinne et al. | |
| 6,934,391 B1 | 8/2005 | Linkola et al. | |
| 6,957,199 B1 | 10/2005 | Fisher | |
| 6,980,830 B2 | 12/2005 | Ahonen | |
| 7,039,221 B1 | 5/2006 | Tumey et al. | |
| 7,050,897 B2 | 5/2006 | Breed et al. | |
| 7,064,711 B2 | 6/2006 | Strickland et al. | |
| 7,069,144 B2 | 6/2006 | Yoshihara et al. | |
| 7,082,359 B2 | 7/2006 | Breed | |
| 7,096,316 B1 | 8/2006 | Karr et al. | |
| 7,171,460 B2 | 1/2007 | Kalavade et al. | |
| 7,178,724 B2 | 2/2007 | Tamagno et al. | |
| 7,185,161 B2 | 2/2007 | Kang | |
| 7,218,930 B2 | 5/2007 | Ko et al. | |
| 7,222,783 B2 | 5/2007 | Merrien | |
| 7,259,469 B2 | 8/2007 | Brummett et al. | |
| 7,363,056 B2 | 4/2008 | Faisy | |
| 7,389,178 B2 | 6/2008 | Raz et al. | |
| 7,412,313 B2 | 8/2008 | Isaac | |
| 7,412,380 B1 | 8/2008 | Avendano et al. | |
| 7,558,110 B2 | 7/2009 | Mizushima et al. | |
| 7,564,842 B2 | 7/2009 | Callaway | |
| 7,593,605 B2 | 9/2009 | King et al. | |
| 7,603,107 B2 | 10/2009 | Ratert et al. | |
| 7,606,643 B2 | 10/2009 | Hunt et al. | |
| 7,630,802 B2 | 12/2009 | Breed | |
| 7,631,033 B2 | 12/2009 | Zehler | |
| 7,636,626 B2 | 12/2009 | Oesterling et al. | |
| 7,689,231 B2 | 3/2010 | Mardiks et al. | |
| 7,689,251 B2 | 3/2010 | Bae | |
| 7,729,725 B2 | 6/2010 | Stenmark | |
| 7,738,891 B2 | 6/2010 | Tenhunen et al. | |
| 7,755,472 B2 | 7/2010 | Grossman | |
| 7,778,227 B2 | 8/2010 | Gibbs | |
| 7,787,602 B2 | 8/2010 | Pearson et al. | |
| 7,791,310 B2 | 9/2010 | Luz et al. | |
| 7,792,618 B2 | 9/2010 | Quigley et al. | |
| 7,808,375 B2 | 10/2010 | Bertness et al. | |
| 7,844,817 B2 | 11/2010 | Mueller et al. | |
| 7,849,020 B2 | 12/2010 | Johnson | |
| 7,904,569 B1 | 3/2011 | Gelvin et al. | |
| 7,917,251 B2 | 3/2011 | Kressner et al. | |
| 7,957,729 B2 | 6/2011 | Roter et al. | |
| 7,957,744 B2 | 6/2011 | Oesterling et al. | |
| 8,054,038 B2 | 11/2011 | Kelty et al. | |
| 8,061,140 B2 | 11/2011 | Harmon | |
| 8,063,797 B1 | 11/2011 | Sonnabend et al. | |
| 8,081,643 B2 | 12/2011 | Sonoda et al. | |
| 8,086,395 B2 | 12/2011 | Mino | |
| 8,095,184 B2 | 1/2012 | Hiltunen et al. | |
| 8,100,206 B2 | 1/2012 | Kressner et al. | |
| 8,131,317 B2 | 3/2012 | Lee | |
| 8,135,443 B2 | 3/2012 | Aleksic et al. | |
| 8,140,064 B2 | 3/2012 | Mardiks | |
| 8,143,741 B2 | 3/2012 | Funakoshi et al. | |
| 8,144,596 B2 | 3/2012 | Veillette | |
| 8,180,400 B2 | 5/2012 | Shin et al. | |
| 8,185,300 B2 | 5/2012 | Miura et al. | |
| 8,195,233 B2 | 6/2012 | Morikuni et al. | |
| 8,195,235 B2 | 6/2012 | Montes | |
| 8,207,642 B2 | 6/2012 | Lafontaine et al. | |
| 8,233,389 B2 | 7/2012 | Yim et al. | |
| 8,244,468 B2 | 8/2012 | Scalisi et al. | |
| 8,244,909 B1 | 8/2012 | Hanson et al. | |
| 8,249,087 B2 | 8/2012 | Takada et al. | |
| 8,255,107 B2 | 8/2012 | Yang et al. | |
| 8,294,420 B2 | 10/2012 | Kocher | |
| 8,296,373 B2 | 10/2012 | Bosworth et al. | |
| 8,335,493 B2 | 12/2012 | Angelhag | |
| 8,364,959 B2 | 1/2013 | Bhanoo et al. | |
| 8,378,623 B2 | 2/2013 | Kusch et al. | |
| 8,514,825 B1 | 8/2013 | Addepalli et al. | |
| 8,602,141 B2 | 12/2013 | Yee et al. | |
| 8,705,527 B1 | 4/2014 | Addepalli et al. | |
| 8,712,474 B2 | 4/2014 | Gehrmann | |
| 8,718,797 B1 | 5/2014 | Addepalli et al. | |
| 8,719,431 B2 | 5/2014 | Reif et al. | |
| 8,837,363 B2 | 9/2014 | Jones et al. | |
| 8,989,954 B1 | 3/2015 | Addepalli et al. | |
| 9,036,509 B1 | 5/2015 | Addepalli et al. | |
| 9,083,581 B1 | 7/2015 | Addepalli et al. | |
| 2001/0033225 A1* | 10/2001 | Razavi et al. | 340/425.5 |
| 2002/0006139 A1 | 1/2002 | Kikkawa et al. | |
| 2002/0072388 A1 | 6/2002 | Korneluk et al. | |
| 2002/0097855 A1 | 7/2002 | Neudeck et al. | |
| 2002/0103964 A1 | 8/2002 | Igari | |
| 2002/0165008 A1 | 11/2002 | Sashimara et al. | |
| 2002/0174360 A1 | 11/2002 | Ikeda | |
| 2002/0198632 A1 | 12/2002 | Breed et al. | |
| 2003/0005435 A1 | 1/2003 | Nelger et al. | |
| 2003/0009271 A1 | 1/2003 | Akiyama | |
| 2003/0028763 A1 | 2/2003 | Malinen et al. | |
| 2003/0033435 A1* | 2/2003 | Hanner | 709/247 |
| 2003/0046228 A1 | 3/2003 | Berney | |
| 2003/0051041 A1 | 3/2003 | Kalavade et al. | |
| 2003/0083968 A1 | 5/2003 | Marsh et al. | |
| 2003/0152038 A1 | 8/2003 | Oshima et al. | |

| | | |
|---|---|---|
| 2003/0191939 A1 | 10/2003 | Tsai et al. |
| 2004/0008677 A1 | 1/2004 | Cen |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0073339 A1 | 4/2004 | Ruoppolo |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0171386 A1 | 9/2004 | Mitjana |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0246966 A1* | 12/2004 | Wu et al. ............... 370/395.1 |
| 2004/0249915 A1 | 12/2004 | Russell |
| 2004/0256451 A1 | 12/2004 | Goman et al. |
| 2005/0009563 A1 | 1/2005 | Stenmark |
| 2005/0018883 A1 | 1/2005 | Scott |
| 2005/0020250 A1 | 1/2005 | Chaddha et al. |
| 2005/0039027 A1 | 2/2005 | Shapiro |
| 2005/0041660 A1* | 2/2005 | Pennec et al. ............ 370/389 |
| 2005/0065678 A1 | 3/2005 | Smith et al. |
| 2005/0075137 A1 | 4/2005 | Reemtsma |
| 2005/0101323 A1 | 5/2005 | De Beer |
| 2005/0124288 A1 | 6/2005 | Karmi et al. |
| 2005/0131673 A1* | 6/2005 | Koizumi et al. ............... 704/2 |
| 2005/0162687 A1 | 7/2005 | Lee |
| 2005/0207408 A1* | 9/2005 | Elliott ............... 370/389 |
| 2005/0239504 A1 | 10/2005 | Ishi et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129311 A1* | 6/2006 | Bauman et al. ............ 701/201 |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0038772 A1* | 2/2007 | Obata ............... 709/232 |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0040005 A1 | 2/2008 | Breed |
| 2008/0043759 A1* | 2/2008 | Poetker et al. ............... 370/401 |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0154460 A1* | 6/2009 | Varela et al. ............... 370/392 |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0265633 A1* | 10/2009 | Lim et al. ............... 715/733 |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167724 A1 | 7/2010 | Haran et al. |
| 2010/0183016 A1 | 7/2010 | Bonk et al. |
| 2010/0195724 A1* | 8/2010 | Yoshida et al. ............... 375/240.12 |
| 2010/0202346 A1 | 8/2010 | Sitzes et al. |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0234071 A1 | 9/2010 | Shabtay et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0032952 A1* | 2/2011 | Rochon et al. ............... 370/477 |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Sundaram |
| 2011/0149982 A1 | 6/2011 | Hwang et al. |

| | | | |
|---|---|---|---|
| 2011/0153149 | A1* | 6/2011 | Jeon et al. .................. 701/32 |
| 2012/0004933 | A1 | 1/2012 | Foladare et al. |
| 2012/0089299 | A1 | 4/2012 | Breed |
| 2012/0109418 | A1 | 5/2012 | Lorber |
| 2012/0109446 | A1 | 5/2012 | Yousefi et al. |
| 2012/0182935 | A1 | 7/2012 | Addepalli et al. |
| 2013/0018575 | A1 | 1/2013 | Birken et al. |
| 2013/0159466 | A1 | 6/2013 | Mao |
| 2013/0301584 | A1 | 11/2013 | Addepalli et al. |
| 2014/0049413 | A1* | 2/2014 | Agarwal et al. .................. 341/87 |

FOREIGN PATENT DOCUMENTS

| | | |
|---|---|---|
| DE | 10146664 A1 | 2/2003 |
| EP | 1337119 A | 8/2003 |
| EP | 1696357 | 8/2006 |
| EP | 1727383 | 11/2006 |
| EP | 1737160 | 12/2006 |
| EP | 1758335 | 2/2007 |
| GB | 2294787 | 5/1996 |
| GB | 2313257 A | 11/1997 |
| GB | 2386803 A | 9/2003 |
| GB | 2406925 | 4/2005 |
| JP | 2000194660 | 7/2000 |

OTHER PUBLICATIONS

U.S. Appl. No. 13/014,605, entitled "System and Method for Enabling Secure Transactions Using Flexible Identity Management in a Vehicular Environment," filed Jan. 26, 2011, Inventors: Sateesh K. Addepalli et al.

U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.

U.S. Appl. No. 13/111,425, entitled "System and Method for Providing Resource Sharing, Synchronizing, Media Coordination, Transcoding, and Traffic Management in a Vehicular Environment," filed May 19, 2011, Inventors: Sateesh K. Addepalli et al.

U.S. Appl. No. 13/117,860, entitled "System and Method for Analyzing Vehicular Behavior in a Network Environment," filed May 27, 2011, Inventors: Sateesh K. Addepalli et al.

U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.

U.S. Appl. No. 13/087,884, entitled System and Method for Discovery, Trusted Execution, and Admission Control in a Vehicular Environment, filed Apr. 15, 2011, Inventors: Sateesh K. Addepalli et al.

U.S. Appl. No. 13/083,305, entitled "System and Method for Applications Management in a Networked Vehicular Environment," filed Apr. 8, 2011, Inventors: Sateesh K. Addepalli et al.

U.S. Appl. No. 13/114,659, entitled "System and Method for Transport, Network, Translation, and Adaptive Coding in a Vehicular Network Environment," filed May 24, 2011, Inventors: Sateesh K. Addepalli et al.

U.S. Appl. No. 14/243,304, entitled "System and Method for Real-Time Synthesis and Performance Enhancement of Audio/Video Data, and Noise Cancellation and Gesture Based User Interfaces in a Vehicular Environment," filed Apr. 2, 2014, Inventors: Sateesh K. Addepalli et al.

"Cisco Mobile Network Solutions for Commercial Transit Agencies," Cisco.com, © 2008 Cisco Systems, Inc., Aug. 2008, 8 pages http://www.cisco.conn/en/US/prod/collateral/routers/ps272/white_paper_c11-4921115.html.

"Cisco Mobile Network Solutions for Public Safety," Cisco.com, 2008 Cisco Systems, Inc., Mar. 2008, 7 pages http://www.cisco.com/en/US/prod/collateral/routers/ps272/prod_white_paper0900aecd806220af.html.

"TCG Mobile Trusted Module Specification." Trusted Computing Group, Specification version 1.0, Revision 6, Jun. 2008, 105 pages; [Retrieved and printed Apr. 8, 2011] http://www.trustedcomputing-group.org/files/resource_files/87852F33-1D09-3519-ADOC0F141CC6B10D/Revision_6-tcg-mobile-trusted-module-1_0.pdf.

Alves, T., et al., "TrustZone: Integrated Hardware and Software Security," Information Quarterly, vol. 3, No. 4, 2004, pp. 18-24; [Retrieved and printed Apr. 8, 2011] http://www.iqmagazineonline.com/magazine/pdf/v_3_4_pdf/Pg18_24_custZone_Secur.pdf.

Arsenault, A., et al., "Securely Available Credentials—Requirements," IETF, Network Working Group, RFC 3157, Baltimore Technologies, Aug. 2001, 20 pages.

Autonet Mobile, "Autonet Mobile Features, Technology Specifications," autonetmobile.com, 1 page; [earliest known publication date: Apr. 8, 2011] http://www.autonetmobile.com/service/anmdev.html.

Autonet Mobile, "CARFI Features, Technology Specifications," autonetmobile.com, 1 page; [earliest known publication date: Apr. 8, 2011] http://autonetmobile.com/service/carfidev.html.

Autonet Mobile, "It's What Your Car has been Waiting for," autonetmobile.com, 2 pages; [retrieved and printed Apr. 8, 2011] http://www.autonetmobile.com/service/.

Bickhart, Ryan W., et al., "Transparent TCP-to-SCTP Translation Shim Layer," EuroBSDCon 2007, Copenhagen, Denmark, Sep. 17-18, 2007; 14 pages.

Bilstrup, "A Survey Regarding Wireless Communication Standards Intended for a High-Speed Vehicle Environment," Technical Report IDE0712, Feb. 2007, 51 pages.

Blazevic, Ljubica, et al., "A Location-Based Routing Method for Mobile Ad Hoc Networks," IEEE Transactions on Mobile Computing, vol. 4, No. 2, Mar./Apr. 2005 (Issue publication date: Feb. 7, 2005); 14 pages.

Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.

Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.

EPO May 22, 2012 European Search Report and Written Opinion from EP 12150208.2.

Farinacci, D. et al., "LISP Mobile Node," Network Working Group Internet Draft, Feb. 1, 2010, 22 pages; http://tools.ietf.org/id/draft-meyer-lisp-mn-01.txt.

Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.

Hsu, WAVE/DSRC Development and Standardization, Industrial Technology Research Institute, Oct. 1, 2010, 84 pages.

Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

Ibars, Christian et al., "Wireless Services in the Connected Vehicle Era," IEEE Communications Magazine, Dec. 23, 2010, 13 pages.

Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.

Lillian Lei Dai, *"Proactive Mobile Wireless Networks: an infrastructureless wireless network architecture for delay-sensitive applications,"* Massachusetts Institute of Technology, Jun. 2008 (two parts submitted: Part 1—105 pages; Part 2—97 pages).

* cited by examiner

*Primary Examiner* — Otis L Thompson, Jr.
(74) *Attorney, Agent, or Firm* — Patent Capital Group

(57) ABSTRACT

A system includes an on-board unit (OBU) in communication with an internal subsystem in a vehicle on at least one Ethernet network and a node on a wireless network. A method in one embodiment includes receiving a message on the Ethernet network in the vehicle, encapsulating the message to facilitate translation to Ethernet protocol if the message is not in Ethernet protocol, and transmitting the message in Ethernet protocol to its destination. Certain embodiments include optimizing data transmission over the wireless network using redundancy caches, dictionaries, object contexts databases, speech templates and protocol header templates, and cross layer optimization of data flow from a receiver to a sender over a TCP connection. Certain embodiments also include dynamically identifying and selecting an operating frequency with least interference for data transmission over the wireless network.

20 Claims, 30 Drawing Sheets

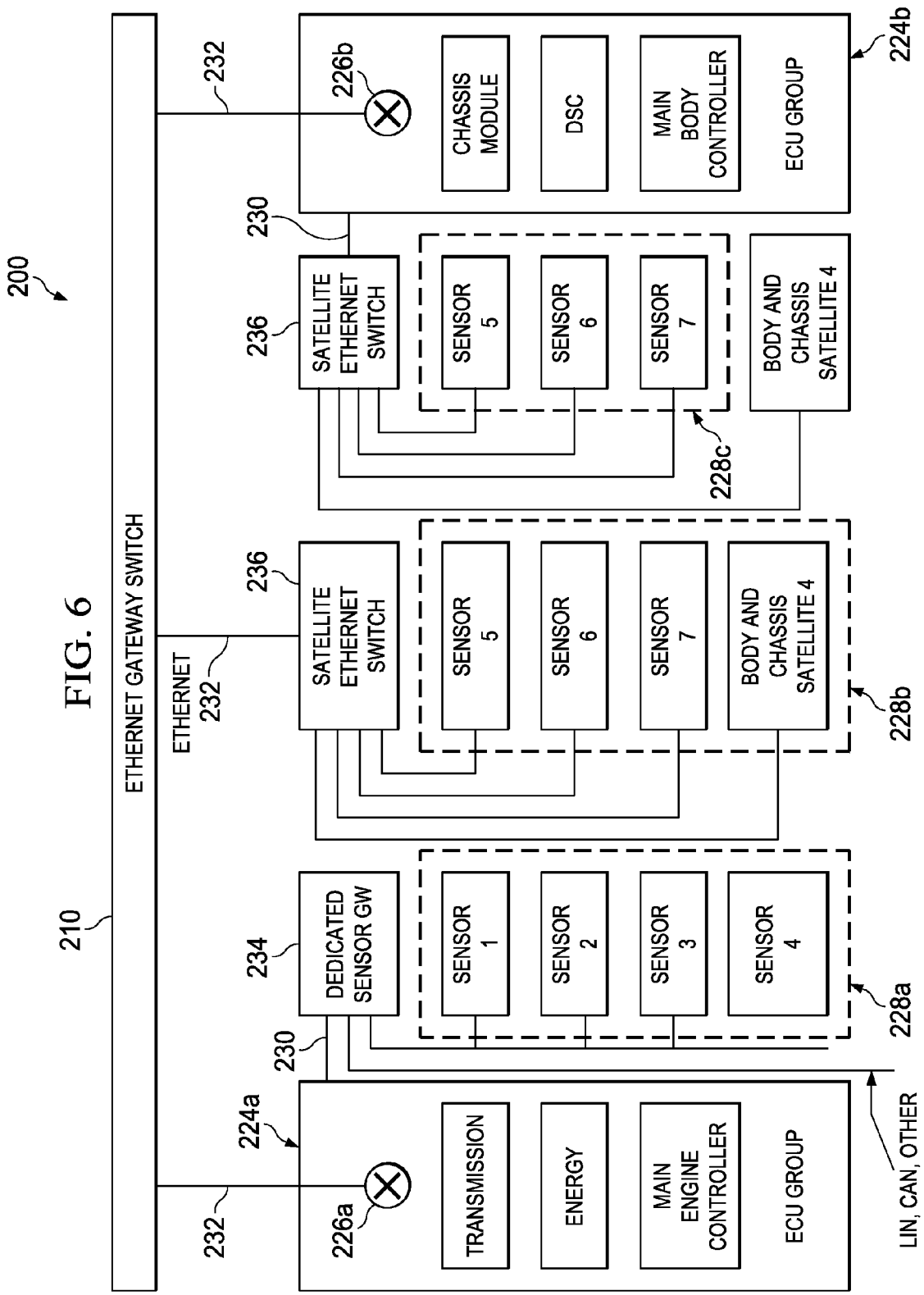

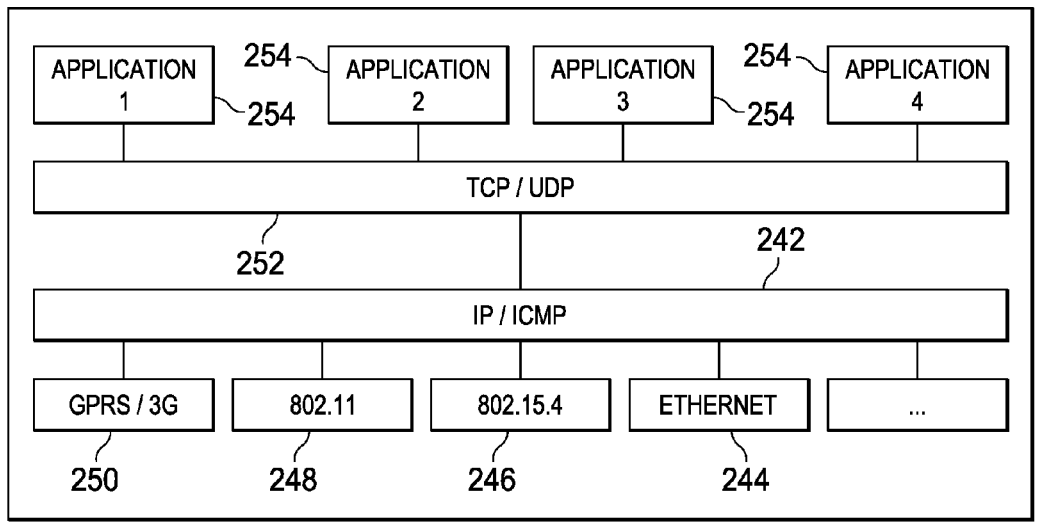
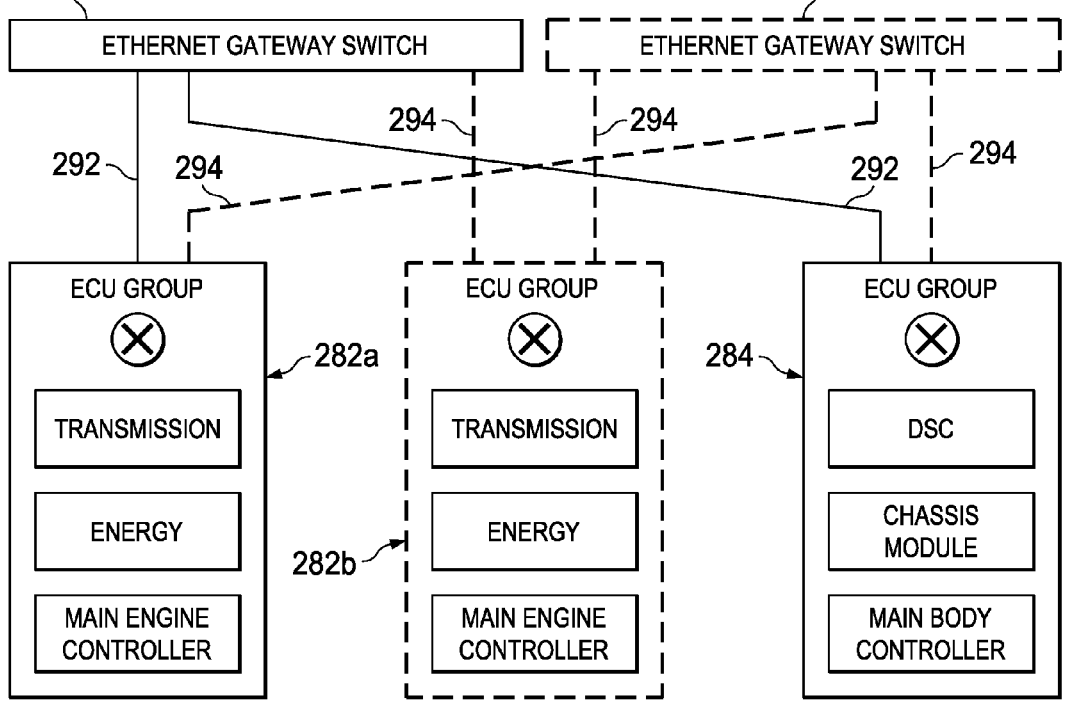

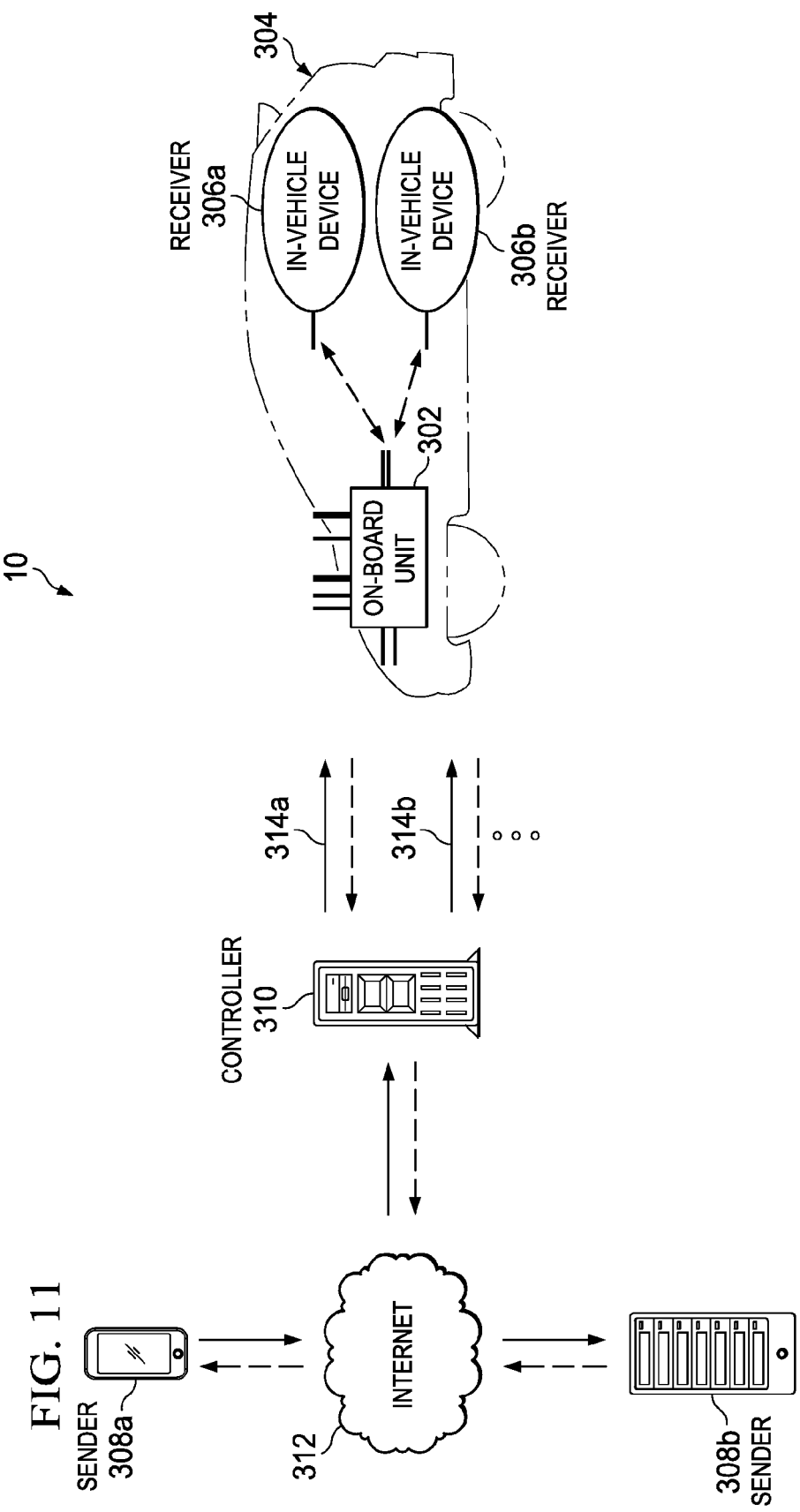

SYSTEM AND METHOD FOR INTERNAL NETWORKING, DATA OPTIMIZATION AND DYNAMIC FREQUENCY SELECTION IN A VEHICULAR ENVIRONMENT

CROSS-REFERENCE TO RELATED APPLICATION

This application is a divisional (and claims the benefit of priority under 35 U.S.C. §120) of U.S. application Ser. No. 13/104,737, filed May 10, 2011, entitled "SYSTEM AND METHOD FOR INTERNAL NETWORKING, DATA OPTIMIZATION AND DYNAMIC FREQUENCY SELECTION IN A VEHICULAR ENVIRONMENT," Inventors Sateesh K. Addepalli, et al., which application claims the benefit of priority under 35 U.S.C. §119(e) of U.S. Provisional Application Serial No. 61/433,138, filed Jan. 14, 2011, entitled "SYSTEM, METHOD, AND PROCESSES ASSOCIATED WITH CONNECTED VEHICLES," by Inventors Sateesh K. Addepalli et al. The disclosures of both of the prior applications are considered part of (and are incorporated by reference in) the disclosure of this application in their entireties.

TECHNICAL FIELD

This disclosure relates in general to the field of electronic communications and, more particularly, to internal networking, data optimization and dynamic frequency selection in a vehicular environment.

BACKGROUND

Networking architectures have grown increasingly complex and have been designed for use in a wide variety of communications environments. Demand continues to rise among the subscriber base of end users, however, for network access across diverse network environments. In particular, configuring suitable network architecture for vehicular environments (e.g., automobiles, airplanes, trains, boats, etc.) presents unique difficulties. Vehicles can be mobile across a large geographical area, can travel at variable speeds, can have internal networks related to the vehicle itself, and can include more than one end user at a time. Providing the ability to conduct transactions in vehicular network environments in an optimized manner and providing a secure and flexible communication framework for various agents conducting the transactions present significant challenges to system designers, automobile manufacturers and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified block diagram of an internal network subsystem for enabling communication and access control of subsystems, devices, and data in a vehicle through gateways and switches according to another embodiment of the present disclosure;

FIG. 7 is a simplified block diagram of a layered IP architecture;

FIG. 10 is a simplified block diagram of virtualized multi-core electronic control units (ECUs) of an internal network subsystem in a network environment.

FIG. 11 a simplified schematic diagram of an exemplary network environment in accordance with embodiments of the present disclosure;

DETAILED DESCRIPTION OF EXAMPLE EMBODIMENTS

Overview

Figure 1:
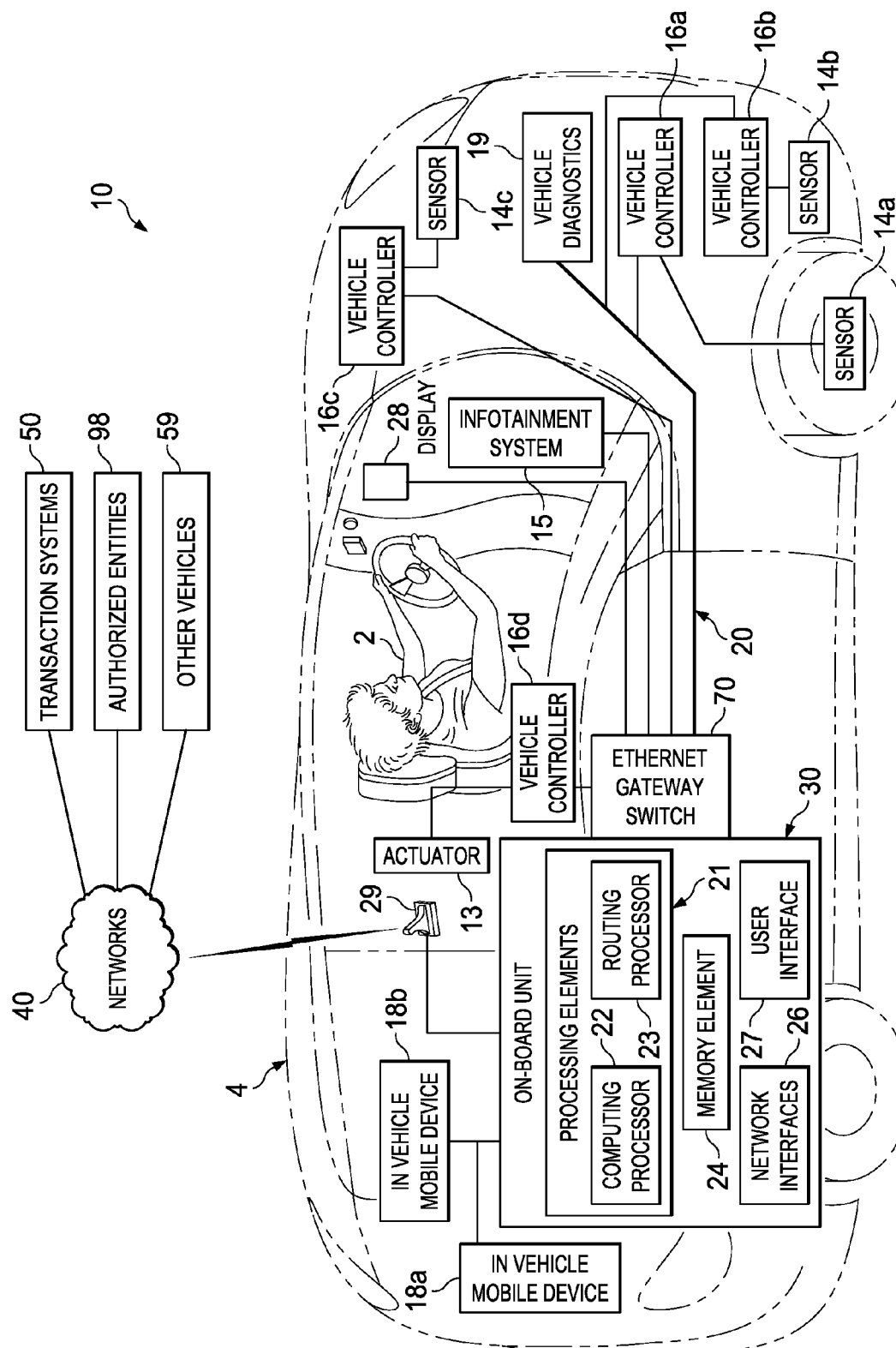
FIG. 1 is a simplified block diagram of one embodiment of a communication system in accordance with the present disclosure.

A system in one example embodiment includes an internal subsystem in a vehicle including a plurality of sensors, actuators and vehicle controllers and an on-board unit (OBU) in communication with the internal subsystem on a first network, and a node on a second network. The first network includes at least one Ethernet network including a first Ethernet switch coupled to the OBU and adapted to facilitate communication between the plurality of sensors, actuators and vehicle controllers in the internal subsystem, and the second network comprises a wireless network. More specific embodiments include an electronic control unit (ECU) with at least one processing element and at least one processing logic and other features.

A method according to an example embodiment includes receiving a message including a destination information, in a first protocol, from a first in-vehicle device on an Ethernet network in a vehicle, identifying a second in-vehicle device on the Ethernet network corresponding to the destination information, and determining if the first protocol corresponds to Ethernet protocol. If the first protocol does not correspond to Ethernet protocol, the method includes encapsulating the message to facilitate translation from the first protocol to Ethernet protocol, and transmitting the message in Ethernet protocol to the second in-vehicle device. More specific embodiments include identifying a first ECU that is operable to perform a function and a second ECU that can substantially perform the function and transmitting the data packet to the second ECU if the first ECU cannot perform the function, and other features.

A method in another example embodiment includes facilitating a Transmission Control Protocol (TCP) connection between a sender and a receiver, forwarding data packets from the sender to the receiver, receiving a first acknowledgement packet from the receiver, modifying the first acknowledgement packet to a second acknowledgement packet based on a criterion, and forwarding the second acknowledgement packet to the sender. More specific embodiments include additional aspects such as checking historical data and classifying flows according to priorities.

A method in another example embodiment includes receiving, on an OBU, a first data block from a first node, accessing content in a database, comparing the first data block to the content, determining whether a criterion is met, compressing the first data block to a second data block if the criterion is met, and sending the second data block to a controller. The controller is configured to receive a third data block from a second node, access content in a second database, compare the second data block to the content, determine whether a second criterion is met, compress the third data block to a fourth data block if the second criterion is met, and send the fourth data block to the OBU. More specific embodiments include various kinds of databases and contents.

A method in another example embodiment includes operating a first node on a first channel with a first wireless frequency, sensing a wireless network operating on the first channel, measuring interference on the first channel, compiling a list of alternative channels, determining a channel with a least interference, and switching operations on the first node to the channel with the least interference. More specific embodiments include measuring interference on each of the alternative channels, and comparing interference on each of the alternative channels with interference on the first channel and other channels in the alternative channels, wherein the first node is an in-vehicle device adapted to communicate with the OBU.

Example Embodiments

Turning to FIG. 1, FIG. 1 is a simplified block diagram of a communication system 10 for enabling internal networking, data optimization and dynamic frequency selection in a vehicular environment. The example architecture of FIG. 1 includes an end user (driver) 2 operating a vehicle 4 that includes an on-board unit (OBU) 30. In embodiments described herein, OBU 30 can provide computing, network connectivity, routing, in-vehicle gateway functions, and service hosting functions. In this particular example, OBU 30 includes processing elements 21, which include a computing processor 22 and a routing processor 23. OBU 30 also includes a memory element 24, network interfaces 26, a user interface 27, and a display 28. OBU 30 may be adapted to communicate with one or more in-vehicle devices over wired or wireless networks.

OBU 30 can be suitably coupled to an Ethernet Gateway Switch 70, which interconnects a plurality of sensors 14a-c, a plurality of vehicle controllers (e.g., electronic control units (ECUs)) 16a-c, and a plurality of actuators, such as actuator 13. In one example embodiment, ECUs may include main engine controller, main body controller and infotainment controller. ECUs may be adapted to communicate with at least one sensor from the plurality of sensors 14a-c and at least one actuator, for example, actuator 13. In one embodiment, ECUs may receive signals from the at least one sensor and transmit controlling signals to the at least one actuator to control the vehicle. In another example embodiment, sensors 14a-b and vehicle controllers 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time, where such devices may be associated with particular end users (passengers or driver)

within vehicle 4. OBU 30 may also provide connection to an infotainment subsystem 15, which could include media, audio, and navigation (e.g., a global positioning system (GPS)) elements. Other embodiments of an OBU described herein can comprise the same or similar elements as shown and described with reference to OBU 30 of FIG. 1, where appropriate and based on particular needs.

FIG. 1 also includes networks 40, representing various types of connectivity to vehicle 4 (e.g., via antenna 29). Each established network of networks 40 has a logical coupling to remote nodes, which may include transaction systems 50, authorized entities 98, and other vehicles 59. A node may be any electronic device (e.g., machine device or a mobile device), network element, client, server, peer, service, application, or other object capable of sending, receiving, or forwarding information over communications channels in a network. A remote node may be any node located externally to a particular vehicle, such as vehicle 4. Examples of remote nodes include user devices, mobile devices, electronic devices in networked systems (e.g., server in a datacenter, user device in a local area network (LAN), etc.), OBUs of other vehicles, and road-side user devices.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating internal network subsystem 20 that may be employed to convey information across the myriad of machine devices (e.g., sensors 14a-c, vehicle controllers 16a-c, actuator 13) in vehicle 4.

Embodiments of communication system 10 may enable communication and access control of subsystems, machine devices, and data in a vehicular environment through an internal network subsystem 20. Internal network subsystem 20 may be comprised of tightly interconnected subsystems connecting the myriad machine devices in vehicle 4 and may be based on low cost, reliable, low latency, and sufficient bandwidth Ethernet networking technology. Embodiments of communication system 10 can also enable application independent data optimization of content transferred between networks 40 and OBU 30 over wireless networks, provide cross-layer optimization to improve transport layer performance between wirelessly connected devices and enable dynamic frequency tuning in connected vehicle environments.

Certain terminologies are used with regard to the various embodiments of the present disclosure. The term 'road-side' as used herein is intended to mean outside of a vehicle and may or may not be physically located by a road. In addition, 'user device' as used herein is intended to include mobile devices, personal computers, electronic devices, and any other device, component, element, or object operable by a user and capable of initiating voice, audio, video, media, or data exchanges within communication system 10. The term 'road-side infrastructure device' as used herein includes a base station, access point, satellite, and any device capable of establishing a network connection for exchanging packets between a user device or OBU and the Internet. Road-side infrastructure devices can include any suitable cellular, satellite, Femto, Pico, Micro, IEEE 802.11x, and other wireless technologies. As used herein, the term 'machine device' is meant to encompass sensors, actuators, vehicle controllers including ECUs, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. The term 'in-vehicle device' as used herein, encompasses machine devices and user devices located inside a vehicle. Other terminologies are defined throughout the Specification.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles (e.g., automobiles, airplanes, trains, boats, etc.). For example, multiple internal network subsystems (e.g., bus subsystems, IP networks) may exist in the vehicle and may provide communication pathways to various machine devices distributed throughout the vehicle. A 'subsystem' as used herein is intended to encompass a network within a vehicle, where the network is a collection of nodes interconnected by communicative channels that facilitate electronic communications therebetween, in which the nodes are integrated with or otherwise linked to the vehicle. The nodes in internal network subsystems can include machine devices such as, for example, sensors, actuators, electronic control units (ECUs), detectors, entertainment systems including speakers, a CD and/or DVD player, a radio, etc. In addition, an internal network subsystem may exist for IP machine devices such as certain vehicle navigation systems (e.g., GPS), in-vehicle mobile devices (e.g., mobile phones, smart mobile phones/devices, e-book readers, tablets, laptops/net books, portable navigation systems, multimedia devices, etc.) and any other machine devices configured for IP communications.

Multiple vehicular bus subsystems characterized by disparate technologies may exist in a single vehicle. As a result of more and more functions requiring computer assisted digital control evolving over the years, some vehicles now include 70-100 separate ECUs having different processors, operating systems, and networking technology. Examples of such functions controlled by ECUs include Electronic Stability control Units (ESP), Assisted Braking Systems (ABS), and many other safety, comfort, or entertainment related functions. Subsystems of vehicles typically include legacy bus subsystems (or subnets), each providing communication pathways to particular machine devices distributed throughout a vehicle.

For example, typical vehicular bus subsystems may include a Controller Area Network (CAN), which uses a message based protocol, designed for and typically used by automotive applications. The CAN bus is a vehicle bus standard designed to allow microcontrollers, sensors, and other devices to communicate with each other via the CAN (e.g., without a host computer). CAN may be used for soft real-time control of devices such as an antilock braking system. The bus subsystems can also include Local Internet Network (LIN), which may be used to sense external conditions such as light, or to control small mechanisms such as door locking systems. Yet another bus subsystem could include Flexray, a dedicated network for hard real-time vehicle controllers, used for drive-by-wire and/or brake-by-wire applications in which information from the engine and/or the wheels is collected and transmitted to appropriate applications and/or data repositories. Media Oriented System Transport (MOST) can also be found in vehicles for transmitting audio, video, and voice on fiber optics. Some of these buses include vehicle-specific interconnects.

Such bus-interconnection architecture suffers certain limitations including unpredictable performance, low speed, low reliability with no fault protection and lack of scalability. The multiple technologies need gateways for cross-communication and are generally limited in bandwidth. Thus, scaling can require moving from one technology to another. Guaranteeing security, fault tolerance, reach-ability or observability in these types of architectures is very difficult. In particular, the CAN bus design is characterized by a number of basic, structural security weaknesses, including its broadcast nature, its fragility to denial-of-service attacks, absence of authentication fields, and weak access control. Moreover, these technologies, being automotive specific, are not as scalable as other networking technologies, for example, data center, consumer computer and communication networking technologies. As more and more sensors, actuators, and other machine devices are added to the internal architecture of future vehicles, such shortcomings may become even more apparent. New approaches are needed in in-vehicle networking to manage these limitations and complexities.

Despite the disparate technologies of the various subsystems, communication across them may be necessary for the proper operation of the vehicle or can be desirable for other reasons. For example, an anti-lock braking system (ABS) or stability control system may need to gather information from different parts of a vehicle (e.g., wheels, throttle, braking system, etc.) as input and to transmit control messages to the appropriate machine devices to perform an action based on the input. Similarly, an Electronic Stability Control system collects information from individual wheels, accelerometers, throttles, and steering controllers. These machine devices communicate with each other over the buses. Without proper control of data exchanges between bus subsystems, vehicle malfunctions and accidents can result. In particular, anomalies in message flows across the different bus subsystems can affect the vehicle itself and the ability of a driver to control the vehicle. Typically, gateways deployed across two different bus subsystems or supergateways deployed across multiple subsystems are used. However, communication among subsystems is difficult, due to the need to cross gateways, supergateways, and ECUs, and due to the use of multiple addressing techniques. Additionally, the gateway/supergateway architecture does not provide a unified message log system to help diagnose failures of a vehicle due to anomalies of message flow across subsystems.

Failures within a vehicle due to communication flows across the bus subsystems can be very complicated to diagnose when the vehicle includes many different subsystems with numerous different ECUs. Subnets are often physically and logically isolated in order to ensure the correct and secure operation of the vehicle. For instance, information from the Flexray bus (e.g., wheels and engine information) is not accessible over the MOST bus. Although such segregation may help to preserve security in certain cases, scattered functionalities across a vehicle and across different bus subsystems can increase costs, such as costs associated with diagnosing problems and maintaining the vehicle. Latency and available bandwidth for such communication are also unpredictable. Often, the need of interconnecting two different ECUs is not defined at the time of the original design, and may be hard to achieve without major redesigns. Nevertheless, despite these limitations, the number of ECUs and traffic exchanged between them are expected to continue to grow. Therefore, there is a need for a better internal network subsystem.

In addition to internal networks, with appropriate external network access (e.g., to Internet Protocol (IP) infrastructure), data from machine devices in a vehicle could be used to provide dynamic, real-time vehicle diagnostics from associated sensors, actuators, and vehicle controllers to a manufacturer of the vehicle or to any other authorized entity. Additionally, interconnection of the vehicular bus subsystems to the IP infrastructure can enable serviceability, safety, and better services to vehicular applications.

External networks may be accessed from a vehicle by certain electronic devices when a communication link is available. An 'external network' as used herein is intended to encompass a network that is external to a vehicle, where the network is a collection of nodes interconnected by communicative channels that facilitate electronic communications therebetween. Mobile devices such as, for example, mobile phones, smart mobile phones/devices, e-book readers, tablets, laptops/net books, portable navigation systems, multimedia devices, other handheld devices, etc. may be used within a vehicle to wirelessly access an external network, for making a cellular phone call, accessing the Internet via a mobile network operator, and accessing the Internet via a WiFi connection to a road-side access point. A vehicle router in a vehicle may also be used to access a road-side infrastructure device within range of the vehicle. However, external network access from mobile devices and vehicle routers is dependent upon the particular wireless interfaces being within a wireless range of corresponding mobile or wireless network infrastructures. If the particular corresponding roadside infrastructure devices are not within a wireless range, or if the vehicle carrying the mobile devices and vehicle routers moves outside of the wireless range, then external network communication can be lost.

Some form of consistent and reliable wireless communication is needed to achieve external network connectivity from a vehicle. Wireless technologies are continually evolving to better enable electronic devices with appropriate wireless interfaces to access various networks and other electronic devices. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Although numerous wireless technologies exist, the mobile nature of vehicles obfuscates continuous wireless connectivity from a vehicle to an external network. Vehicles travel at various speeds and their travel can span extensive geographical distances. Disturbances (e.g., topographical changes, physical structures, weather, geographical distance from a network access point or cellular tower, etc.) may cause interference and reception difficulties for a particular wireless technology being used. Consequently, an electronic device, such as a mobile device, in a moving vehicle often vacillates between having wireless connectivity and losing wireless connectivity. Even if another wireless communication link is available when wireless connectivity to an external network is lost due to the movement of a vehicle, the other available wireless link may be inaccessible to the particular electronic device without an appropriate wireless interface and network configuration to latch onto the available wireless link. Moreover, switching to a new wireless interface may involve repeatedly breaking a current session and reestablishing another session on the new wireless interface. Such disruptions can be frustrating for the end user, thereby diminishing the end user's reliance on and use of network connectivity while traveling in the vehicle.

Some wireless communication links may be available, but not desirable for extended use in a mobile vehicle. For example, pricing contracts with mobile network operators typically provide cellular coverage through the particular operator for a certain fee based on defined criteria. Example criteria may include tiered pricing on bandwidth usage over 3G/4G/WiFi/Satellite. However, due to capacity constraints, interference, multipath and other fading related issues in a moving vehicle, bandwidth availability may be limited. Additionally, failures in external networks may compromise bandwidth availability, leading to packet loss and congestion. Even if bandwidth is sufficiently available, a user may want to conserve and maximize the use of available bandwidth to reduce costs due to tiered pricing on bandwidth. Moreover, a user may access different types of traffic over wireless networks, for example, video, text, binary and audio data.

While video traffic can be matched to dynamic bandwidth changes by using various adaptive transcoding and transrating techniques, there is lack of optimization techniques that are independent of traffic types or applicable to other traffic types such as text, binary data, and audio in general. Moreover, although certain bandwidth optimization techniques have been used in various static networks, for example, content distribution networks (CDN) and wireless area networks (WAN), the application of such bandwidth optimization techniques in a vehicular network environment may be challenging due to certain limitation, regulations and special requirements.

Many wireless networks use Transmission Control Protocol (TCP) to transfer packets of information between devices. In the connected vehicle environment discussed above, TCP performance may suffer even with a single wireless hop because of additional challenges due to high vehicle speeds, mobility, multiple access technologies, multiple path properties (for a single TCP connection) and highly dynamic bandwidth/latency scenarios, making it difficult to utilize available bandwidth and achieve reasonable performance. There may also be multiple Doppler effects and frequent handovers that worsen TCP performance in a connected vehicle environment. In addition, in the connected vehicle environment, different classes of traffic (based on various factors such as user profile, application priority, and policy settings) may compete for limited link resources and pose different Quality of Service (QoS) requirements. These classes of traffic originate from devices that are not tuned to operate optimally in such challenging wireless conditions. Therefore, there is a need to optimize bandwidth usage by such devices.

Delivery of TCP segments may be improved by various methods, for example, modifications to TCP end-points (e.g., packet loss tolerant congestion), control algorithms like Westwood(+) or support of Selective Acknowledgement (SACK), network assisted techniques like Explicit Congestion Notification (ECN), Explicit Loss Notification (ELN), and customized transport. However, many of such techniques effect changes to TCP end-points, or replace a TCP connection over a wireless link with a customized transport. Effecting changes to TCP end-points may be difficult in many situations because of legacy servers, or a large number of end-devices. Replacing a TCP connection may require special servers and client software to support customized transports. Such changes can be costly and may not be scalable.

On the other hand, network assisted techniques address poor TCP performance with TCP feedback. Such methods, however, may be slow in reacting to fluctuations since it does not track bandwidth changes offered by the underlying access technology. A system for enabling efficient and optimized wireless communication and access control of subsystems, devices, and data in a vehicular environment, outlined by FIG. 1, can resolve many of these issues.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, end user 2 can be associated with a human agent (e.g., a driver or passenger). End user 2 may initiate communication in communication system 10 via some network, and such communication may be initiated through any suitable device, inclusive of an in-vehicle mobile device 18a or 18b, display 28, and a navigation system (not shown), which could be integrated with infotainment system 15. Mobile devices, such as in-vehicle mobile devices 18a-b, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any suitable wireless or wired communication link and may be configured as a personal area network (PAN) or a wireless personal area network (WPAN) or any other appropriate networking architecture or system that facilitates communications in a network environment. Wired and wireless communication links may be inclusive of any electronic link such as Bluetooth, wireless technologies (e.g., IEEE 802.11x), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving and transmitting packets of information that propagate through communication system 10. Networks 40 offer communicative interfaces between any of the components of FIG. 1 and remote nodes and other electronic devices of transaction systems 50, authorized entities 98, and other vehicles 59. Networks 40 could be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x, 802.16, WiFi, WiMax, DSRC, near field communications (NFC), white space, etc.), satellite, cellular technologies (e.g., 3G, 4G, LTE, GSM/WCDMA/HSPA, CDMA1x/EVDO, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMax, 3G, 4G, white space, 802.11x, satellite, Bluetooth, near field communication (NFC), LTE, GSM/WCDMA/HSPA, CDMA1x/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of communication system 10 can also include suitable interfaces for receiving, transmitting, and/or otherwise communicating data or information in a network environment.

OBU 30 and other associated or integrated components can include one or more memory elements (e.g., memory element 24) for storing information to be used in achieving operations associated with the wireless interface selection, seamless mobility, access control, and/or information flow control, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory or storage options discussed herein should be construed as being encompassed within the broad term 'memory element' as used herein in this Specification.

In example embodiments, the operations as outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 and associated or integrated components may include processing elements 21 (e.g., computing processor 22, routing processor 23, etc.) that can execute software or algorithms to perform activities to enable internal networking, data optimization and dynamic frequency selection, and to route packets using suitable routing protocols. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Regarding a physical implementation of OBU 30 and its associated components, any suitable permutation may be applied based on particular needs and requirements, including the design of the particular vehicle in which OBU 30 is implemented. In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, ECUs, embedded devices, actuators, displays, etc.) through Ethernet Gateway Switch 70. Ethernet Gateway Switch 70 may be implemented integrally with OBU 30 or may be implemented separately, but appropriately configured for communication with OBU 30. One or more suitable communication interfaces may be provided for internal network subsystem 20, for example, for an Internet Protocol (IP) network, Ethernet network, a user datagram protocol (UDP) network, or any other suitable protocol or communication architecture enabling network communication with machine devices in vehicle 4.

Typically, numerous ECUs, with different embedded software, may be found in a single automobile and may communicate via internal network subsystem 20. For example, vehicle controllers 16*a-b* may be inclusive of any embedded system or ECU that controls one or more of the electrical subsystems in vehicle 4. Sensors 14*a-b* may represent wheel and headlight sensors respectively. Actuator 13 may represent a vehicle setting device such as a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communication via internal network subsystem 20. Vehicle controller 16c, representing one or more ECUs, may be suitably integrated for controlling the network and sensors and other associated components.

In the particular example shown in FIG. 1, vehicle 4 includes capabilities associated with infotainment system 15 and vehicle diagnostics 19. A navigation system (not shown) may be provided in various embodiments including, for example, a portable navigation system or a fixed navigation system as part of infotainment system 15, each of which may be configured for Ethernet communication to Ethernet Gateway Switch 70. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, infotainment system components (e.g., speakers, radio, DVD, CD, etc.), vehicle cameras, and the like.

Figure 2:
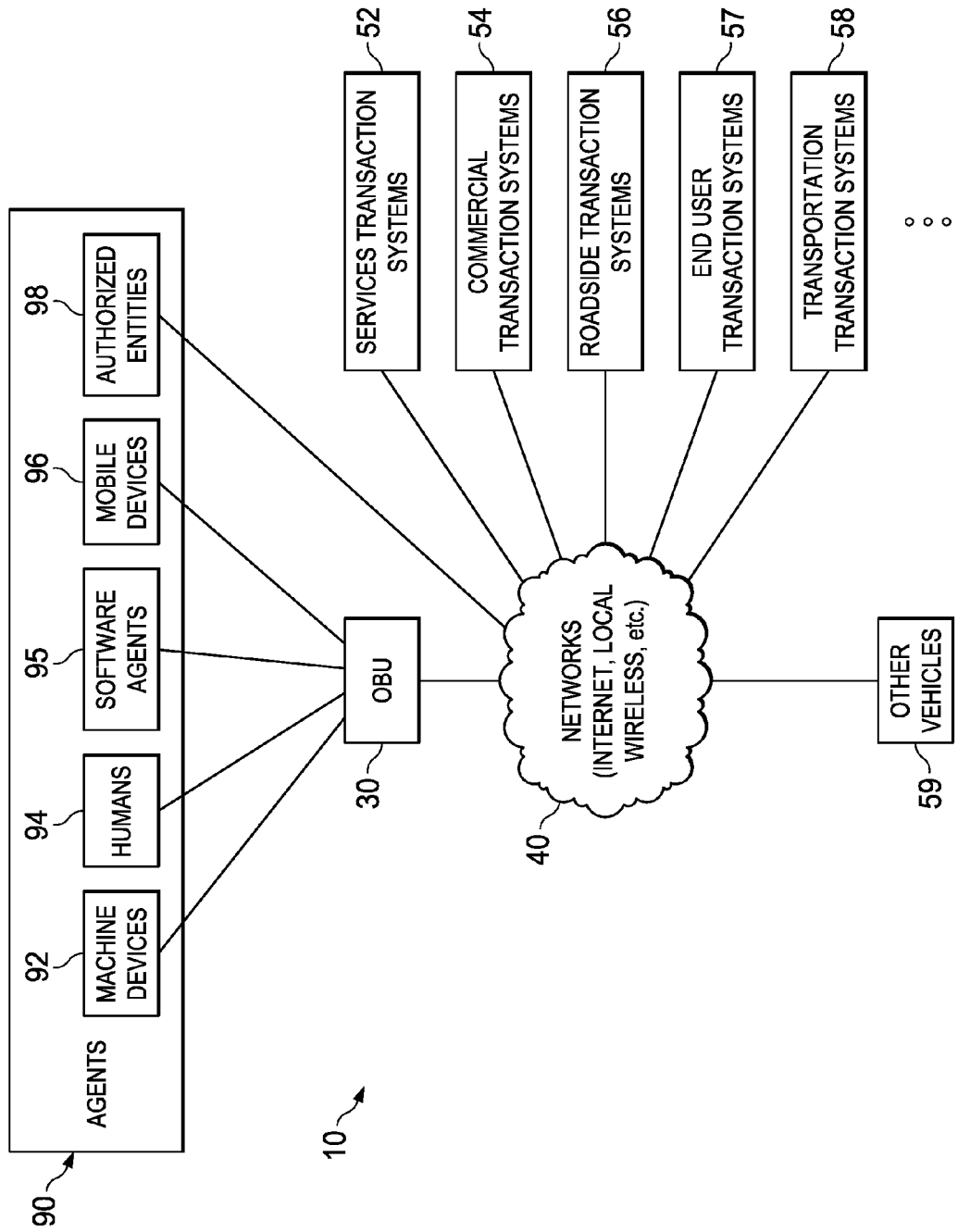
FIG. 2 is a simplified schematic diagram of the communication system in exemplary network environments associated with embodiments of the present disclosure.

Turning to FIG. 2, communication system 10 is illustrated with OBU 30 shown coupled to agents 90 and networks 40. As previously discussed herein, agents 90 can include machine devices 92, humans 94, and mobile devices 96. In addition, agents can also include software agents 95 and authorized entities 98. Software agents 95 can include any application provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.). Note that an 'application' as used herein this Specification, can be inclusive of an executable file comprising instructions that can be understood and processed on a computer, and may further include library modules loaded during execution, object files, system files, hardware logic, software logic, or any other executable modules.

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A node of such authorized entities may typically be remotely located from OBU 30 and, therefore, accessible from OBU 30 through networks 40 such as the Internet or other WANs and any available communication link (e.g., 3G, 4G, WiFi, WiMax, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of accessing the manufacturer's network through a LAN or WLAN. Similarly, when a vehicle 4 is taken to a dealer for maintenance, OBU 30 may connect to the dealer network through a communication link that does not include the Internet or any other wide area network.

Networks 40 may also facilitate communication between certain agents 90 (e.g., machine devices 92, humans 94, software agents 95, mobile devices 96) and transaction systems 50. By way of example, transaction systems 50 may include services transaction systems 52, commercial transaction systems 54, road-side transaction systems 56, end user transaction systems 57, and transportation transaction systems 58 on nodes or other electronic devices. Each of the transaction systems can be associated with many different types of entities and many different transaction scenarios. Services transaction systems 52 can encompass numerous entities providing services such as identity service providers, mobile wireless service providers, banks and other financial institutions, location-based services (LBS), travel agencies, vehicle rental and leasing agencies, Internet websites, etc.

Commercial transaction systems 54 may include entities facilitating commercial transactions through the Internet (e.g., video and music download sites, online retailers, etc.), etc. Road-side transaction systems 56 may include various entities providing road-side services such as gas and electric charging stations, kiosks (both road-side and drive-through), etc. End user transaction systems 57 may include user devices (e.g., mobile devices, laptops, personal computers, cellular telephones, etc.) for communication with OBU 30 through networks 40. Transportation transaction systems 58 may include entities or devices facilitating vehicle charging transactions related to toll payments, ferry charges, bridge toll payments, parking, Vehicle Miles Traveled (VMT), and any other transportation costs incurred as a result of moving vehicle 4 from one location to another. All of transaction systems 50 (e.g., transaction systems 52, 54, 56, 57, 58) as categorized, are provided for purposes of illustration and ease of understanding, and it will be appreciated that certain entities may logically be included in multiple transaction systems (e.g., a bank could be described as both a services transaction system and a commercial transaction system) and that numerous types of transaction systems and entities other than those enumerated herein may also be possible.

Other commercial transactions may occur through OBU 30 by accessing other vehicles 59 (vehicle-to-vehicle commerce). An available network represented by networks 40, may provide a communicative pathway between vehicle 4 and other vehicles 59, where vehicle 4 includes OBU 30 and other vehicles 59 include a suitable communication device (e.g., mobile device, OBU or similar device). The communicative pathway between vehicle 4 and other vehicles 59 could be established as a single hop or multi-hop vehicle-to-vehicle network through WiFi, WiMax, DSRC, or any other suitable wireless technologies allowing a sustained connection between vehicle 4 and other vehicles 59.

Commercial transactions could occur between a mobile device in one vehicle (connected to an OBU) and an OBU in another vehicle, between mobile devices in separate vehicles with OBUs, or between OBUs of separate vehicles. Commercial transactions may also be conducted between OBU 30 and mobile devices 96 (vehicle-to-mobile device commerce), such as when a mobile device purchases content from OBU 30 of the same vehicle. Another type of commercial transaction can include in-vehicle commerce in which a user of a mobile device pays for the use of resources through OBU 30 (e.g., in the case of a passenger in a commercial vehicle such as a taxi cab) or when mobile devices within a vehicle use the network available through OBU 30 to conduct commercial transactions with each other. In addition to commercial transactions, these communicative pathways involving vehicles and mobile devices may also be established for any other suitable services or transactions, providing proper authentication and network credentials are obtained.

Applications installed on OBU 30 can be considered transaction applications and can include a plethora of user-level and system-level applications. With proper authentication to OBU 30 and authorization, numerous types of transactions using the transaction applications may be performed through OBU 30. Generally, types of transactions are inclusive of 1)

accessing one or more wireless/mobile/cellular networks and using network bandwidth and services, 2) gaining access to various resources of the vehicle, 3) gaining access to applications in the vehicle, and 4) engaging in commercial activities (e.g., paying for receiving goods or services, or receiving payment for selling goods or services).

Figure 3:
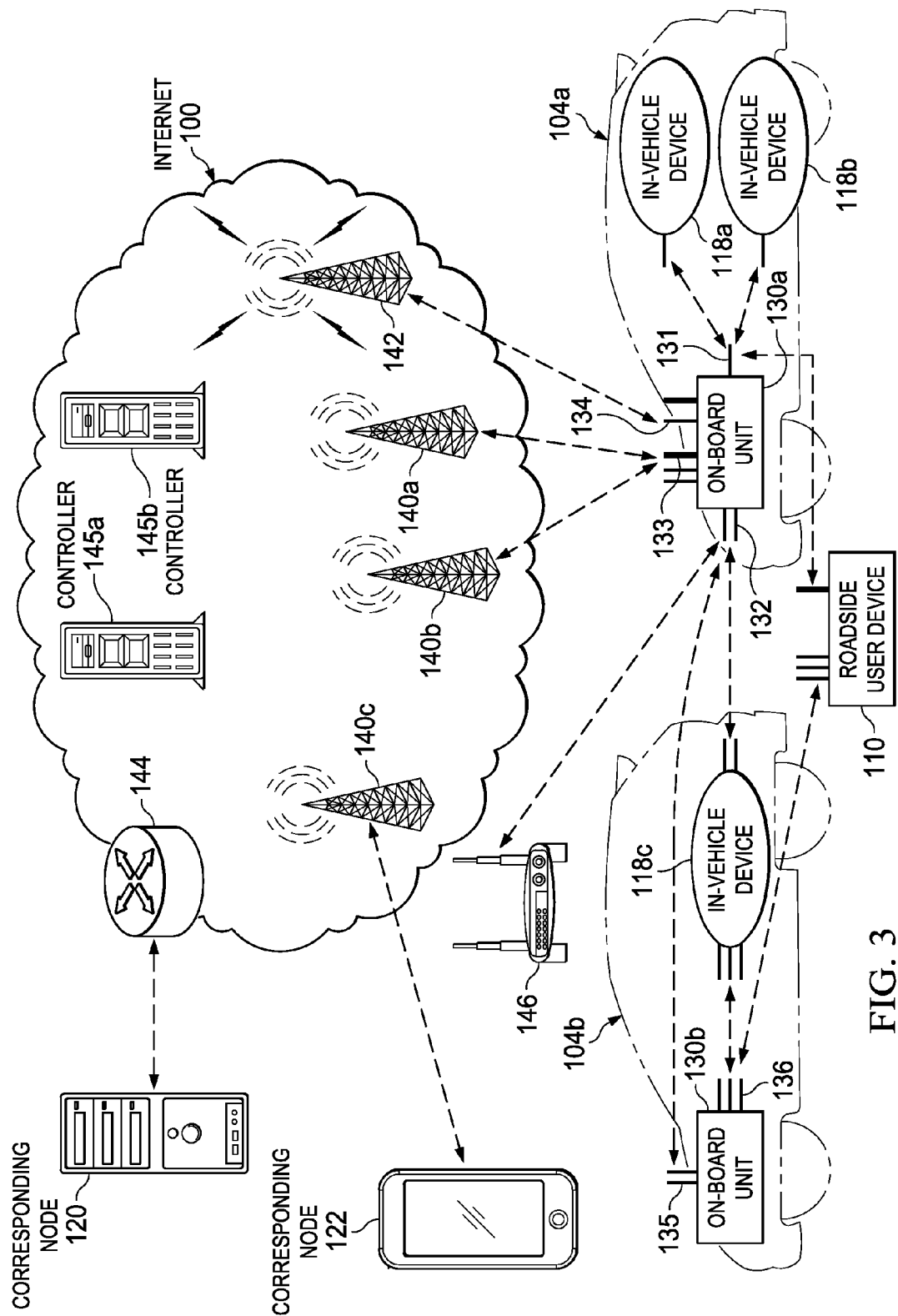
FIG. 3 is a simplified schematic diagram of an exemplary network environment illustrating various access and network interface associations in accordance with embodiments of the present disclosure.

FIG. 3 illustrates an exemplary vehicular network environment, possible data flow, and features by providing example OBUs with various access and network interface associations and various network connectivity. Both OBUs 130a and 130b have interfaces in hub mode and peer mode, and OBU 130a also has interfaces in road-side infrastructure mode for communication with different types of road-side infrastructure devices. Controllers 145a and 145b and two corresponding nodes 120 and 122 are all connected to Internet cloud 100. Although it will be apparent that numerous network connectivity possibilities and mobility scenarios are possible, including more complex and sophisticated arrangements, FIG. 3 provides an example network environment as a frame of reference from which the various features of communication system 10 can be further described and understood.

Network interface association and access interface association, as used herein, include discovery, authentication if necessary, and IP address assignment if any. Access interface association is a process in which an in-vehicle device or a road-side user device, within a wireless coverage area of multiple hub-mode interfaces, selects and associates with one or more of the interfaces. The hub mode interfaces may belong to a single OBU or to different OBUs. Furthermore, they may have the same wireless technology or different technologies, and they may belong to a single management domain or to different management domains.

Access interface association is illustrated in FIG. 3. In-vehicle device 118a of vehicle 104a has a hub mode interface associated exclusively with a hub mode interface 131 of OBU 130a. In-vehicle device 118b also has a hub mode interface associated exclusively with hub mode interface 131 of OBU 130a. In-vehicle device 118c of vehicle 104b has two interfaces. A first interface of in-vehicle device 118c is associated exclusively with a hub mode interface 136 of OBU 130b and a second interface of in-vehicle device 118c is associated exclusively with an interface 132 (having multiple interface modes) of the other OBU 130a. Although each of the hub mode interfaces of in-vehicle devices 118a, 118b, and 118c is associated exclusively with a hub mode interface on one of OBUs 130a and 130b, each of the interfaces of in-vehicle devices 118a, 118b, and 118c could be associated with multiple hub mode interfaces on the same or different OBUs. Road-side user device 110 has two interfaces in which a first interface is associated with interface 136 of OBU 130b, and a second interface is associated with interface 131 of OBU 130a.

FIG. 3 also illustrates some network interface association scenarios. While an OBU interface is in road-side infrastructure mode or in peer mode, the OBU interface may be under the coverage area, respectively, of any number of road-side infrastructure devices or any number of other OBUs and/or other devices in peer mode. Network interface association is the process of selecting and associating with one or more of these interfaces. When an OBU interface is under a coverage area, the interface is considered available for network connectivity. The road-side infrastructure devices and the other OBUs and devices may be the same or different wireless technologies and management domains.

In FIG. 3, both OBU 130a and OBU 130b have an interface in peer mode where a peer mode interface 135 of OBU 130b is associated exclusively with interface 132 of OBU 130a. Interface 132 of OBU 130a is also associated with road-side infrastructure device 146 and in-vehicle device 118c. Road-side infrastructure device 146 could also be connected to one or more other OBUs and/or to Internet 100, for example. OBU 130a includes two additional interfaces in road-side infrastructure mode. One road-side infrastructure mode interface 133 is associated with road-side infrastructure devices 140a and 140b. Another road-side infrastructure mode interface 134 of OBU 130a is associated exclusively with road-side infrastructure device 142. Additionally, the representative corresponding nodes 120 and 122, with which OBUs 130a and 130b may communicate, are shown connected to Internet 100 via gateway 144 and road-side infrastructure device 140c, respectively.

The interfaces shown on OBUs 130a and 130b, road-side user device 110, and in-vehicle devices 118a, 118b, and 118c are shown for example purposes, and these OBUs and devices may each be alternatively configured with more or less interfaces based on particular component configurations and/or needs. In addition, the road-side infrastructure devices 140a, 140b, 140c, and 142 are also exemplary and show possible scenarios of wireless coverage. However, any number of more or less (including none) road-side infrastructure devices may have a wireless coverage area inclusive of a particular OBU interface at any given time and location.

Access and network interface associations can be further divided into two subcategories: 1) Single association (1:1)—one wireless interface associated exclusively with one wireless interface, and 2) Multiple associations (1:n)—one wireless interface associated with multiple (n) wireless interfaces. Different interface association possibilities are described in the table below for an arbitrary interface $I_0$. In one embodiment, for multiple associations (i.e., 1:n), transmissions from $I_0$ to $I_1, \ldots, I_n$ can be unicast, multicast, or broadcast. In addition, a list of corresponding wireless interfaces with which $I_0$ can associate may change over time, thereby potentially necessitating association list updates.

| | Access Interface Selection Hub mode | Network Interface Selection Road-side infrastructure mode | Peer mode |
|---|---|---|---|
| 1:1 | A wireless interface ($I_0$) on an in-vehicle or road-side user device is associated with one wireless interface ($I_1$ in hub mode) on an on-board unit. While $I_0$ is only associated | A wireless interface ($I_0$ in road-side infrastructure mode) on an on-board unit is associated with one wireless interface on a road-side infrastructure ($I_1$). While $I_0$ is only associated with $I_1$, $I_1$ can have other | A wireless interface ($I_0$ in peer mode) on an on-board unit is associated with one wireless interface on another on-board unit or device ($I_1$). $I_1$ is associated only to $I_0$. This is direct peer-to-peer connection between two |

-continued

| Access Interface Selection | Network Interface Selection | |
|---|---|---|
| Hub mode | Road-side infrastructure mode | Peer mode |
| with $I_1$, $I_1$ can have other wireless devices associated with it. | wireless devices associated with it. | interfaces. |
| 1:n A wireless interface ($I_0$) on an in-vehicle or road-side user device is associated with n wireless interfaces ($I_1, \ldots, I_n$ in hub modes) on an on-board unit or on multiple on-board units. Interfaces $I_1, \ldots, I_n$ can have other wireless devices associated with them. | A wireless interface ($I_0$ in road-side infrastructure mode) on an on-board unit is associated with n wireless interfaces ($I_1, \ldots, I_n$) on a road-side infrastructure or on multiple road-side infrastructures. Interfaces $I_1, \ldots, I_n$ can have other wireless devices associated with them. | A wireless interface ($I_0$ in peer mode) on an on-board unit is associated with n wireless interfaces ($I_1, \ldots, I_n$) on another on-board unit/device or on multiple other on-board units/devices. Interfaces $I_1, \ldots, I_n$ can have other wireless devices associated with them. This allows the formation of a multiply connected peer network. |

Figure 4:
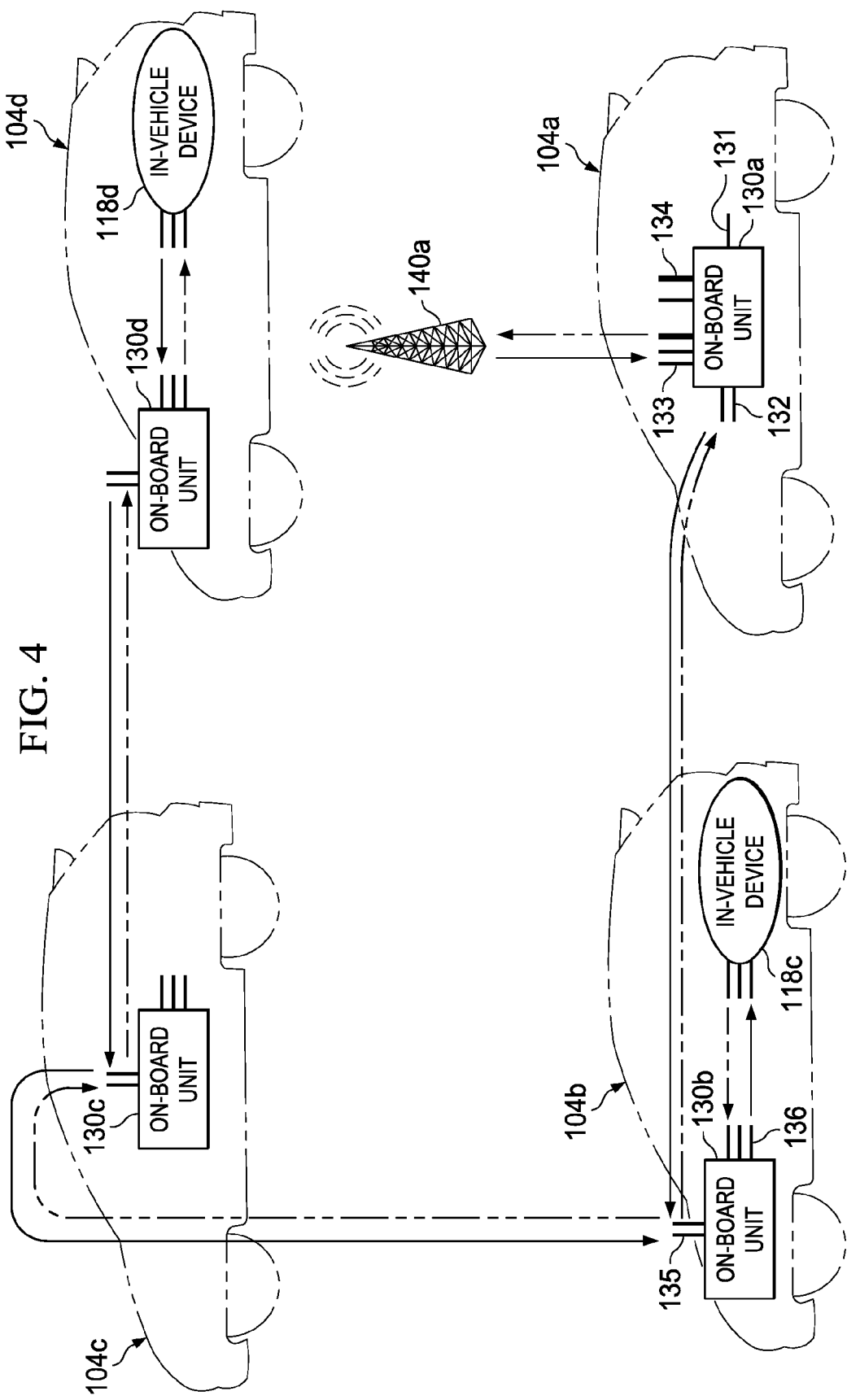
FIG. 4 is a simplified schematic diagram of an exemplary network environment illustrating multi-hop routing associated with embodiments of the present disclosure.

With reference to FIG. 4, FIG. 4 illustrates an example scenario of multi-hop routing through road-side infrastructure or peer-to-peer modes. Traffic from in-vehicle devices can go through multiple OBUs connected in peer-to-peer mode before reaching an OBU for access to network infrastructure. In-vehicle devices and/or road-side user devices can also communicate with one another via multi-hop routing between OBUs connected in peer-to-peer mode. In the example of FIG. 4, multi-hop routing is used to connect in-vehicle device 118c of vehicle 104b to road-side infrastructure device 140a. Packets may be sent from in-vehicle device 118c to OBU 130b via interface 136, OBU 130b may forward the packets from interface 135 to interface 132 of OBU 130a, and OBU 130a may select an interface (e.g., interface 133) for exchanging packets with road-side infrastructure device 140a. Also shown in FIG. 4 is in-vehicle device 118c communicating with in-vehicle device 118d of vehicle 104d using multi-hop routing. Packets may travel between devices 118c and 118d via OBU 130b, OBU 130c, and OBU 130d. Ad hoc routing protocols may be configured to achieve this multi-hop routing in vehicular networks.

Figure 5:
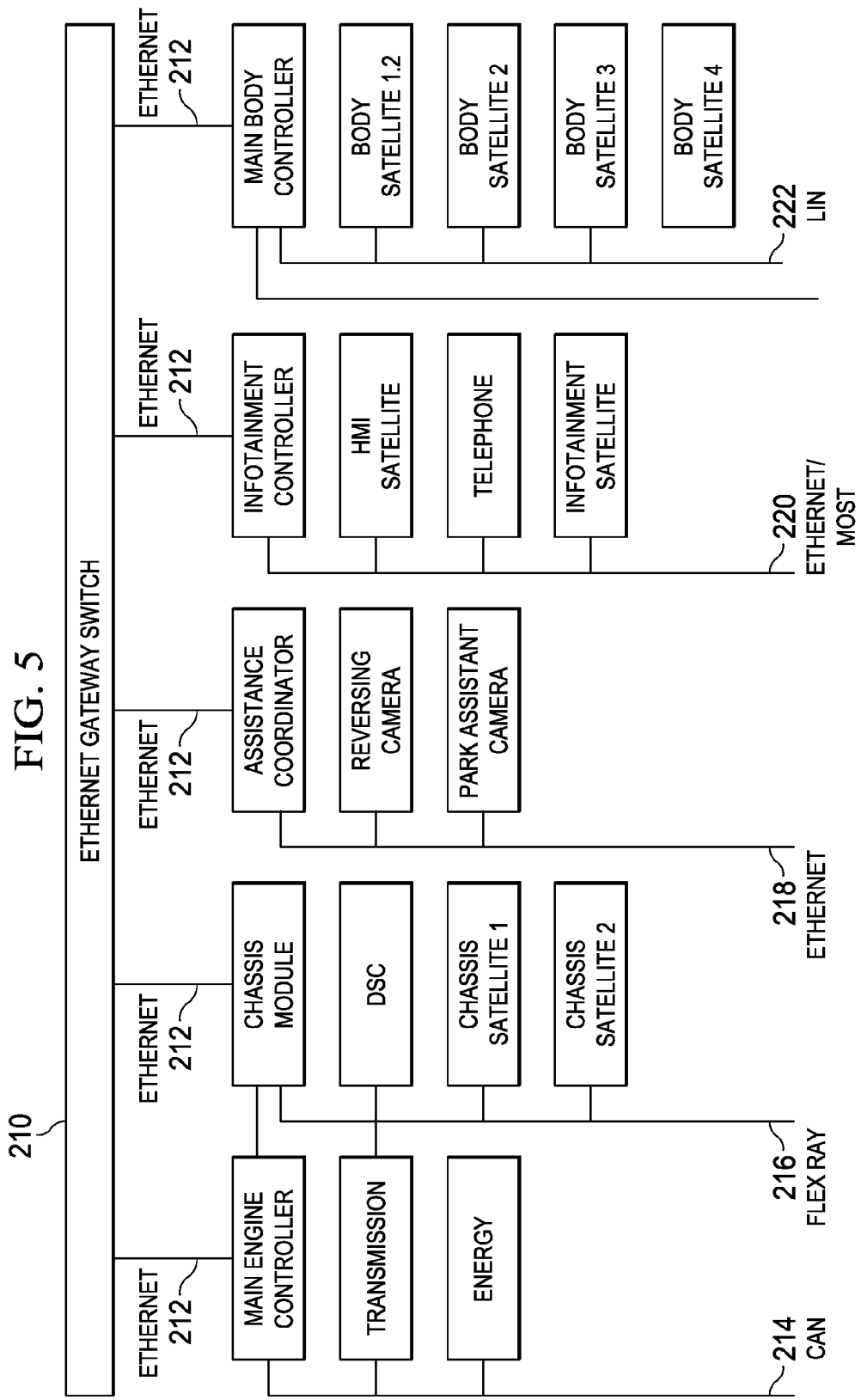
FIG. 5 is a simplified block diagram of an internal network subsystem for enabling communication and access control of subsystems, devices, and data in a vehicle according to an embodiment of the present disclosure.

Turning to FIG. 5, FIG. 5 is a simplified block diagram of an internal network subsystem 200 for enabling communication and access control of subsystems, devices, and data in a vehicle (not shown), such as vehicle 4, according to an embodiment of the present disclosure. The network subsystem illustrated in FIG. 5 includes various machine devices such as vehicle controllers, sensors, actuators, communication devices, infotainment devices, and the like connected through appropriate vehicle subsystem interfaces (e.g. a CAN interface). In the example shown in FIG. 5, vehicle controllers such as main engine controller, chassis module, assistance coordinator, infotainment controller and main body controller are connected to an Ethernet Gateway Switch 210 through Ethernet buses 212. Ethernet Gateway Switch 210 may be implemented integrally with OBU 30 or may be implemented separately, but appropriately configured for communication with OBU 30. Sensors, actuators, and the like, controlled by respective vehicle controllers are connected through various other vehicle subsystem interfaces, including Ethernet buses. For example, CAN bus 214 connects a transmission sensor and an energy sensor to the main engine controller. Flexray 216 connects brakes, dynamic stability control (DSC) and chassis satellites to the chassis module. Ethernet bus 218 connects a reversing camera and a park assistant camera to an assistance coordinator. Ethernet/MOST bus 220 connects HMI satellite, a telephone, and an infotainment satellite to the infotainment controller. Finally, LIN bus 222 connects main body controller to other devices (not shown) and body satellites.

Embodiments of Ethernet Gateway Switch 210 can provide a redundant, scalable, resilient, high availability and secure interconnection across multiple subsystems of the vehicle. In one embodiment, Ethernet Gateway Switch 210 may be implemented in field programmable gate array (FPGA). In another embodiment, Ethernet Gateway Switch 210 may be implemented in application specific integrated circuits (ASIC). Ethernet Gateway Switch 210 may be an audio/video (A/V) Ethernet switch or a Data Center Bridging, or a combination thereof to preserve communication properties such as CAN timing, latency and reliability. A/V Ethernet can enable stronger bandwidth and may be particularly suitable for replacing an entertainment MOST bus. Data Center Bridging may offer new capabilities enabling stronger link virtualization and bandwidth and congestion management.

Ethernet Gateway Switch 210 can translate various protocols, for example, CAN protocol, LIN protocol, FlexRay protocol and MOST protocol, from the different buses and facilitate communication between the different parts of the subsystem, even though the buses use different communication standards or protocols. For example, CAN protocol can be carried over Ethernet using Fiber Channel over Ethernet. Ethernet Gateway Switch 210 can receive a message (e.g., in the form of data packets) in a first protocol, for example, CAN protocol, from an in-vehicle device, for example, a sensor, on the Ethernet network in a vehicle, wherein the message comprises destination information, for example, a vehicle controller. Ethernet Gateway Switch 210 may identify a destination in-vehicle device, for example, a vehicle controller, on the Ethernet network. Ethernet Gateway Switch 210 may encapsulate the message to facilitate translation from CAN protocol to Ethernet protocol before forwarding the message to the vehicle controller via Ethernet buses. It will be appreciated that Ethernet Gateway Switch 210 can facilitate communication between sensors, actuators and vehicle controllers in myriad combinations, for example, between sensors and vehicle controllers, between vehicle controllers and actuators, between sensors and actuators, etc. irrespective of origination protocols.

Ethernet Gateway Switch 210 may implement Time-Triggered Ethernet protocols or Data Center Ethernet protocols, or a combination thereof. Time-Triggered Ethernet guarantees latency and meets time-critical, deterministic or safety-relevant conditions. Data Center Ethernet provides high quality of service, but may not meet exact timing requirement. Thus, Data Center Ethernet protocols and Time-Triggered Ethernet protocols, along with strong coding techniques in the OBU and associated components, can preserve timing, latency, and reliability properties while eliminating current limitations of CAN and other legacy buses. OBU and corresponding components can also implement QoS and traffic management functions to meet the latency and throughput requirements of machine devices communicating via Ethernet to the OBU. Additionally, Ethernet Gateway Switch 210 can support load balancing, and other advanced features applicable to Ethernet networks. Subsystem vendors may be able to design individual subsystems, for example, sensors, actuators, and vehicle controllers based on a reference design of Ethernet Gateway Switch 210 to ensure interoperability.

The Ethernet physical layer may encompass multiple physical media interfaces, for example, coaxial cable, twisted pair, optical fiber and powered cable. Ethernet connections may accommodate several magnitudes of speed ranging from 1 Mbit/s to 100 Gbit/s, and any potentially higher speeds developed in future. Even on a physical layer, multiple virtual lanes may be implemented meeting different QoS and traffic management requirements. Ethernet architecture for connecting machine devices may facilitate IP based Layer 3 networking to all end nodes, including ECUs, and sensors and actuators. An 'end node' as used herein, encompasses nodes that originate data packets in a network flow, and nodes that are a final destination of the data packets in the network flow.

By adopting a switched networking architecture, moving away from more traditional bus based models, the network subsystem can utilize a number of advanced network technologies to achieve a more secure, high performing, and reliable networked system. Examples of advanced networking technologies include automatic routing, multi-pathing, load balancing, access control lists, (ACLs), virtual local area networks (VLANs), sub-nets, network congestion control, network virtualization, automatic copying and redirecting of traffic (SPAN). Such advantages may also lead to savings in cabling and overall costs, increased reliability, scalability, performance, predictability, standardization, security, interoperability and observability. Moreover, Ethernet Gateway Switch 210 can control information exchanges between computing subsystems, leading to centralized network management.

Additionally, using hardware switching elements, as in Ethernet Gateway Switch 210 possibly implemented in FPGAs or small ASICs, relieves the ECUs from having to handle packet forwarding in software, with important utilization improvements. Traditional capabilities supported by even small scale Ethernet switches, such as basic security features, Access Control Lists (ACLs), Policy Based Forwarding, basic QoS, etc., may be available in the vehicular environment. More complex security features, relying on the main gateway CPU complex, can be enabled by some of classification, copying and forwarding features implemented in hardware. Fast rerouting and other reliability features can be implemented with hardware support. Monitoring features such as spanning, providing programmable tapping of specified traffic flows and copying and forwarding to a local or remote logging device can be supported in hardware. Finally, higher overall reliability can be achieved by reducing software intervention. These capabilities enabled by an Ethernet switching architecture may improve overall cost, performance, security, operation, ease of development, and scalability of automotive control systems.

Additional advantages, such as reliability, better processor utilization via multiplexing, improved security, lower cost, development and operation advantages, and better communication among subsystems may also be possible. Locating ECUs, inclusive of virtual ECUs, that need to communicate often with each other on the same computing system, can greatly improve communication without the need to traverse network links. Furthermore, the use of faster Ethernet links to consolidated ECU subsystems can also provide better communication among subsystems.

Turning to FIG. 6, FIG. 6 is a simplified block diagram of three possible embodiments of using Ethernet in vehicle internal subsystems. The three possible embodiments may each be used as a single approach in a vehicle internal subsystem, or may be implemented in any suitable combination. In the embodiments, legacy bus architectures have converged into a single networking technology based on Ethernet. Ethernet connectivity in these example embodiments can facilitate consolidation of multiple ECUs and functional subsystem onto a smaller number of stronger, multi-core and/or virtualized CPUs.

According to the embodiments, vehicle controllers and the respective sensors and actuators may be grouped together into virtual control groups called Electronic Control Unit (ECU) Group. For example, main engine controller, transmission sensor and energy sensor may be grouped into ECU Group 224a, and main body controller, chassis module, and DSC may be grouped into ECU Group 224b. The grouping may be based on functionality or proximity. Devices with similar functionalities, for example, main engine controller, transmission sensor and energy sensor, may be grouped together, and separate from other devices with different functionalities. Alternatively, devices that are proximate each other inside a vehicle may be grouped together if the devices are related in functionalities, for example, the devices act together to stop the moving vehicle. Each ECU Group may have its own local Ethernet switch to connect the various machine devices of the subsystem. For example, ECU Group 224a has local Ethernet switch 226a that connects the main engine controller with the transmission sensor and energy sensor. Similarly, local Ethernet switch 226b connects the main body controller with DSC and chassis module inside ECU Group 224b. ECU Groups 224a and 224b can be connected to Ethernet Gateway Switch 210 over Ethernet interfaces 232.

The need for communication between physical and/or virtual ECUs and sensors and actuators continues to grow. For example, ECUs may need to receive information for particular sensors and may need to send commands to various actuators. In embodiments of the present disclosure, sensors and actuators in the vehicle may be classified as "smart objects", with each sensor device being built around small computers/CPUs with a sensor or actuator element and a communication device, all embedded in vehicle components, for example, thermometers and car engines. Sensors and actuators are grouped for ease of description in FIG. 6 into sensor group 228a, 228b and 228c.

In a first embodiment according to FIG. 6, sensor group 228a may be connected bi-directionally to vehicle controllers and other sensors and actuators, for example, ECU Group 224a, through a wireless or a wired link 230. Wireless links may be via Bluetooth, Zigbee, IEEE 802.11 WiFi, WiFi Direct, 60 GHz or IEEE 802.15.4 radio, or other wireless interfaces. Wired links may include Ethernet lines, power lines or traditional LIN and CAN buses. Sensor group 228a may be connected to ECU Group 224a, which may have IP based architecture, through a protocol translation gateway model, for example, through dedicated sensor gateway 234. Dedicated sensor gateway 234 translates CAN or LIN protocol to Ethernet protocol before sending traffic on to ECU Group 224a. However, sensor gateway 234 may suffer from some disadvantages inherent to protocol translation gateways.

Protocol translation gateways may be inherently complex to design, manage, and deploy. It may also result in network fragmentation, as different parts of the network communicate using disparate communication protocols, leading to non-efficient networks because of inconsistent routing, QoS, transport and network recovery techniques. An end-to-end IP architecture, for example, Ethernet/IP, can provide scalable and efficient networks of large numbers of communicating devices. IP can provide standardized, lightweight, and platform-independent network access to smart objects and other embedded networked devices. The use of IP can make sensor devices accessible from anywhere and from other nodes, for example, general-purpose computers, cell phones, PDAs as well as database servers and other automated equipment.

In a second embodiment according to FIG. 6, a set of Ethernet interconnected sensors, represented by sensor group 228b, may be individually addressable and shared and reachable by ECUs in the vehicle, and by remote accessing entities. Sensors and actuators grouped into sensor group 228b may be connected directly to Ethernet Gateway Switch 210 via Ethernet bus 232, which may have the full potential of sharing and connectivity and other advantages of Ethernet connectivity. Sensors and actuators in sensor group 228b may also be connected to remote accessing entities, for example, a vehicle OEM Data Center, via a Satellite Ethernet Switch 236. Sensor group 228b may communicate with vehicle controllers and other sensors and actuators, for example, in ECU Group 224a and 224b, via Ethernet Gateway Switch 210. Access control and bandwidth management may be implemented to handle any potential contention of shared resources among the machine devices in the Ethernet network.

In a third embodiment according to FIG. 6, Ethernet connectivity is introduced to a set of dedicated sensors, represented by sensor group 228c. Sensor group 228c may be connected bi-directionally to vehicle controllers and other sensors and actuator, for example, ECU Group 224b, through a wireless or a wired link 230. In an example embodiment, sensor group 228c can be connected to ECU Group 224b via an Ethernet bus. Wireless links may be via Bluetooth, Zigbee, IEEE 802.11 WiFi, WiFi Direct, 60 GHz, Ultra-wideband (UWB), or IEEE 802.15.4 radio, or any other suitable wireless technologies. Sensors in sensor group 228c may also be connected to remote accessing entities, for example, a vehicle OEM Data Center, via a Satellite Ethernet Switch 236. Other vehicle controllers and sensors (not shown) may be connected to each other and to sensor group 228c and ECU Group 224b via traditional bus systems, for example, CAN and LIN through dedicated sensor gateways.

FIG. 7 shows a layered IP architecture 240. IP block 242 runs over virtually any underlying communication technology, for example, high-speed wired Ethernet links 244, low-power 802.15.4 radios 246, 802.11 (WiFi) equipment 248 and GPRS/3G interfaces 250. For long-haul communication, IP data is readily transported through encrypted channels for example, through TCP/UDP protocols, shown in block 252, to Applications 254 running on the global Internet. Such IP-based sensor/actuator architecture may provide a wide range of advantages, for example, high performance, low cost, increased reliability, high flexibility, and increased security. Moreover, sensors could be made remotely accessible securely, or they could be much more easily shared across functional subsystems on the same vehicle.

Figure 8:
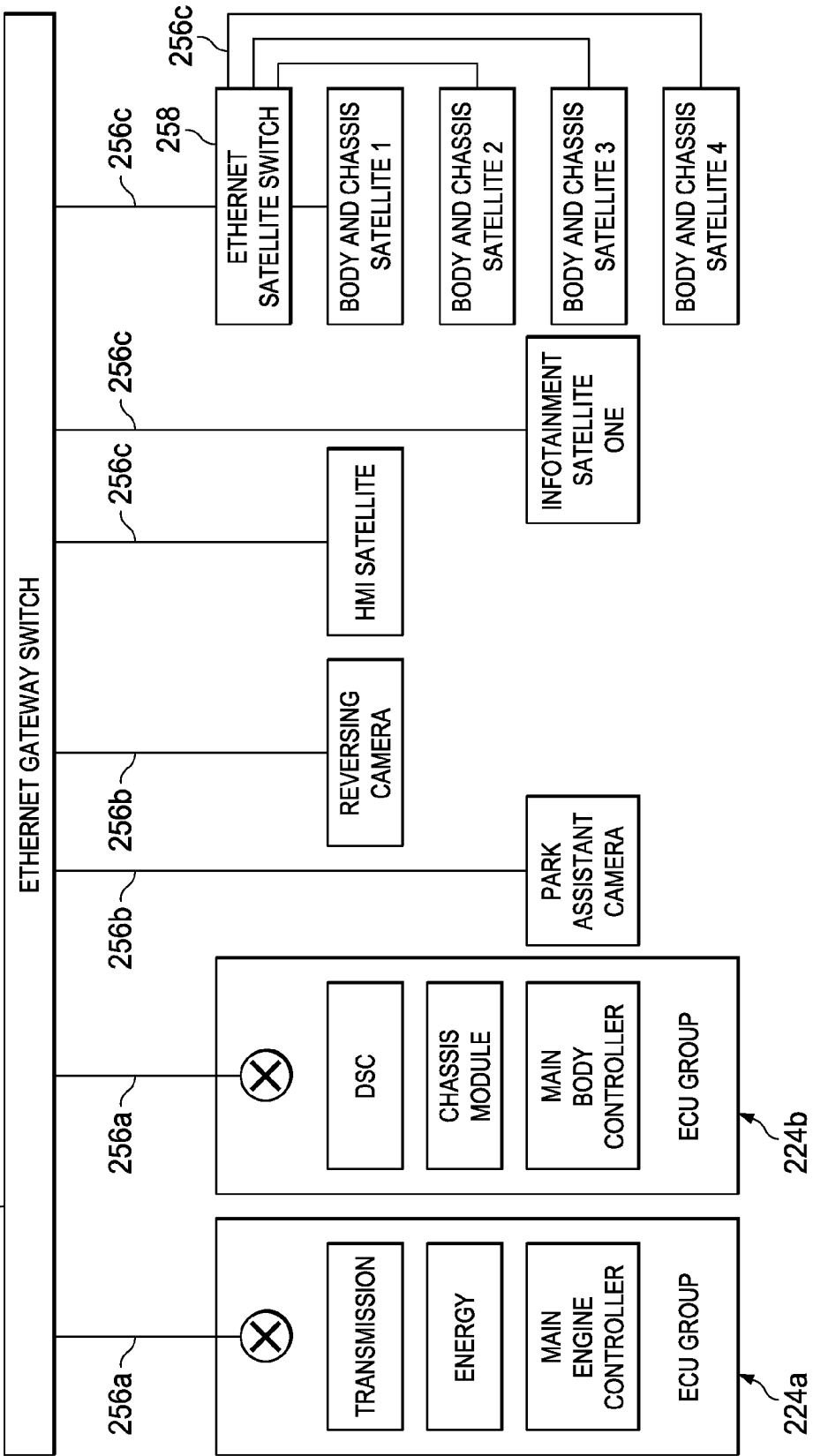
FIG. 8 is a simplified block diagram of an internal network subsystem for enabling communication and access control of subsystems, devices, and data in a vehicle through Ethernet connections according to an embodiment of the present disclosure.

Turning to FIG. 8, FIG. 8 is a simplified block diagram of an internal network subsystem 200 for enabling communication and access control of subsystems, devices, and data in a vehicle through Ethernet connections according to an embodiment of the present disclosure. In one example embodiment, multiple ECUs and functional subsystems may be consolidated onto a smaller number of stronger, multi-core and/or virtualized processors, represented in FIG. 8 by ECU Groups 224a and 224b.

In the example embodiment shown in FIG. 8, ECU Groups 224a and 224b are connected to Ethernet Gateway Switch 210 over Ethernet buses 256a. Ethernet Gateway Switch 210 may potentially control all information exchanges between computing subsystems. Other machine devices of the vehicle, for example, reversing camera, and park assistant camera may be connected to each other and to other vehicle components via Ethernet buses 256b through Ethernet Gateway Switch 210. Satellite subsystems may also be connected through Ethernet bus 256c in accordance with the present disclosure. For example, HMI satellite and infotainment satellite may be connected to Ethernet Gateway Switch 210 via Ethernet buses 256c. Body and chassis satellites may be connected to each other through local Ethernet buses 256c and to Ethernet Gateway Switch 210 through Ethernet Satellite Switch 258. Ethernet connections between vehicle subsystem interfaces, including Ethernet bus 256c, may be Ethernet over power line connection (PLC), single twisted pair or low speed Ethernet cable. Ethernet Satellite Switch 258 may be a low cost Ethernet switch that supports extension of connectivity efficiently using hardware towards the periphery of vehicle control systems. Other machine devices in the vehicle (not shown), for example, assistance coordinator, infotainment controller and telephone may be hosted on a processor in OBU 30.

Machine devices inside the vehicle may be individually addressable and accessible to remote nodes via Ethernet Satellite Switch 258 through Ethernet and IPv6 routing technologies in network subsystem 200. Additionally, all the vehicle internal components may implement security features, for example, identity authentication, zoning, virtualization, firewalls, VLANs, IP filters and encryption to protect the vehicle internal components, including machine devices, from being compromised by remotely accessing entities or any internal entities (e.g., other machine devices, applications on OBU, etc.) trying to infringe into another internal entity. This may require implementing gateway, routing, application VPN, encryption, object level security, identity, strong authentication and access policies features, and other appropriate security features over WiFi, cellular, or any other suitable wireless connectivity also, because components in the vehicle, including some machine devices, may communicate with remote nodes over wireless interfaces, for example, through Ethernet Satellite Switch 258. In addition, implementing Ethernet and IP with an OBU may permit high speed multimedia traffic inside the vehicle. Thus, the network architecture of internal vehicle subsystem 200 may be visualized as similar to data center architecture over Ethernet, including associated data center technology elements such as: 1) enabling multiple traffic types share a common Ethernet link without interfering with each other, e.g., using priority flow control (PFC) through IEEE 802.1Qbb; 2) enabling consistent management of QoS at a network level by providing consistent scheduling, e.g., through implementing IEEE 802.1Qaz; 3) managing end-to-end congestion for L2 network, e.g., through implementing IEEE 802.1Qau; 4) enabling management protocol such as data center bridging exchange protocol (DCBX) for enhanced Ethernet capabilities; and 5) implementing L2 multipath for unicast and multicast to increase bandwidth, and multiple paths with no spanning tree.

Figure 9:
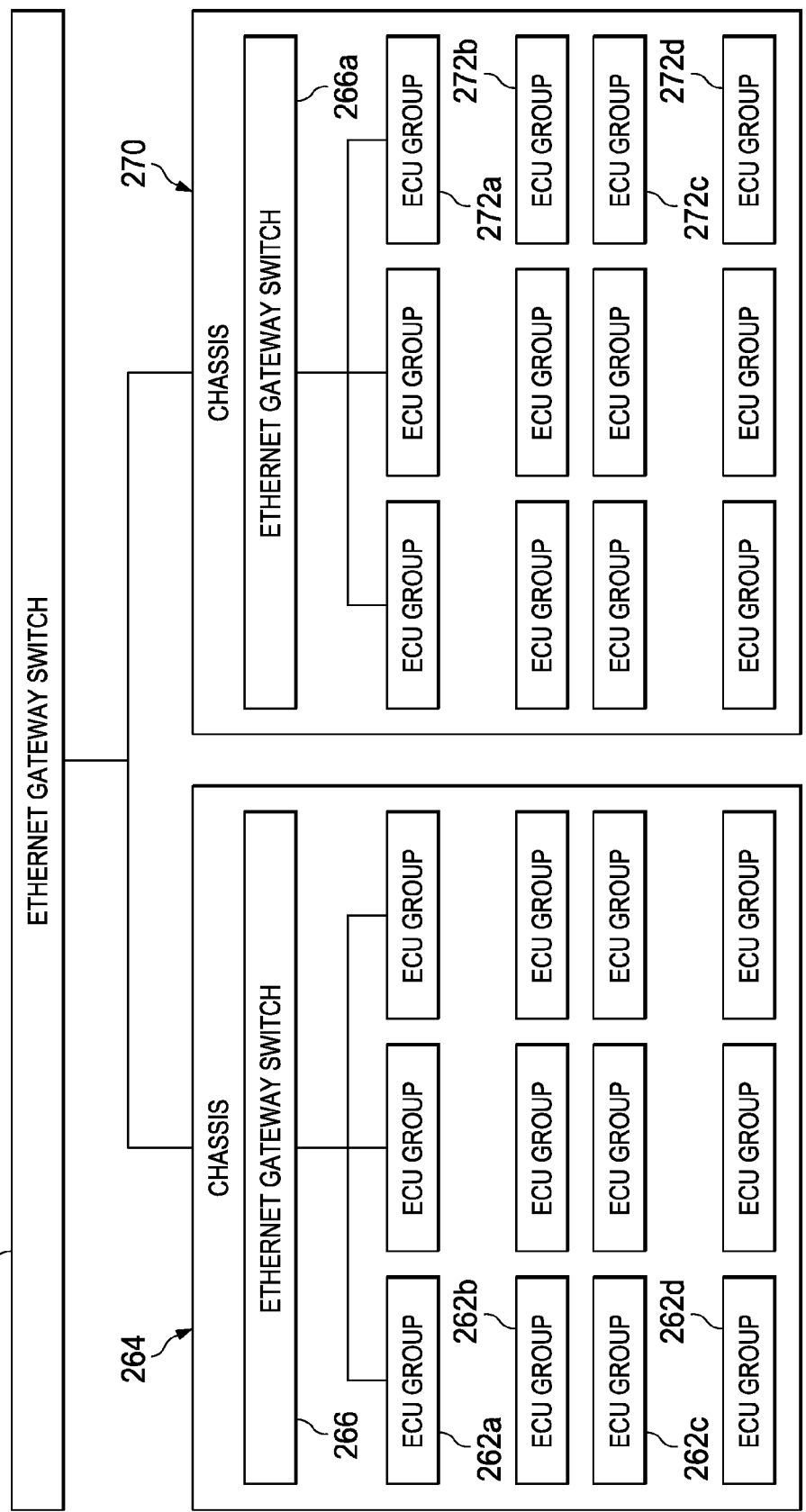
FIG. 9 is a simplified block diagram of an internal network subsystem according to an embodiment of the present disclosure.

FIG. 9 depicts internal network subsystem 200 with modular vehicular computing systems as similar to "data center racks" with standard interfaces (e.g., Ethernet) towards the networking and storage sides and also towards the sensor and actuator side. In an example embodiment, data center bridging technology may be applied in internal network subsystem 200, utilizing Ethernet as the network protocol for communications between devices inside a vehicle. Different ECU Groups 262a-d may be grouped together, similar to server blades in a data center, into a chassis 264. ECU Groups 262a-d communicate with each other and with other devices through Ethernet switches, which may be local to the ECU Group, external to the ECU Group, for example, Ethernet Gateway Switch 266, or external to the chassis, for example, Ethernet Gateway Switch 268. Chassis 264 could be connected to chassis 270 through external Ethernet Gateway Switch 268, and local Ethernet switches (not shown) may facilitate communication between vehicle controllers and devices within each ECU Group 262a-d.

ECU Groups 262a-d may be physically distinct components, or alternatively, they may be virtually distinct components hosted on a single physical device, for example, a semiconductor multi-core CPU. For example, multiple ECU Groups may be allocated to different cores based on different control functions and/or virtualized as different virtual machines on a virtualized processing system, allowing multiple operating systems to co-exist on the same machine. ECU Groups 262a-d are separate and distinct from ECU Groups 272a-d that are grouped together into chassis module 270. Despite the separate virtual groupings, the ECU Groups may be together on the same computing system. Such computing virtualization can have many advantages, including permitting use of the same module, for example, CPU, across multiple vehicle controllers, for example, main engine controller and main body controller.

Each ECU Group 262a-d may have its own memory, network interface, storage and computational resources, or ECU groups may share these resources through Ethernet Gateway Switch 268. Each ECU in an ECU Group 262a-d and 272a-d may have one or more functionalities. More flexible, higher access bandwidth, shared and partitioned memory may bring large scalability, performance, cost, and even security improvements. For example, ECU Group 262a may be dedicated to storage, and another ECU Group 262b may be dedicated to computational processes inside network subsystem 200. Main engine controller inside ECU Group 262c may call upon the storage capabilities of ECU Group 262a and computational capabilities of ECU Group 262b to perform certain actions with its transmission and energy sensors through the respective local Ethernet switch and Ethernet Gateway Switch 266. Simultaneously ECU Group 272a, comprising DSC, may call upon the same ECU Group 262a for storage through Ethernet Gateway Switches 266a, 266 and 268. Thus, multiple ECU Groups could share the same storage resources inside network subsystem 200.

Turning to FIG. 10, FIG. 10 is a simplified block diagram of virtualized multi-core ECUs of an internal network subsystem 200 in a vehicular environment. Because ECU Groups are virtual machines that may be easily duplicated on different cores of the same device, or cores of different devices, locating multiple ECU Groups on single multi-core device or on multiple multi-core devices can facilitate redundancy. In one embodiment, the devices are high performance semiconductor chips. For example, ECU Group 282a may be duplicated in a separate core as ECU Group 282b. ECU Groups 282a and 282b may perform substantially the same functions. For example, both ECU Group 282a and 282b may be operable to perform a function of communicating control signals between a main engine controller, a transmission sensor and an energy sensor. Redundant ECU Group 282b may be dormant when ECU Group 282a is functional. Both ECU Group 282a and ECU Group 282b can be connected to Ethernet Gateway Switch 290a. If ECU Group 282a loses functionality, or cannot performs its function, for example, communicating control signals between a main engine controller, a transmission sensor and an energy sensor, Ethernet Gateway Switch 290a may identify ECU Group 282b as a second ECU that can perform substantially the same function as ECU Group 282a. Ethernet Gateway Switch 290a can quickly and seamlessly switch traffic to ECU Group 282b, facilitating computational redundancy.

Similarly, network redundancy may also be facilitated by using virtual links. Virtualization can provide many benefits, including permitting multiple protocols inside the same link, by multiplexing at the starting point and de-multiplexing at the termination point. Also, multiple traffic flows in the same Ethernet link can be encapsulated, separated in terms of bandwidth allocation precisely and securely, by using virtualized lanes. Link Virtualization and QoS support can enable effective sharing of a single link among multiple applications, or multiple control subsystems in a vehicle. Link virtualization, enabling shared higher bandwidth links, may provide reduced cabling cost and weight, and improve scalability and performance. Link virtualization and QoS may be provided in Ethernet connections in the form of VLANs and port or VLAN QoS, with basic traffic scheduling, potentially including weighted bandwidth allocation and shaping.

In particular, these features may enable the use of virtual links, or lanes, within a physical link, as independent links, governed by their independent flow control, to prevent losses, to which a well defined access to bandwidth can be guaranteed by a flexible and precise scheduler. Priority flow controls can enable multiple traffic types to share a common Ethernet link without interfering with each other. Bandwidth management can enable consistent management of QoS at the network level by providing consistent scheduling. An end-to-end congestion management scheme can also prevent internal deadlock in the network, and control flow through rate control at the edges of the network. In addition, L2 Multi-Pathing standard may allow use of multiple links, using load balancing and fast adaptation to potential link failures. These features can offer latency performance and lossless delivery, when needed. Moreover, a stronger level of reliability can be achieved by designing in redundant paths to reach each virtualized ECU Group.

Ethernet Gateway Switch 290a may be replicated inside OBU 30 as Ethernet Gateway Switch 290b. Redundant Ethernet Gateway Switch 290b can be connected to all the ECUs and other vehicle components, including machine devices and OBU 30, similar to master Ethernet Gateway Switch 290a. Thus, Ethernet Gateway Switch 290b may substantially replicate connections to other components, including machine devices and OBU 30, in the Ethernet network. For example, both Ethernet Gateway Switch 290a and Ethernet Gateway Switch 290b can be connected to ECU Group 282a and ECU Group 284 via Ethernet connections 292 and redundant connections 294. If Ethernet Gateway Switch 290a becomes non-functional, for example, Ethernet Gateway Switch 290a cannot transmit data packets without loss, ECU Group 282a and ECU Group 284 may detect this and can switch traffic to redundant Ethernet Gateway Switch 290b. Alternatively, if traffic from Ethernet Gateway Switch 290a is too high for ECU Group 282a, it may switch to redundant Ethernet Gateway Switch 290b to continue communication seamlessly.

According to example embodiments, ECU Group 284 may identify Ethernet Gateway Switch 290a on the Ethernet network and determine if sending a data packet to an in-vehicle device, for example, a sensor, requires sending the data packet through Ethernet Gateway Switch 290a. ECU Group 284 may also check connectivity of Ethernet Gateway Switch 290a and determine whether it is capable of receiving and transmitting the data packet without loss. If Ethernet Gateway Switch 290a cannot receive and transmit the data packet without loss, ECU Group 284 may identify Ethernet Gateway Switch 290b, which may substantially replicate connectivity of Ethernet Gateway Switch 290a as a second Ethernet switch through which to send the data packet. ECU Group 284 may transmit the data packet to the in-vehicle device, for example, the sensor, through Ethernet Gateway Switch 290b.

Thus, internal networking subsystem 200 can use a variety of different protocols, for example, CAN, LIN, MOST and Ethernet, to facilitate communication between devices inside the vehicle. Note that Ethernet gateway switches (210, 290a, 290b, and 268) of FIGS. 5-10 represent various embodiments of Ethernet gateway switch 70 of vehicle 4 and is intended to be suitably coupled to OBU 30. Moreover, Ethernet gateway switches 290a, 290b and 268, while implemented in other embodiments, can include the same features, properties, and advantages as Ethernet gateway switch 210. Ethernet connectivity facilitates scalable, high performing, secure, low latency traffic inside the vehicle. In particular, traffic from machine devices may be accessed by remote nodes (e.g., a manufacturer or OEM data center).

Turning to external communication in the vehicular environment, FIG. 11 illustrates communication system 10 with OBU 302 inside vehicle 304 shown coupled to in-vehicle devices 306a and 306b and remote nodes 308a and 308b through controller 310 over network cloud 312, for example, the Internet. Controller 310 can be a counterpart to OBUs and generally refers to one or more network elements in the cloud that perform connection management, mobility, optimization functions, and service proxy functions related to an OBU such as OBU 302. Controller 310 can be implemented in a centralized or distributed manner in network cloud 312. In one example embodiment, the various components illustrated in FIG. 11 may communicate with each other using TCP. OBU 302 may utilize multiple wireless communication links 314a and 314b, which represent different wireless access technologies such as Wi-Fi and 3G. OBU 302 can also be configured with a mobility solution to seamlessly migrate traffic from one wireless technology to another (e.g., from communication link 314a to communication link 314b).

As a network interface changes (e.g., changes from Wi-Fi to 3G, or changes from 4G to Wi-Fi, etc.) the characteristics of the TCP path may also change. For example, the new path could have a different signal strength, loss characteristics, end-to-end delay characteristics (e.g., round trip time (RTT), congestion window (CWIN), etc.), or throughput. Additionally, a vehicular network environment can also be characterized by frequent mobility events including hard handoffs that typically result in TCP packet losses. To prevent data loss when path characteristics change, OBU 302 can dynamically monitor the link quality of new communication link 314b, for example its signal-to-noise ratio (SNR), and intelligently steer the transport behavior using cross layer optimization to improve TCP performance by avoiding or minimizing non-congestion related losses. Moreover, transport behavior can be dynamically tuned based on historic and current link quality In exemplary embodiments, OBU 302 may be configured to optimize TCP performance by hiding underlying mobile conditions from end nodes, for example, in-vehicle devices 306a-b, and remote nodes 308a-b, and intelligently guiding them to utilize all available bandwidth. OBU 302 may also allocate available bandwidth fairly and efficiently among end nodes, for example, in-vehicle devices 306a-b, and remote nodes 308a-b. Accordingly, optimization techniques of the present disclosure enable conservation of bandwidth and increased throughput between controller 310 and OBU 302. Legacy applications may benefit from new L4 through L3 services without involving changes to source code of applications running on end nodes. According to embodiments of the present disclosure, optimization techniques may be implemented at a network level (e.g., on OBU 302), without relying on any modifications to end nodes, for example, in-vehicle devices 306a-b, and remote nodes 308a-b. In example embodiments of the present disclosure, optimization techniques may be implemented to leverage link quality information to implement QoS, accurately track changes in link bandwidth, and allow OBU 302 to act as a proxy for TCP options and services.

According to embodiments of the present disclosure, OBUs may implement a middlebox optimization technique based on continuous monitoring of a wireless link quality. Using this cross-layer feedback, example embodiments may solve the problem of improving delivery of TCP segments over wireless links. Such improvement may not be performed at end nodes, but in a network, by monitoring flows and modifying TCP headers to change a data rate based on current link quality. A middlebox (e.g., OBU 302) may use link quality to tune bandwidth obtained by end nodes, for example, by regulating a receiver window in a TCP header. In an example embodiment, OBU 302 may leverage link quality information (e.g., measured in a middle of a network) to tune TCP receiver window, which can limit bandwidth obtained by an end node. In addition, in example embodiments, OBU 302 may act as a proxy for TCP options/services. If end nodes do not support certain transport options, OBU 302 can be used to transparently process transport options on behalf of end nodes.

Figure 12:
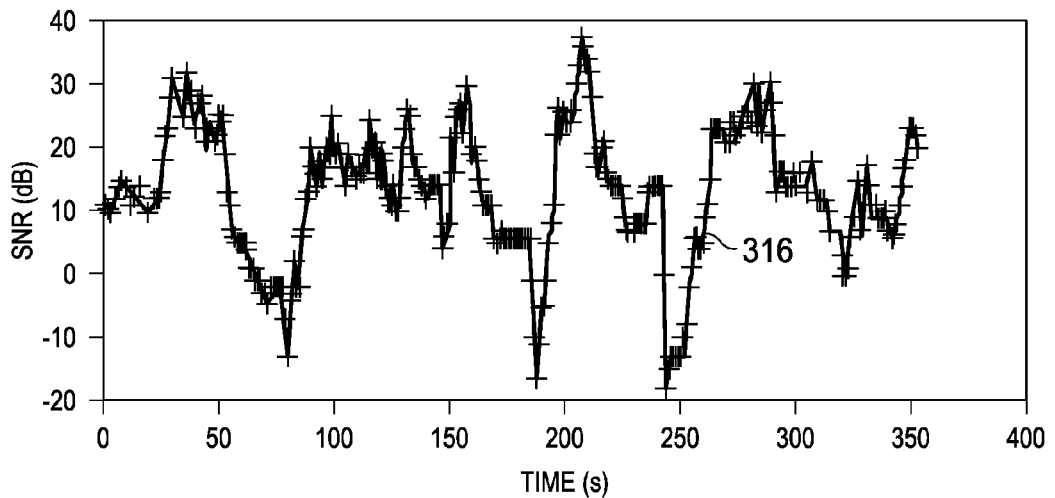
FIG. 12 is a plot of signal-to-noise ratio (SNR) of a Wi-Fi interface over time in an exemplary network environment in accordance with embodiments of the present disclosure.

Turning to FIG. 12, FIG. 12 is a plot of SNR (measured in decibels (dB)) 316 of a Wi-Fi interface over time (measured in seconds) as a vehicle moves from one wireless access point to another wireless access point. At around 70 seconds, SNR 316 drops and quickly recovers in a matter of a few seconds, and the pattern is repeated randomly as the vehicle moves. This change in SNR 316 happens quickly, in a matter of few seconds, and continues over the entire period of the TCP flow between a sender and a receiver.

Generally, TCP can be slow to adapt to bandwidth changes. As a vehicle moves quickly in and out of range of road-side infrastructure device (e.g., a wireless access point or base station), TCP's congestion control mechanism (e.g., AIMD-based congestion control, etc.) can fail to quickly adapt to the available bandwidth. As the vehicle and OBU 302 move closer to a road-side infrastructure device, available bandwidth increases. However, TCP may be slow to sense the increase and, consequently, slow to increase the sending rate. As the vehicle (and OBU) moves away from the road-side infrastructure device, the link quality may quickly degrade and TCP may be slow to adapt to the lower bandwidth. This delay can result in packet losses causing TCP timeouts and reduced CWIN.

Figure 13:
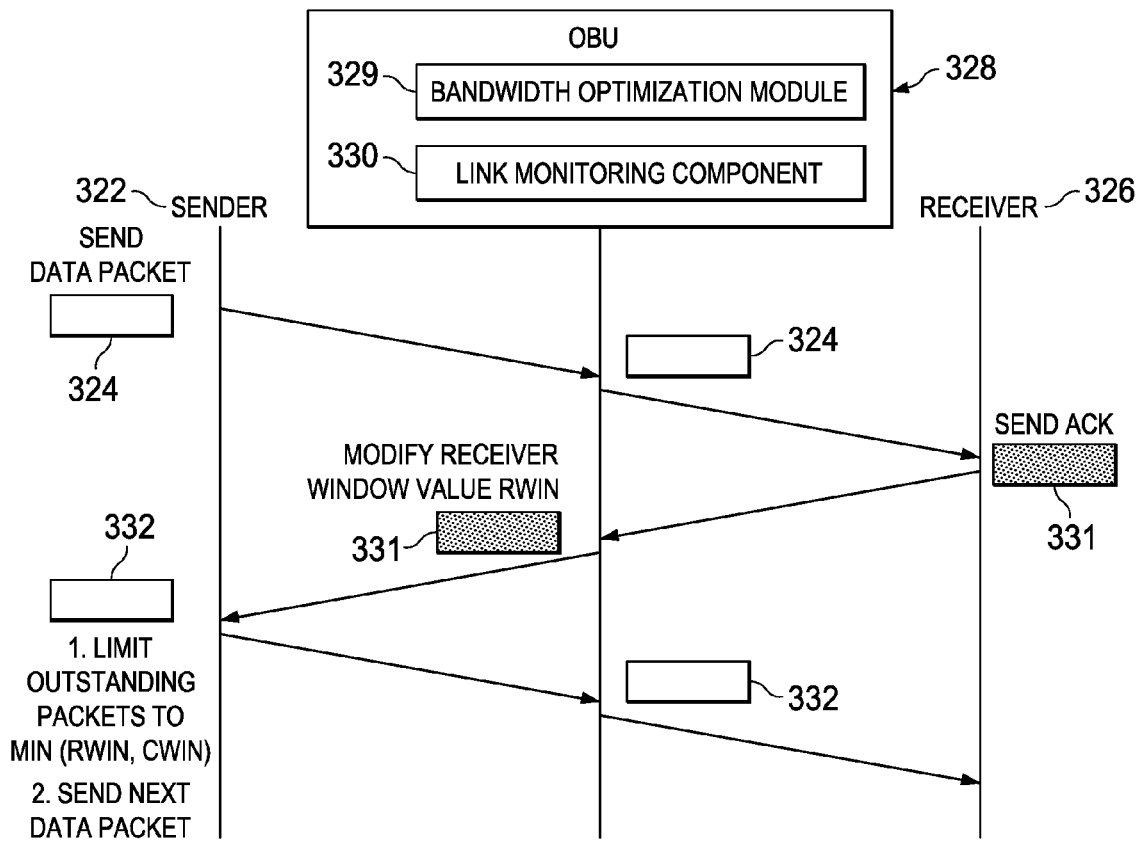
FIG. 13 is a sequence diagram of a TCP flow of a communication system in exemplary network environments associated with embodiments of the present disclosure.

Turning to FIG. 13, FIG. 13 is a sequence diagram of a TCP flow 320 of communication system 10 between a sender 322 and receiver 326 in exemplary network environments associated with embodiments of the present disclosure. As used herein, the term 'sender' encompasses nodes that send data packets to a receiver, and the term 'receiver' encompasses nodes that receive data packets from a sender. In one example embodiment, sender 322 and receiver 326 may be end nodes, wherein sender 322 initiates transmission of data packets and receiver 326 is a final destination of the data packets. Sender 322 may send a data packet 324 to a receiver 326 through an OBU 328. Embodiments of OBU 328 can include a bandwidth optimization module 329 and a link monitoring component 330, which enable the control of bandwidth allocated to endpoints (e.g., sender 322 and receiver 326). The control of bandwidth allocation can be achieved transparently based on policy settings. Thus, an OBU in a vehicular network environment may allocate bandwidth depending on the nature of traffic flows and/or policy settings. In particular configurations, OBU may temporarily stop connections based on predictions of link outages, thereby avoiding timeouts in many cases, preventing packet losses, and recovering more quickly after an outage is over.

When receiver 326 receives data packet 324, it responds with an acknowledgement (ACK) packet 331. ACK packet 331 contains information about the maximum data the receiver can handle, called the receiver window size (RWIN). For example, RWIN size may be determined by the receiver's buffer size. OBU 328 forwards ACK 331 containing RWIN to sender 322. Sender 322 limits its outstanding data packets to the minimum of RWIN and congestion window size (CWIN). CWIN is the maximum number of packets that can be handled by any given network. When sender 322 receives ACK 331, it sends next data packet 332 based on the minimum of RWIN and CWIN. Consequently, a TCP flow's effective bandwidth may be determined by the minimum of RWIN and CWIN.

In one embodiment, link monitoring component 330 of OBU 328 can continuously sense the current link quality. When OBU 328 receives ACK 331, link monitoring component 330 may measure SNR of the applicable wireless interface and bandwidth optimization module 329 may quickly adapt transport behavior by modifying the RWIN value in ACK 331 based on current link quality of the network connection before forwarding ACK 331 to sender 322. If SNR is poor and does not meet a predetermined SNR threshold (e.g., a predefined SNR measurement during a predetermined number of sampling periods, a predefined SNR measurement during a predetermined time period, etc.), bandwidth optimization module 329 in OBU 328 may decrease RWIN (e.g., advertising a 0 receiver window) in ACK 331 to slow down or stall the sender's sending rate.

When SNR recovers, bandwidth optimization module 329 in OBU 328 may increase RWIN to the original value to increase the sender's sending rate. For example, if a receiver in a car is downloading a file from a remote server, which is the sender, bandwidth optimization module 329 in OBU 328 can tweak ACK 331 from the receiver in the car to the server. Consequently, the server can adapt its sending rate based on what is specified in ACK 331. If link quality improves and therefore, SNR is not poor, bandwidth optimization module 329 may forward the actual RWIN (e.g., advertising a corresponding non-zero window) to resume an optimal rate. Thus, OBU 328 can modify the TCP flow rate based on its local measurements of link quality.

Figure 14:
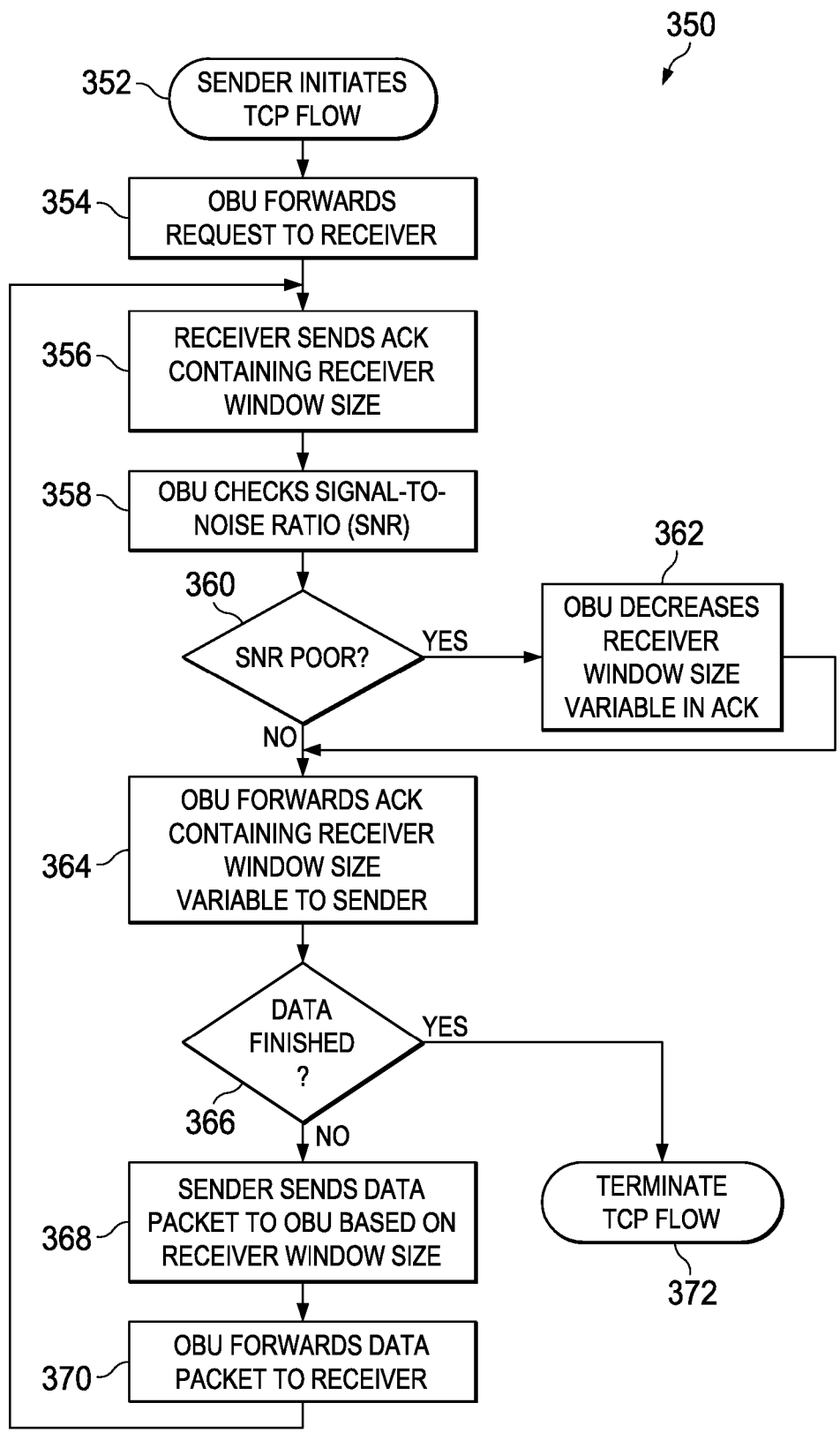
FIG. 14 is a flowchart illustrating a method to optimize bandwidth according to an embodiment of the present disclosure.

Turning to FIG. 14, FIG. 14 is a flowchart illustrating a method 350 to optimize bandwidth according to an embodiment of the present disclosure. Sender 322 initiates a TCP flow in step 352. In step 354, OBU 328 forwards the request to a receiver 326. Receiver 326 sends an acknowledgement (ACK) 331 containing the receiver window size variable (RWIN) in step 356. Link monitoring component 330 of OBU 328 checks the signal-to-noise ratio (SNR) of a corresponding interface in step 358. If SNR is determined to be poor in step 360, bandwidth optimization module 329 in OBU 328 decreases RWIN in ACK 331 in step 362.

OBU 328 forwards ACK 331 containing RWIN to sender 322 in step 364. If SNR is not poor, RWIN that OBU 328 forwards may not be modified, and may remain the original RWIN. On the other hand, if SNR is poor, OBU 328 may forward the modified RWIN in ACK 331 to sender 322. Sender 322 checks if data flow is finished in step 366. If data flow is not finished, sender 322 may send data packets to OBU 328 based on RWIN in ACK 331 in step 368. OBU 328 forwards the data packets to receiver 326 in step 370. The process loops back to step 356 and continues thereafter. When all data packets have been sent as determined in step 366, the TCP flow is terminated in step 372.

Figure 15:
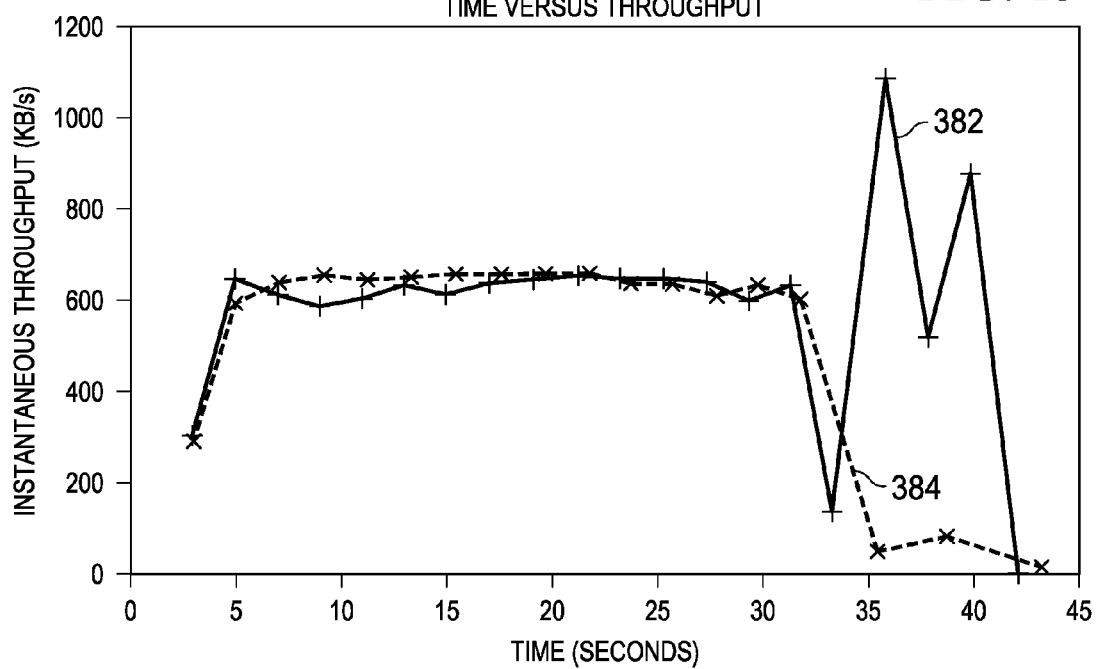
FIG. 15 is a graph of instantaneous throughput as a function of time in an exemplary network environment in accordance with embodiments of the present disclosure.

Turning to FIG. 15, FIG. 15 is a graph of instantaneous throughput in KB/s as a function of time. In FIG. 15, instantaneous throughput is compared for two different flows—flow 382 implements an embodiment of the disclosure as described herein in connection with FIG. 14, and flow 384 does not implement the embodiment. Both flow 382 and flow 384 share bandwidth equally up until around 32 seconds. At around 32 seconds, the signal quality decreases significantly in a matter of 2 to 3 seconds and stays in poor quality for around 2 seconds.

Both flow 382 and flow 384 suffer from performance when signal quality decreases because the available bandwidth is limited. In flow 382, however, OBU 328 quickly stalls the TCP connection when the signal quality decreases, by modifying the receiver window in ACK 331 going back to sender 322. From around 34 seconds to 36 seconds, the signal quality quickly improves and OBU 328, which monitors signal quality, does not modify the receiver window but rather, allows the actual receiver window size in ACK 331 to be forwarded to sender 322, such that the TCP flow is able to quickly grab the available bandwidth in the few seconds. Thus, throughput of flow 382 quickly improves, while throughput does not significantly improve for flow 384.

FIG. 15 illustrates that the dynamic variation in signal strength degrades TCP performance (after approximately 32 sec) without bandwidth optimization module in OBU 328, as disclosed in the present application. The degradation can occur for a variety of reasons, for example, due to an increased number of timeouts, each followed by slow start. In addition, TCP may fail to quickly grab any new available bandwidth due to additive increase/multiplicative-decrease (AIMD) nature of its congestion control mechanism. Bandwidth optimization module 329 in OBU 328, however, can cause the TCP flow to stall before it experiences signal quality degradation, for example, in the form of packet losses. Subsequently, bandwidth optimization module in OBU 328 can enable the TCP flow to quickly grab available bandwidth when the signal quality quickly changes from bad to good, thereby reducing the chances of non-congestion related packet losses in the dynamic mobile environment. This may allow the TCP flow to quickly adapt to fast changing mobile environments and to utilize scarce link bandwidth efficiently to improve transport and application performance.

Figure 16:
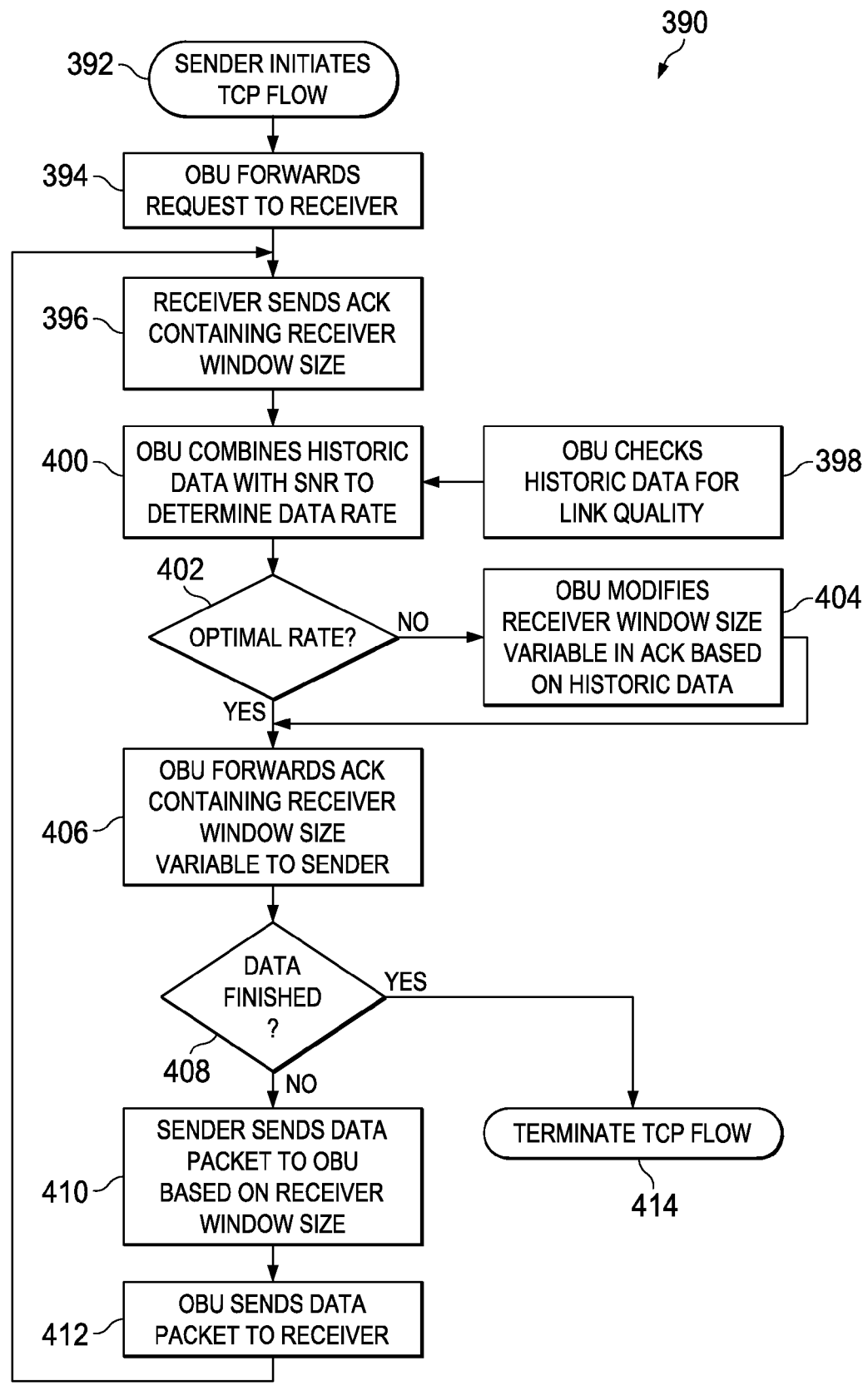
FIG. 16 is a flowchart illustrating a method to optimize bandwidth according to an embodiment of the present disclosure.

Turning to FIG. 16, FIG. 16 is a flowchart illustrating a method 390 to optimize bandwidth using historical data according to an embodiment of the present disclosure. Using historic data, OBU 328 may determine in advance the link quality of upcoming access points and be prepared to switch over to a better link with a different access point. Initially in FIG. 16, sender 322 initiates a TCP flow in step 392. In step 394, OBU 328 forwards the request to receiver 326. Receiver 326 sends an acknowledgement (ACK) 331 containing a receiver window size variable (RWIN) in step 396. OBU 328 can query and obtain historic data for link quality from a database in step 398.

Historic data may comprise data about link quality or SNR at a particular geographical location over a period of time. The database that stores historic data can be located locally at OBU 328, or may be located remotely, for example, on a remote node on Enterprise and/or Internet clouds. For example, OBUs passing through a location at different times of the day can gather information about the available Wi-Fi signal strength, latency, and bandwidth of WiFi access points associated with the different times of the day that the data is gathered, and send the gathered information to the historical data database. Another embodiment includes a self-learning component in which OBU 328 learns of access points at given locations and builds a local history of available access points. Thus, the historic information in the database may be pre-generated by access providers, or multiple OBUs (or other appropriate entities) gathering data, or the data may be self-generated by an OBU, or the data may be generated using any suitable combination thereof.

OBU 328 can combine this historic data with current SNR to determine data rate in step 400. Other information may also be incorporated in the decision-making to determine data rate. For example, assuming historic information of link quality and/or data rates are available for the OBU's current geographical location, bandwidth optimization module 329 in OBU 328 could utilize statistical methods to combine history with current environment conditions and predict the optimal rate. If data rate is determined to be poor in step 402, OBU 328 may decrease RWIN in ACK 331 in step 404 based on historic data. For example, if the historic data indicates that SNR may be poor for a significant period in the geographical area of OBU 328, OBU 328 may decrease RWIN and keep it decreased for a longer period of time.

OBU 328 may forward ACK 331 containing the modified RWIN to sender 322 in step 406. If data rate is not poor, RWIN that OBU 328 forwards may not be modified, and may remain the original RWIN. Sender 322 checks if the data flow is finished in step 408. If the data flow is not finished, sender 322 may send data packets to OBU 328 based on RWIN in ACK 331 in step 410. OBU 328 forwards the data packet to receiver 326 in step 412. The process loops back to step 396 and continues thereafter. When all data packets have been sent as determined in step 410, the TCP flow is terminated in step 414.

Figure 17:
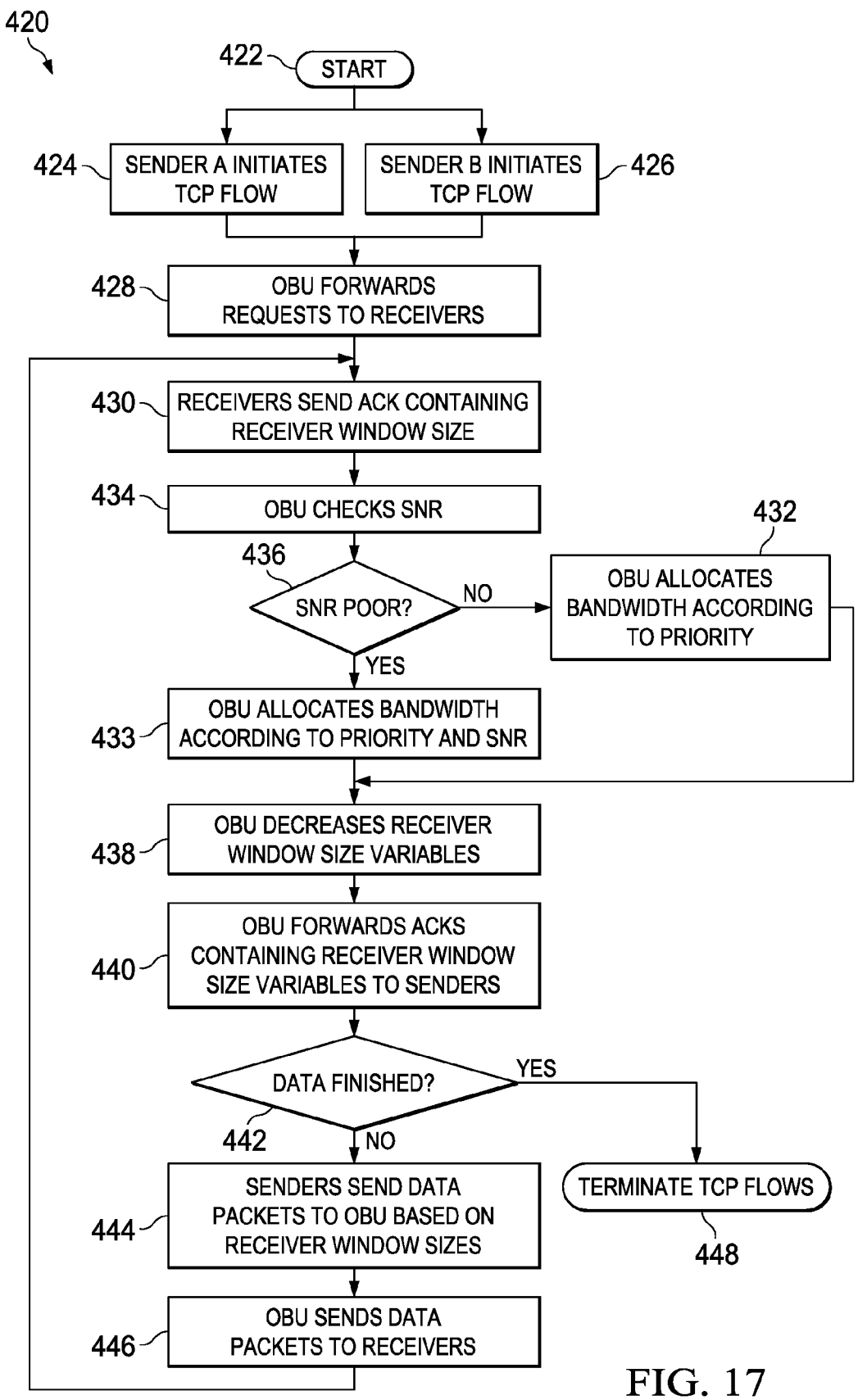
FIG. 17 is a flowchart illustrating a method to optimize bandwidth for two simultaneous flows according to an embodiment of the present disclosure.

Turning to FIG. 17, FIG. 17 is a flowchart illustrating a method 420 to optimize bandwidth for two different simultaneous flows using flow control according to an embodiment of the present disclosure. This may be accomplished in one embodiment by modifying the receiver window (RWIN) for each flow based on QoS parameter (e.g., bandwidth, priority) for that flow. The process starts in step 422. Sender A initiates a TCP flow in step 424 and sender B initiates a different TCP flow in step 426. In step 428, OBU 328 may forward the requests from senders A and B to corresponding receivers 326. Receivers 326 send ACKs 331 containing RWINs in step 430. OBU 328 can enable prioritizing traffic across different TCP flows based on a class of traffic, class of user, class of priority, class of device, etc. and allocate higher bandwidth to the higher priority flow in step 432. Priority may be based on an application, for example, video flow may have higher priority than text flow. Priority may also be based on a sender's status, for example, sender A may be a secure data server receiving higher priority than sender B, which may be a cell phone. Priority may also be specified based on user input to OBU 328. For example, a host in the vehicle may specify a higher priority for the host's traffic flows relative to a guest's traffic flow.

OBU 328 may also perform a network condition aware classification and dynamically configure and schedule queues based upon available bandwidth as follows. OBU 328 checks SNR of the interface in step 434. If SNR is determined to be poor in step 436, OBU 328 can dynamically allocate bandwidth according to priority and SNR in step 433. For example, text and voice messages may traverse OBU 328 simultaneously. Given appropriate bandwidth that can accommodate all the messages, both text and voice messages may be given the same priority, say priority 0, with 50% bandwidth allocated equally among them. As link quality degrades, and total bandwidth reduces, OBU 328 may dynamically change the relative priorities and apportioned bandwidth—the text messages may remain in priority 0 with a reduced 20% bandwidth allocation while the voice message may receive a higher priority, say priority 1, with an increased 80% bandwidth allocation. This change in allocation may be based on the application—OBU 328 may be configured to give higher priority to voice applications over text applications.

As another example, a video traffic may have a base layer and enhancement layer with prior priorities of 1 and 0 respectively, and bandwidth classifications of 80% and 20% respectively. When the link degrades, OBU 328 may dynamically change the bandwidth partitioning ratio of the video traffic from 80-20 to 100-0 so that the base layer gets 100% bandwidth and the enhancement layer gets nothing. Thus, the base layer may be transmitted and the enhancement layer may not be transmitted. For this design, scalability may not be an issue, because OBU 328 is a local device, interacting with a few in-vehicle devices.

OBU 328 can decrease RWIN in ACKs 331 in step 438 based on relative bandwidth allocation. If SNR is not poor RWIN may be reduced as needed for the lower priority flow. On the other hand, if SNR is poor, OBU 328 may decrease RWIN for both flows, and may reduce bandwidth more for the lower priority flow relative to the higher priority flow. OBU forwards ACKs 331 containing RWINs to senders A and B in step 440. Senders A and B check if the data flow is finished in step 442. If the data flow is not finished, senders A and B send data packets to OBU 328 based on RWINs in ACKs 331 in step 444. OBU 328 forwards the data packets to respective receivers 326 in step 446. The process loops back to step 430 and continues thereafter. When all data packets have been sent as determined in step 442, the TCP flow is terminated in step 448.

Figure 18:
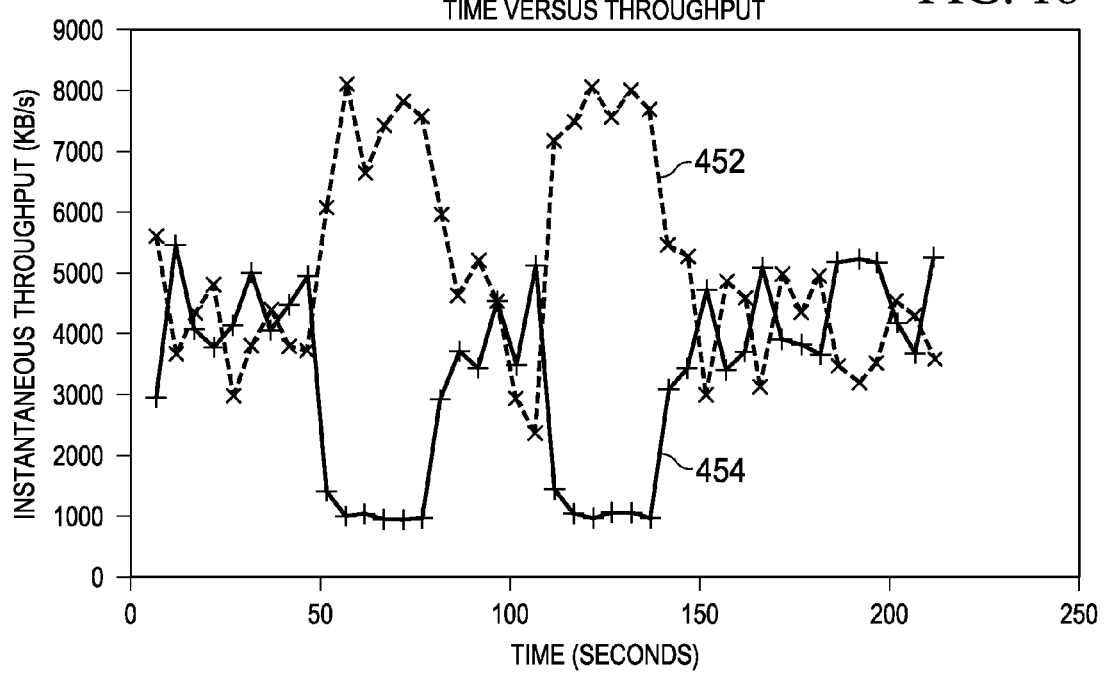
FIG. 18 is a graph of instantaneous throughput as a function of time for two flows with different priorities in an exemplary network environment in accordance with embodiments of the present disclosure.

Turning to FIG. 18, FIG. 18 shows a graph of instantaneous throughput in KB/s as a function of time for two flows with different priorities determined in accordance with embodiments disclosed herein. Flow 452 has higher priority than flow 454. Both flows share equal bandwidth up until around 50 seconds, at which point, OBU 328 reduces the receiver window of low priority flow 454 such that this flow's throughput stays at approximately 1000 KB/s. Similarly, OBU 328 can tweak the receiver window of high priority flow 452, such that high priority flow 452 gets a higher share of the bandwidth than low priority flow 454. As shown in FIG. 18, these events are repeated at approximately 110-140 seconds during the graphed time period. Therefore, in relation to low priority flow 454, high priority flow 452 has higher throughput, thereby achieving quality of service (QoS) differentiation across different flows.

In another example scenario of QoS, round trip time (RTT) may be considered. Traditionally, TCP flows get a share of the bandwidth inversely proportional to the RTT, which can be unfair to connections with longer RTTs. In one embodiment, however, RTTs of the different flows of OBU 328 can be measured and the receiver window can be adjusted to give the flows a more appropriate bandwidth. For example, consider two TCP flows serving video. The first TCP flow has a long RTT and the second TCP flow has a short RTT. Typically, the longer RTT connection (e.g., the first TCP flow) gets a smaller share of the bandwidth resulting in a lower quality. By considering RTT of each of the TCP flows, however, more bandwidth can be allocated to the first TCP flow to compensate for a longer RTT characteristic.

Figure 19:
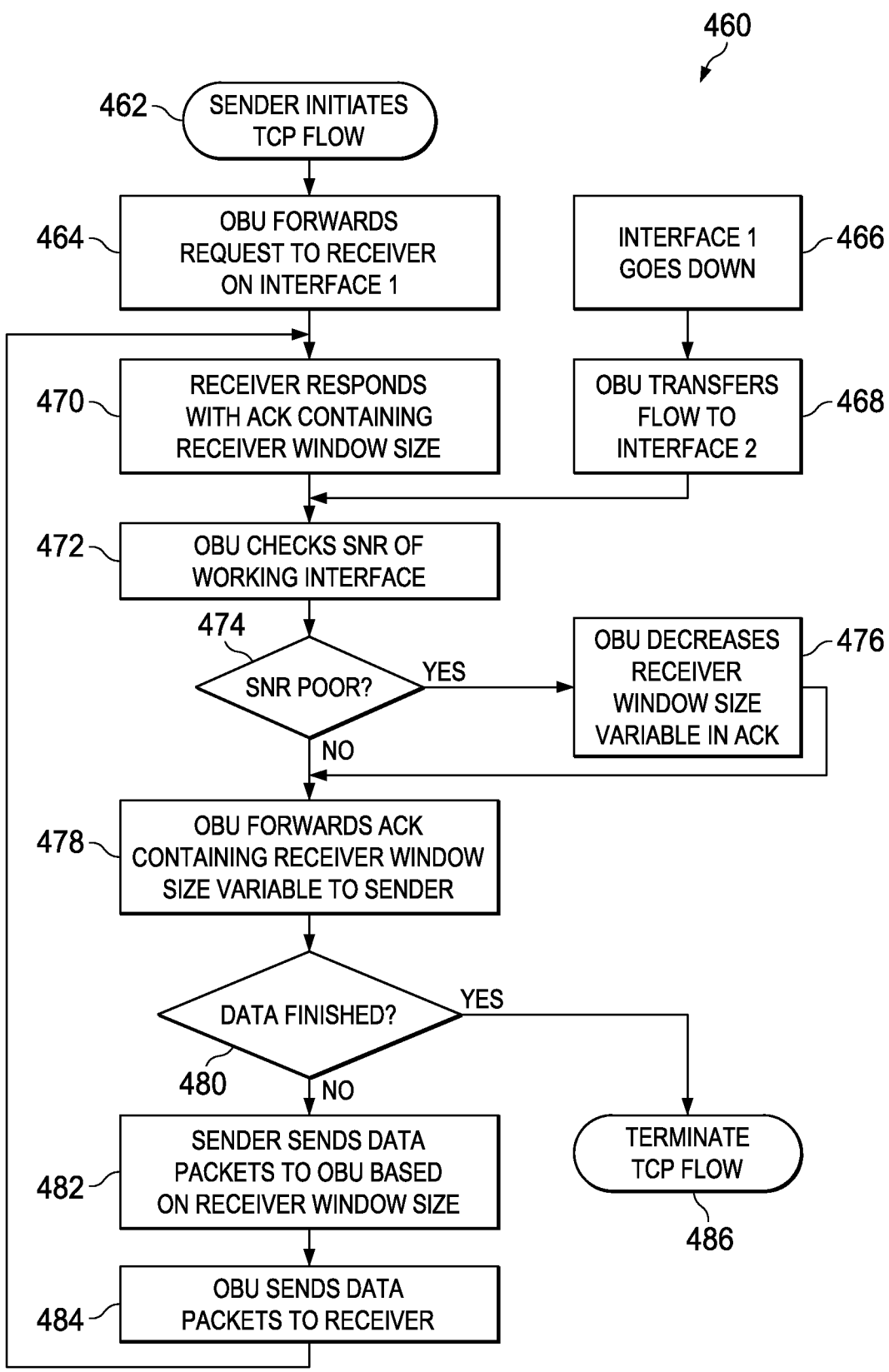
FIG. 19 is a flowchart illustrating a method to optimize bandwidth according to an embodiment of the present disclosure.

Turning to FIG. 19, FIG. 19 is a flowchart illustrating a method 460 to optimize bandwidth during mobility events or other situations where an interface loses connectivity according to an embodiment of the present disclosure. OBU 328 may be configured to optimally choose transport options or services based on perceived link quality. Sender 322 initiates a TCP flow in step 462. In step 464, OBU 328 forwards the request from sender 322 to receiver 326 on interface 1, for example, WiFi, which has a particular throughput, for example, 5 MB/s. Interface 1 may lose connectivity in step 466. This may happen, for example, when a car moves from one access point to another with a gap in coverage. In step 468, OBU 328 may seamlessly transfer the flow to interface 2, for example, 3G, which has a throughput that may be significantly different from the throughput of interface 1. For example, interface 2 may have a throughput of 500 kB/s.

Meanwhile, receiver 326 responds with ACK 331 containing RWIN in step 470. OBU 328 checks SNR of the working interface, in this case, interface 2, in step 472. If SNR is determined to be poor in step 474, OBU 328 can decrease RWIN in ACK in step 476. OBU 328 forwards ACK 331 containing RWIN to sender 322 in step 478. If SNR is not poor, RWIN that OBU 328 forwards may not be modified, and may remain the original RWIN. On the other hand, if SNR is poor, OBU 328 forwards the modified RWIN in ACK to sender 322. Sender 322 checks if the data flow is finished in step 480. If the data flow is not finished, sender 322 sends data packets to OBU 328 based on RWIN in ACK 331 in step 482. OBU 328 forwards the data packets to receiver 326 in step 484 over the working interface. The process loops back to step 470 and continues thereafter. When all data packets have been sent as determined in step 480, the TCP flow may be terminated in step 486. Thus, this method may permit TCP flow to recover quickly despite sudden changes in link quality across interfaces, even link quality changes that may be different in orders of magnitude. Accordingly, this may help minimize packet losses and maximize recovery of lost bytes in case of loss.

Figure 20:
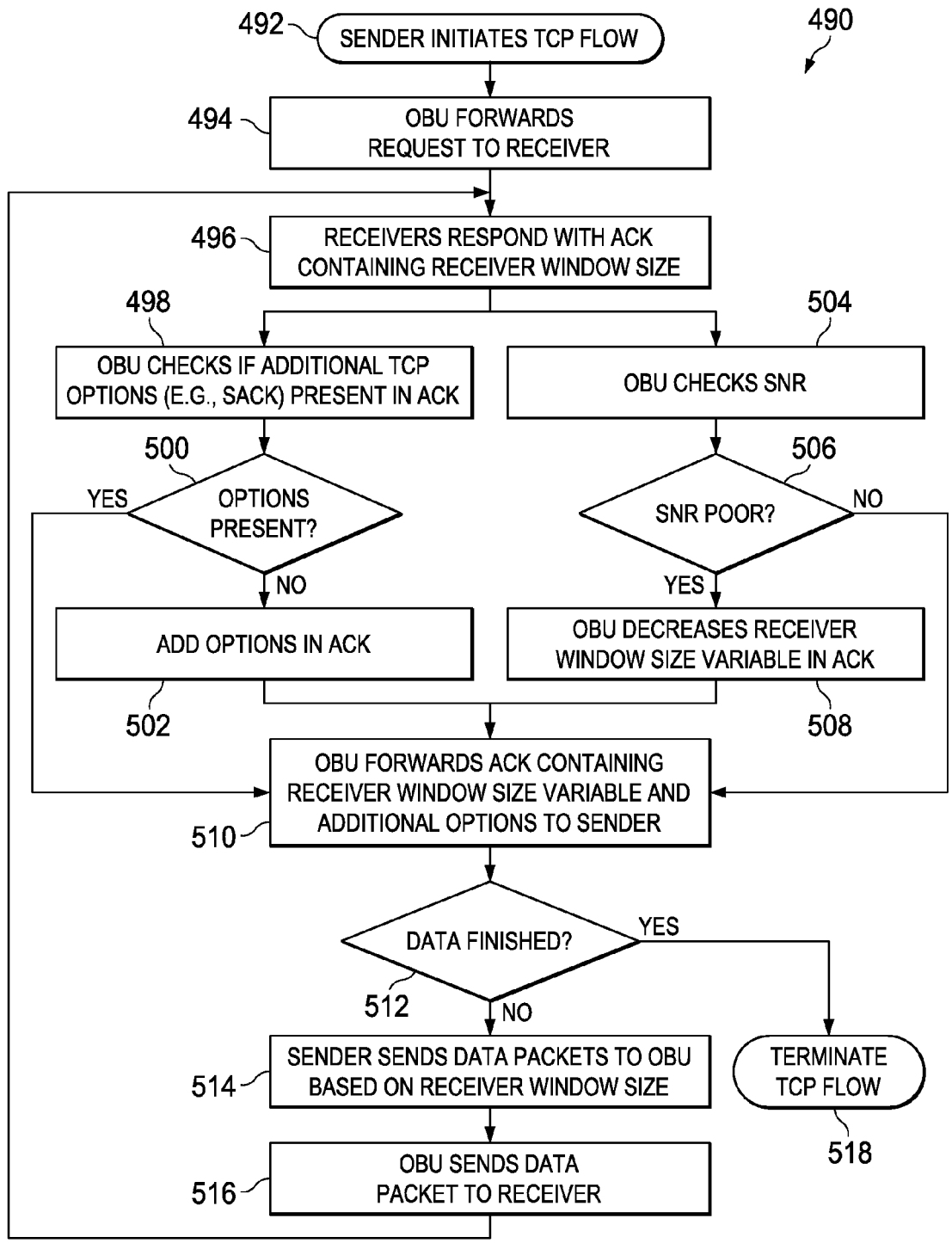
FIG. 20 is a flowchart illustrating a method to optimize bandwidth according to another embodiment of the present disclosure.

Turning to FIG. 20, FIG. 20 is a flowchart illustrating a method 490 to optimize bandwidth by using OBU 328 as a proxy for different transport options or services according to an embodiment of the present disclosure. In this embodiment, end points, for example, sender 322 and receiver 326 can benefit from optimal TCP options/services, which may be based on perceived link quality provided by OBU 328. Bandwidth optimization module 329 in OBU 328 can modify the sender's TCP packets to add other options on behalf of sender 322. Bandwidth optimization module 329 in OBU 328 may then maintain state for each flow it modifies.

With reference to FIG. 20, sender 322 initiates a TCP flow in step 492. In step 494, OBU 328 forwards the request from sender 322 to receiver 326. Receiver 326 responds with ACK 331 containing RWIN in step 496. OBU 328 may check if additional TCP options, for example, selective acknowledgement (SACK) that can allow sender 322 to recover quickly from losses, are present in the sender's flow in step 498. Another example of an advanced TCP option may be to change a default maximum segment size (MSS) of the TCP flow so that the maximum transmission unit (MTU) of the packet can be adapted to be sent wirelessly. For example, OBU 328 may transfer the flow from one interface to another, and the new wireless interface may be more suited to a smaller maximum segment size (MSS). In such case, OBU 328 may intercept the TCP flow and resegment the packets to make it more suitable for the new path. This may result in lower packet losses and faster recovery of lost bytes in case of loss.

If OBU 328 determines that such additional options are not present in step 500, OBU 328 may add these absent options to ACK 331 in step 502. OBU 328 can thus act as a proxy infrastructure device, adding advanced TCP options to ACK 331 being forwarded to sender 322 to optimize bandwidth and improve TCP performance. OBU 328 may also check SNR quality in step 504. If SNR is determined to be poor in step 506, OBU 328 can decrease RWIN in ACK 331 in step 508. OBU 328 may combine the advanced options and forward ACK containing RWIN to sender 322 in step 510. If SNR is not poor, RWIN that OBU 328 forwards may not be modified, and may remain the original RWIN. On the other hand, if SNR is poor, OBU 328 may forward the modified RWIN in ACK 331 to sender 322. Sender 322 checks if the data flow is finished in step 512. If the data flow is not finished, sender 322 sends data packets to OBU 328 based on RWIN in ACK 331 in step 514. OBU 328 forwards the data packets to receiver 326 in step 516. The process loops back to step 496 and continues thereafter. When all data packets have been sent as determined in step 512, the TCP flow is terminated in step 518. Thus various cross layer optimization processes can be used by OBU 328 to improve transport layer performance in a connected vehicle environment.

Figure 21:
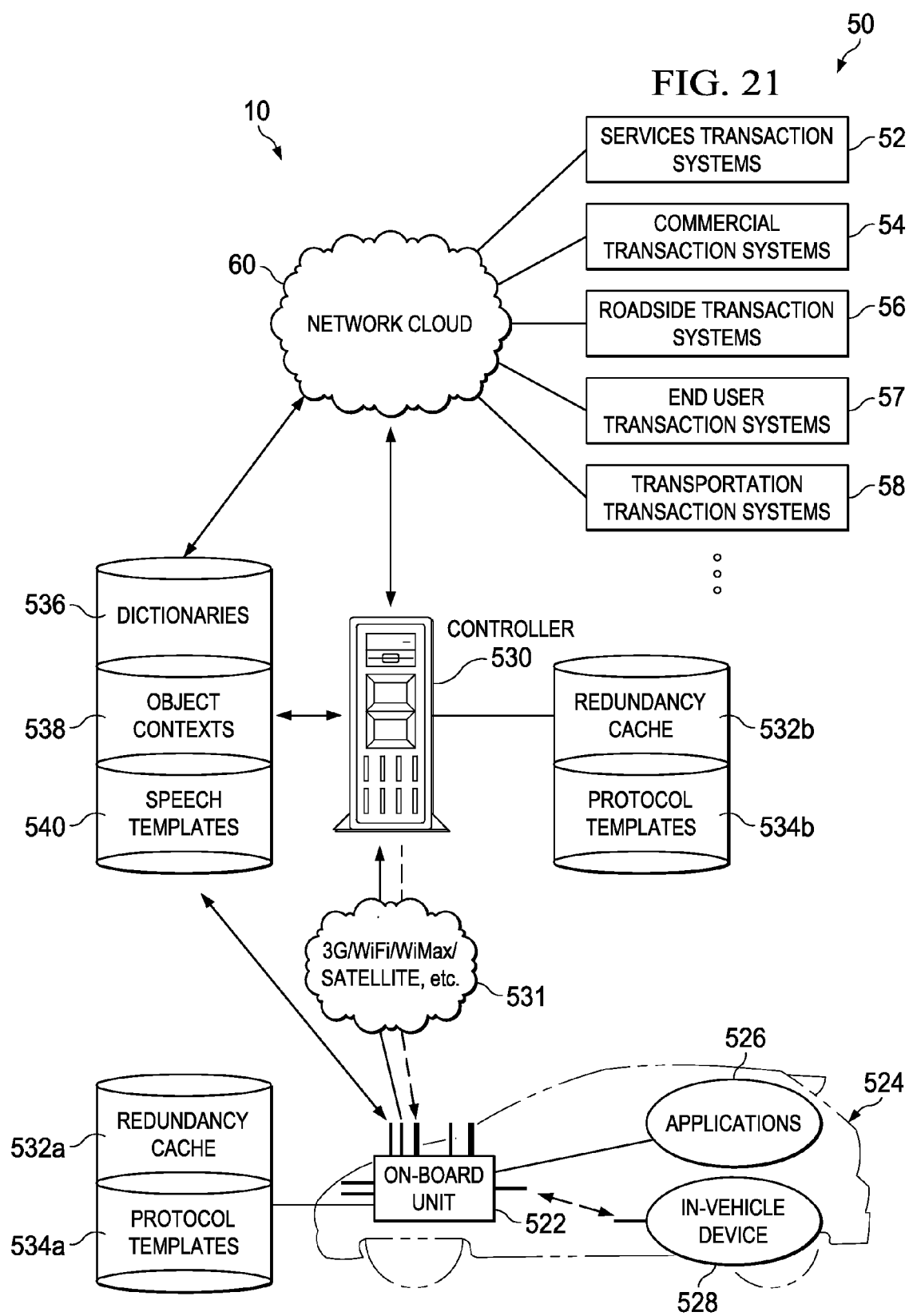
FIG. 21 is a simplified block diagram of certain optimization schemes used in a network environment in accordance with embodiments of the present disclosure.

Turning to FIG. 21, FIG. 21 is a simplified block diagram of certain optimization schemes used in communication system 10 in a vehicular environment. OBU 522 in a vehicle 524 may have applications 526 running on the OBU (or on in-vehicle devices), and/or may be connected to in-vehicle devices 528, for example, vehicle centric units such as camera, infotainment systems, and machine devices (e.g., sensors), and mobile devices (e.g., smart phones, and laptops). Traffic from devices 528 and applications 526 communicating with OBU 522 can communicate with transaction systems 50 residing remotely, for example, on enterprise or internet clouds, through a controller 530 via communication link 531 and network cloud 60. Communication link 531 may include wireless networks associated with road-side infrastructure devices, such as WiFi, WiMax, 3G, 4G and satellite. Network cloud 60 may include Enterprise cloud and Internet clouds across suitable wired and wireless networks such as 3G, 4G, satellite, etc. As explained with reference to FIG. 2, transaction systems 50 may include services transaction systems 52 (e.g., 3$^{rd}$ party services, Internet-based services, manufacturer or OEM datacenter, vehicle dealer system, other enterprise systems, etc.), commercial transaction systems 54, road-side transaction systems 56, end user transaction systems 57, and transportation transaction systems 58 on nodes or other electronic devices. Each of transaction systems 50 can be associated with many different types of entities and many different transaction scenarios. All of transaction systems 50 (e.g., transaction systems 52, 54, 56, 57, 58) as categorized, are provided for purposes of illustration and ease of understanding, and it will be appreciated that numerous types of transaction systems and entities other than those enumerated herein may also be possible.

In a typical vehicular network environment, it is likely that a significant amount of data, including redundant data, may be transferred between controller 530 and OBU 522. Several techniques may be implemented in OBU 522 and controller 530, which may not be end nodes in a network, to optimize data flow independent of traffic types (e.g., text, binary data, audio, video, etc.). In particular, the following techniques may be implemented in a complementary fashion in controller 530 and OBU 522: 1) traffic independent redundancy elimination, 2) data compression using various dictionaries and context, 3) voice-to-text, text compression, and text-to-voice, and 4) flow packet and protocol header optimization.

As shown in FIG. 21, OBU 522 and controller 530 may have access to their individual redundancy cache database 532a and 532b respectively and protocol header template database 534a and 534b respectively. Additionally, databases comprising dictionaries 536, object contexts 538 and speech templates 540 may be available to OBU 522 and controller 530 for performing application independent data optimization. Dictionaries 536 may contain translations for certain commonly used or predictable data exchanges, for example, data strings can be translated and represented by a single word. Dictionaries 536 may also contain translations for different applications, for example, Web/Office files in English may be compressed using lexical dictionary, frequently used phrases dictionary or other methods.

In the case of object contexts database 538, contexts, such as specific vernacular used for automotive data exchange between OBU and the cloud, or jargon specific to an application, may be compressed using a special contextual and vocabulary dictionary. For example, sensory information may be represented by a certain vocabulary applicable to sensory information alone. Other examples include representing a video by the index or delta of a location of the video if it is already available rather than sending the entire video to the cloud and vice-versa (i.e., from the cloud to the OBU).

Speech template databases 540 contain representations of audio/speech content of various users as small numbers or index values. Audio/speech content includes voice frequency, intonation and other characteristics that identify a user's voice. For example, audio/speech content of user A may be represented by number 1, and audio/speech of user B may be represented by number 2. Such dictionary and context based compression between controller 530 and OBU 522 can reduce volume of data by replacing data with small index values to represent a word, phrase or paragraph or a context (text, binary, or image context).

Dictionaries 536, object contexts database 538 and speech templates database 540 may be static or dynamic. If static, content in these databases do not change or change very little over time. If dynamic, content in dictionaries 536, object contexts database 538 and speech templates database 540 can be modified and built over time as new data contexts, data patterns and audio/speech content are learned. Dictionaries 536, object contexts database 538 and speech templates database 540 may be stored locally on OBU 522 and controller 530, or may be stored remotely, for example, on Enterprise or Internet clouds 60. When dictionaries 536, object contexts database 538 and speech templates database 540 are stored remotely on cloud 60, multiple OBUs can access the same dictionary, or object contexts database or speech template. In one example embodiment, an expert may modify a master dictionary residing in an Enterprise cloud by adding new translations and contexts. Alternatively, a user may modify the local dictionary residing on OBU 522 by adding new translations and contexts based on usage.

Figure 22:
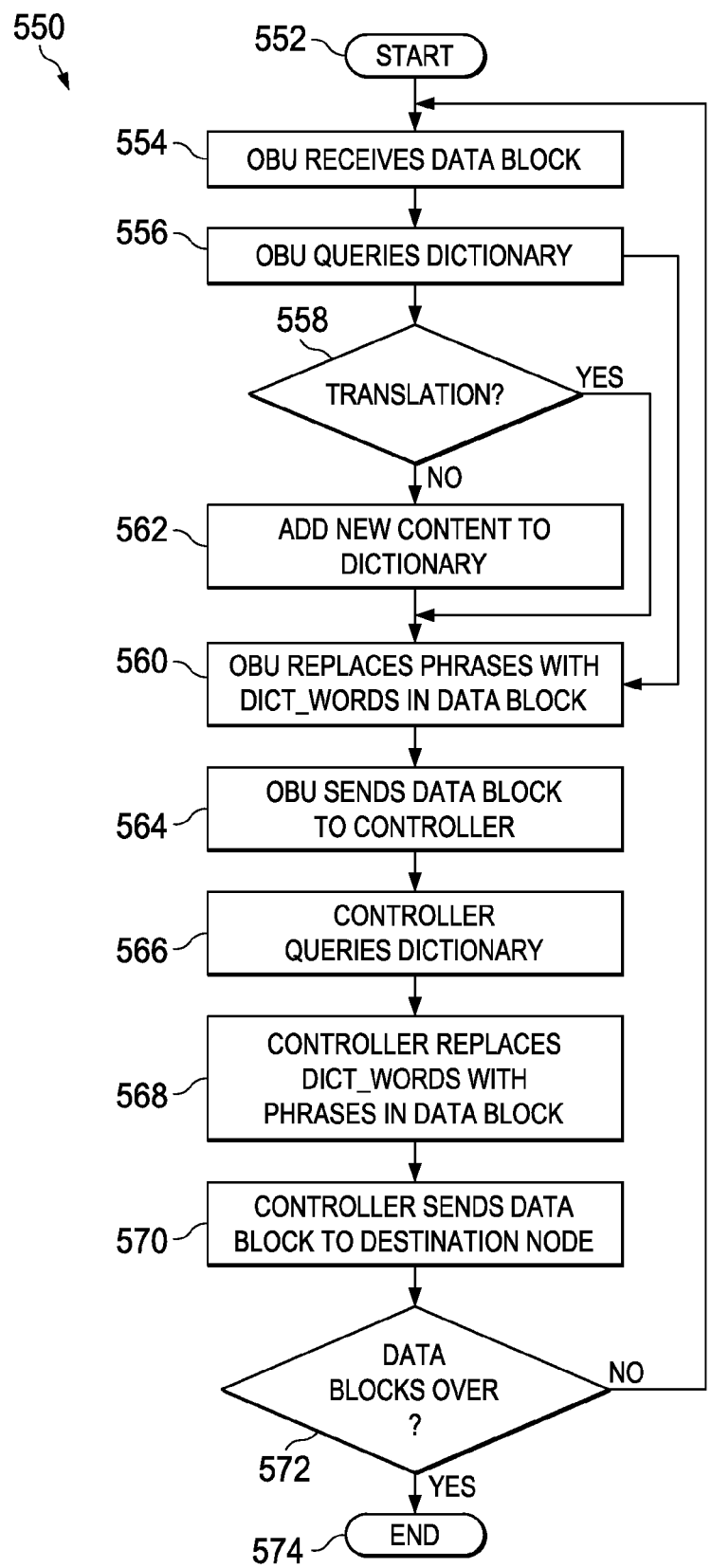
FIG. 22 is a flowchart illustrating a data optimization method according to an embodiment of the present disclosure.

Turning to FIG. 22, FIG. 22 is a flowchart illustrating a data optimization method 550 using dictionary 536, according to an embodiment of the present disclosure. The data optimization method starts in step 552. In step 554, OBU 522 receives a data block from an end node, for example, an in-vehicle device 528. OBU 522 queries a dictionary 536 in step 556 to determine whether a criterion is met, i.e., a suitable translation exists. As discussed above, dictionary 536 contains translations of phrases to words and words to phrases. If a translation exists as determined in step 558, the message is suitably represented by the appropriate translation in step 560 by replacing the applicable phrases with single words from dictionary 536, referenced as DICT_WORDS. If an applicable translation does not exist, OBU 522 may cause dictionary 536 to be modified to add a new translation or context as appropriate in step 562 and the message is suitably represented by the translation in step 560. The new data block is sent to controller 530 in step 564.

Controller 530 queries dictionary 536 in step 566 to revert back to the original message by replacing DICT_WORDS with the appropriate phrases in step 568. If controller 530 queries the same updated dictionary 536 as OBU 522, controller 530 may have access to the new and/or updated translation. Alternatively, controller 530 may query a different dictionary to translate the message back to its original form. The re-translated message is sent to destination nodes across networks 60 in steps 570. The process is repeated for all data blocks in a network session as indicated by step 572. When the data blocks are over, the process ends in step 574. It will be appreciated that although the method has been described above in a situation where OBU 522 receives the initial data block from an in-vehicle device, the method is applicable to the situation where controller 530 receives the initial data block from a remote node, for example, a data center or cell phone. In such a situation, controller 530 could query dictionary 536, translate the data block, and send the translated data block to OBU 522. OBU 522 could revert the translated data block to the original data block before sending it to a destination node, such as an in-vehicle device.

Figure 23:
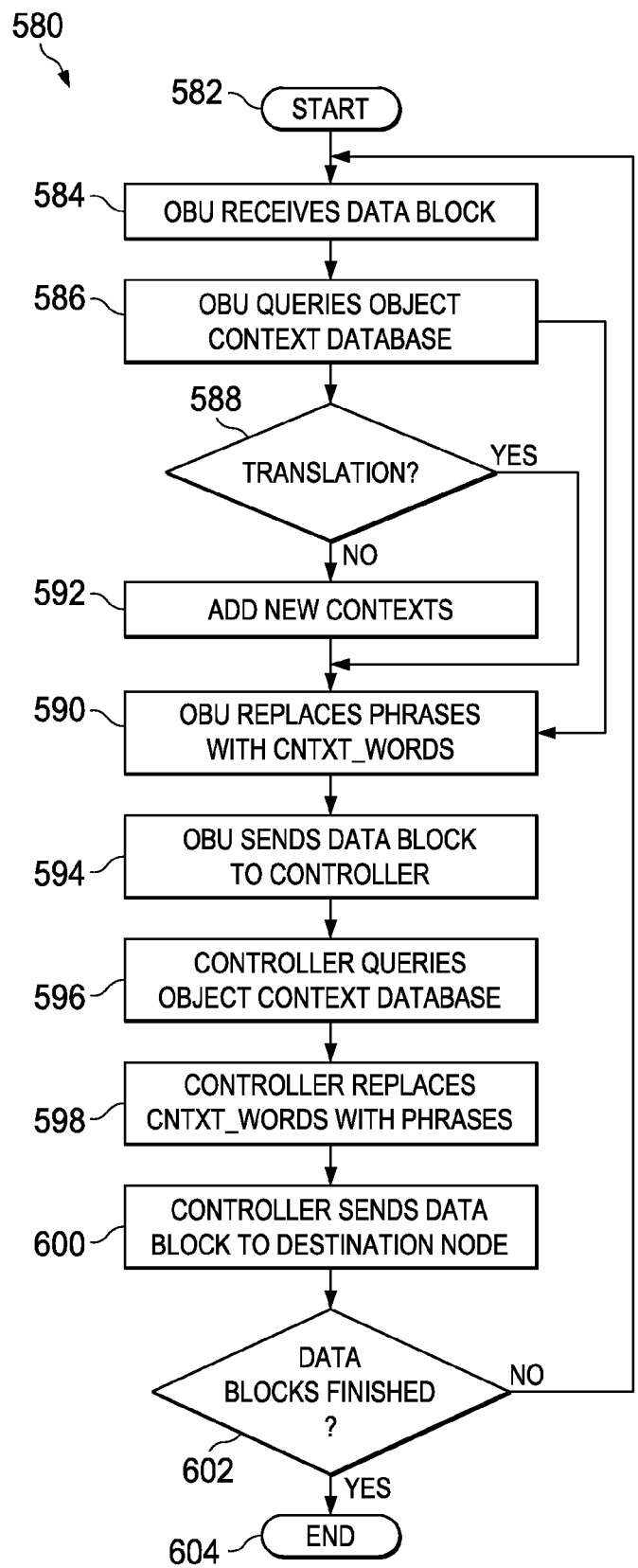
FIG. 23 is a flowchart illustrating a data optimization method, according to another embodiment of the present disclosure.

Turning to FIG. 23, FIG. 23 is a flowchart illustrating a data optimization method 580 using object context database 538, according to an embodiment of the present disclosure. The data optimization method starts in step 582. In step 584, OBU 522 receives a data block from an end node, for example, an in-vehicle device. OBU 522 queries object context database 538 in step 586 to determine whether a criterion is met, i.e., a suitable context translation exists. As discussed above, object context database 538 contains representations of contextual information as index values. If a translation exists as determined in step 588, the message is suitably represented by the appropriate translation in step 590 by replacing words or phrases or paragraphs or images or binary content in the data block with small index values as appropriate, referenced as CNTXT_WORDS. If an applicable translation does not exist, the OBU 522 may cause object context database 538 to be modified to add the new context as appropriate in step 592 and the message is suitably represented by the translation in step 590. OBU 522 sends the new data block to controller 530 in step 594.

Controller 530 queries object context database 538 in step 596 to revert back to the original message by replacing CNTXT_WORDS with the appropriate words or phrases or paragraphs or images or binary content in step 598. If controller 530 queries the same updated object contexts database 538 as OBU 522, controller 530 may have access to the new and/or updated translation. Alternatively, controller 530 may query a different object contexts database to translate the message back to its original form. The re-translated message is sent to destination nodes across networks in step 600. The process is repeated for all data blocks in a network session as indicated by step 602. When the data blocks are over, the process ends in step 604. It will be appreciated that although the method has been described above in a situation where the OBU 522 receives the initial data block from an in-vehicle device, the method is applicable to the situation where controller 530 receives the initial data block from a remote node, for example, a data center or cell phone. In such a situation, controller 530 could query object contexts database 538, translate the data block, and send the translated data block to OBU 522. OBU 522 could revert the translated data block to the original data block before sending it to a destination node, such as an in-vehicle device.

Figure 24:
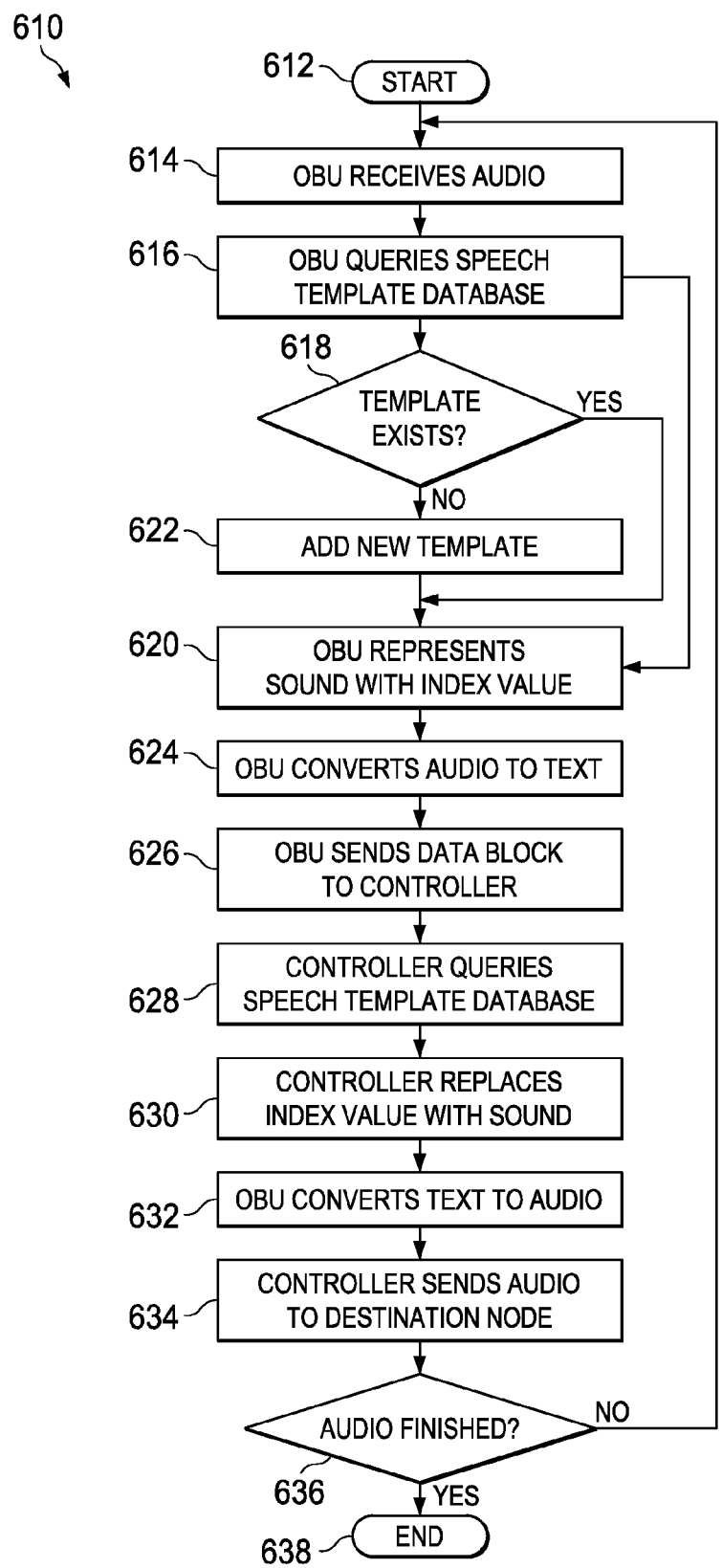
FIG. 24 is a flowchart illustrating a data optimization method, according to yet another embodiment of the present disclosure.

Turning to FIG. 24, FIG. 24 is a flowchart illustrating a data optimization method 610 using a speech template database 540, according to an embodiment of the present disclosure. The data optimization method starts in step 612. In step 614, OBU 522 receives from a user, high definition audio comprising raw voice data sampled at high frequency from an end node, for example, an in-vehicle cell phone. OBU 522 queries speech template database 540 in step 616 to determine whether a criterion is met, i.e., if the user's voice and ambient sound can be represented by suitable index values. If speech template database 540 contains a suitable template, as determined in step 618, OBU 522 represents the user's voice and ambient sound with an index value in step 620. If a suitable translation does not exist, OBU 522 may cause speech template database 540 to be updated with the new sound template in step 622 and the sound is represented by the new index value in step 620. In step 624, OBU 522 can convert the audio to low bandwidth format, for example compressed text, which can present significant savings in bandwidth using speech-to-text (STT) and text-to-speech (TTS) technologies. The conversion can be done by implementing various techniques including silence suppression, templetizing background/ambient data to reduce voice/audio/speech data and voice-to-text translation.

OBU 522 sends the data block to controller 530 in step 626. Controller 530 queries speech template database 540 in step 628 to revert back to the original sound by replacing the index words with the appropriate sounds in step 630. If controller 530 queries the same updated speech template database 540 as OBU 522, controller 530 may have access to the new and/or updated translation. Alternatively, controller 530 may query a different speech template database to translate the message back to its original sound. Controller 530 decompresses the text and may perform an inverse technique of the technique used by OBU 522 to prepare the data for transmission. The inverse technique can convert the text to speech to recreate the voice/audio/speech or can use a standard voice template to read the text. Ambient audio information may be added, if necessary, to further enhance the speech/audio/voice quality in step 632. The process is repeated for all audio strings in a network session as indicated by step 636. When the data blocks comprising audio are over, the process ends in step 638. It will be appreciated that although the method has been described above in a situation where OBU 522 receives the initial audio from an in-vehicle device, the method is applicable to the situation where controller 530 receives the initial audio from a remote node, for example, a cell phone. In such a situation, controller 530 could query speech template database 540, covert the audio, and send the converted data blocks to OBU 522. OBU 522 could revert the converted data blocks to the original audio before sending it to a destination node such as an in-vehicle device. It will also be appreciated that while the above method has been described in terms of conversion from audio to text and vice versa, the method is applicable to other format conversions also, for example, video to text, text to video, text to binary, binary to text, etc.

Figure 25:
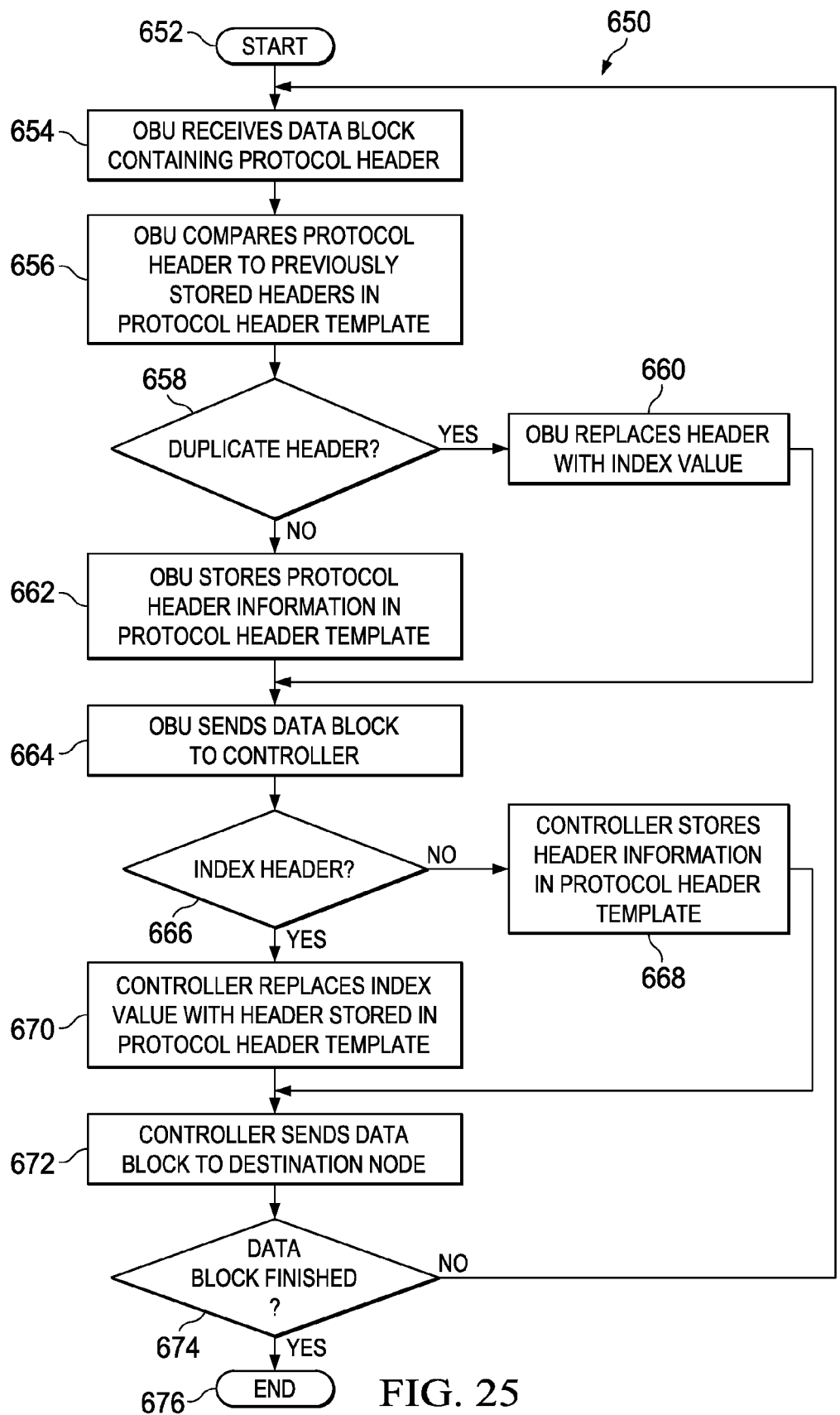
FIG. 25 is a flowchart illustrating a data optimization method, according to yet another embodiment of the present disclosure.

Turning to FIG. 25, FIG. 25 is a flowchart illustrating a data optimization method 650 using a protocol header template database 534, according to an embodiment of the present disclosure. Connection management in communication system 10 takes place between OBUs and network controllers. Consequently, upstream traffic flow is sent to one or more network controllers before being redirected to Internet or enterprise clouds and downstream traffic is sent to OBU 522 before being redirected to in-vehicle devices and applications. Data flows and corresponding data blocks exchanged between OBU 522 and controller 530 generally have constant information in their protocol headers, for example, the source address and the destination address are constant for all data blocks. These data flows can be optimized during the life of the data flow by stripping the constant part of a given data block and protocol headers by an index value at the transmitting device (i.e., OBU 522 or controller 530 depending on the direction of the data flow). At the receiving device (i.e., OBU 522 or controller 530 depending on the direction of the data flow), the index can be replaced by corresponding data block and protocol header real content, before forwarding to Internet/Enterprise clouds at a controller end or to in-vehicle devices at an OBU end.

In FIG. 25, the data optimization method starts in step 652. In step 654, OBU 522 receives a data block containing protocol header information containing source and destination addresses and other details. In another example, the data block could be created by an application on OBU 522. OBU 522 compares the protocol header information to previously stored protocol header information in a protocol header template database 534*a* in step 656. The protocol header template database 534*a* may be stored locally in OBU 522 and may contain assignments of index values to protocol header information. If a criterion is met, i.e., duplicate header information exists in the protocol header template database 534*a* as determined in step 658, OBU 522 replaces the protocol header with a corresponding index value from the protocol header template database in step 660. If duplicate protocol header information does not exist in the protocol header template database 534*a*, as may be the case for the first data block, OBU 522 stores the protocol header information in the protocol header template database 534*a* and assigns an index value to it in step 662.

OBU 522 sends the data packet to controller 530 in step 664. Controller 530 receives the data block and determines if the protocol header is an index header in step 666. If the protocol header is not an index header, controller 530 stores the protocol header information in its protocol header template database 534*b* in step 668. If the protocol header is an index header, controller 530 replaces the index value with the corresponding protocol header information previously stored in its protocol header template database 534*b* in step 670. Controller 530 sends the data block with the original protocol header information to the destination node in step 672. The process is repeated for all data blocks in a network session as indicated by step 674. When the data blocks are over, the process ends in step 678.

It will be appreciated that although the method has been described above in a situation where OBU 522 receives the initial data block from an in-vehicle device (or where the initial data block is created by an application on OBU 522), the method is applicable to the situation where controller 530 receives the initial data block from a remote node, for example, a data center or cell phone. In such a situation, controller 530 replaces the protocol header information as appropriate with a corresponding index value before sending the data block to OBU 522. OBU 522 can convert the index value back to the original protocol header information using the steps discussed above in FIG. 25 with regard to controller 530 and send the data block to the in-vehicle device (or to the corresponding application on OBU 522). The method described above in FIG. 25 results in traffic bandwidth reduction between OBU 522 and controller 530.

Figure 26:
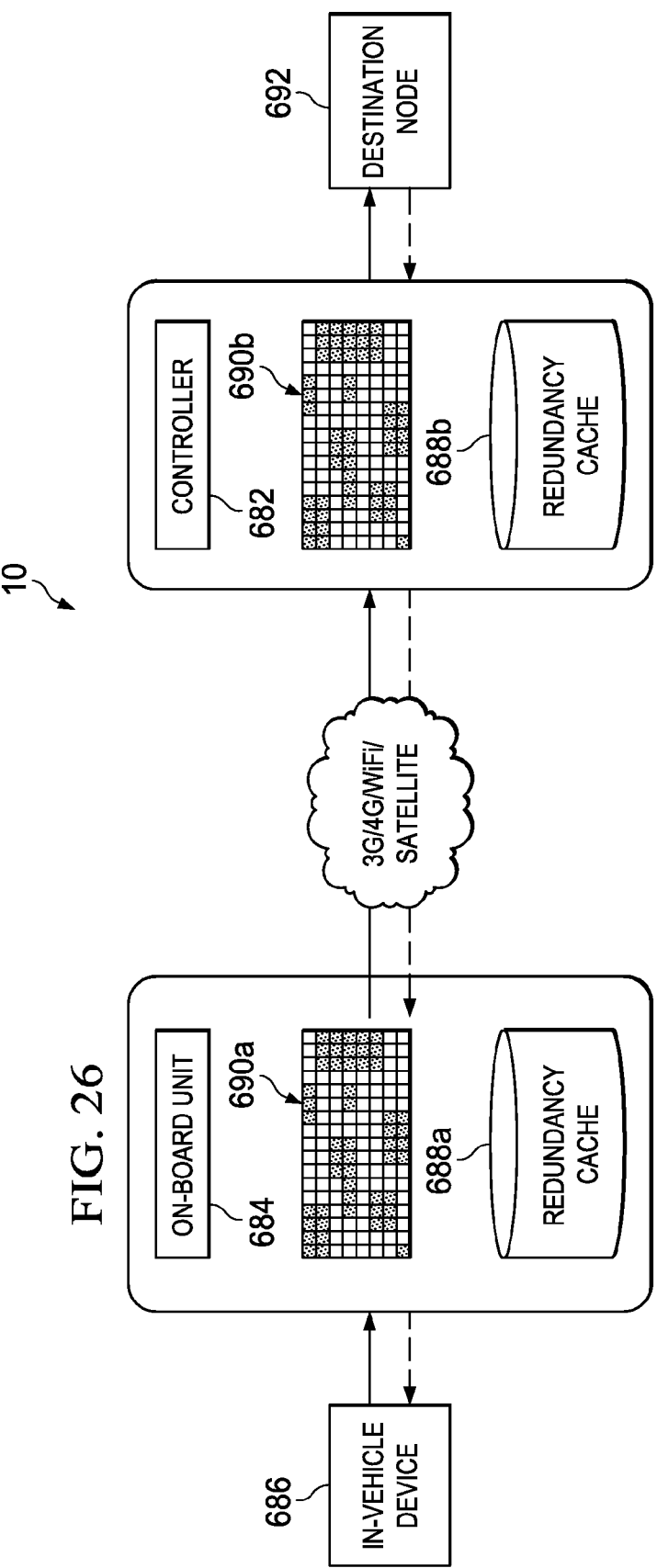
FIG. 26 is a simplified schematic diagram of a traffic redundancy elimination scheme, according to embodiments of the present disclosure.

Turning to FIG. 26, FIG. 26 is a simplified schematic diagram of a traffic redundancy elimination scheme in communication system 10 to optimize data flows, according to embodiments of the present disclosure. Redundancy elimination technique can be applied at both controller 682 and OBU 684 to reduce the traffic load and permit data traffic to be passed through efficiently between these two entities, even during mobility handover events. This can be accomplished by removing duplicate strings from arbitrary data blocks (e.g., both intra and inter data block levels) exchanged between controller 682 and OBU 684. In one embodiment, a data block may be obtained from a payload of a data packet and may comprise one or more data strings. A redundant data string is a data string that is found in a data block and matches (or substantially matches) a data string in another data block (e.g., data block stored in redundancy cache).

In an example scenario, OBU 684 inspects traffic from in-vehicle device 686 and OBU 684 compares the data blocks in the traffic against recently forwarded data blocks stored in redundancy cache 688a on OBU 682. A bidirectional database of data blocks may be maintained in redundancy cache 688a. Redundant and/or duplicate data strings can be identified and replaced with small signatures 690a. Signatures 690a may also contain instructions to network controller 682 about how to rebuild the original message safely. Network controller 682 can reconstruct full data blocks from its own redundancy cache 688b before delivering the data to destination node 692.

As new data patterns are identified, they can be added to redundancy caches 688a and 688b to be used in the future to help eliminate transmission of redundant data strings. Patterns that have been learned from one application flow can also be used when another flow, even from a different application, is being evaluated. This method may help reduce bandwidth consumption and effects of latency because fewer packets may have to be exchanged over the network to achieve the same level of throughput. Such redundancy elimination mechanisms can provide up to 50% of bandwidth savings. Similarly, for traffic flow from destination node 692 to in-vehicle device 686 or applications residing on OBU 684, network controller 682 inspects traffic from destination node 692 and compares the data blocks from the traffic against data blocks in its redundancy cache. Redundant and/or duplicate data strings can be identified and replaced with small signatures 690b, which contain instructions to OBU 684 about how to rebuild the original message safely before OBU 684 delivers the message to in-vehicle device 686 or applications residing on OBU 684.

Figure 27:
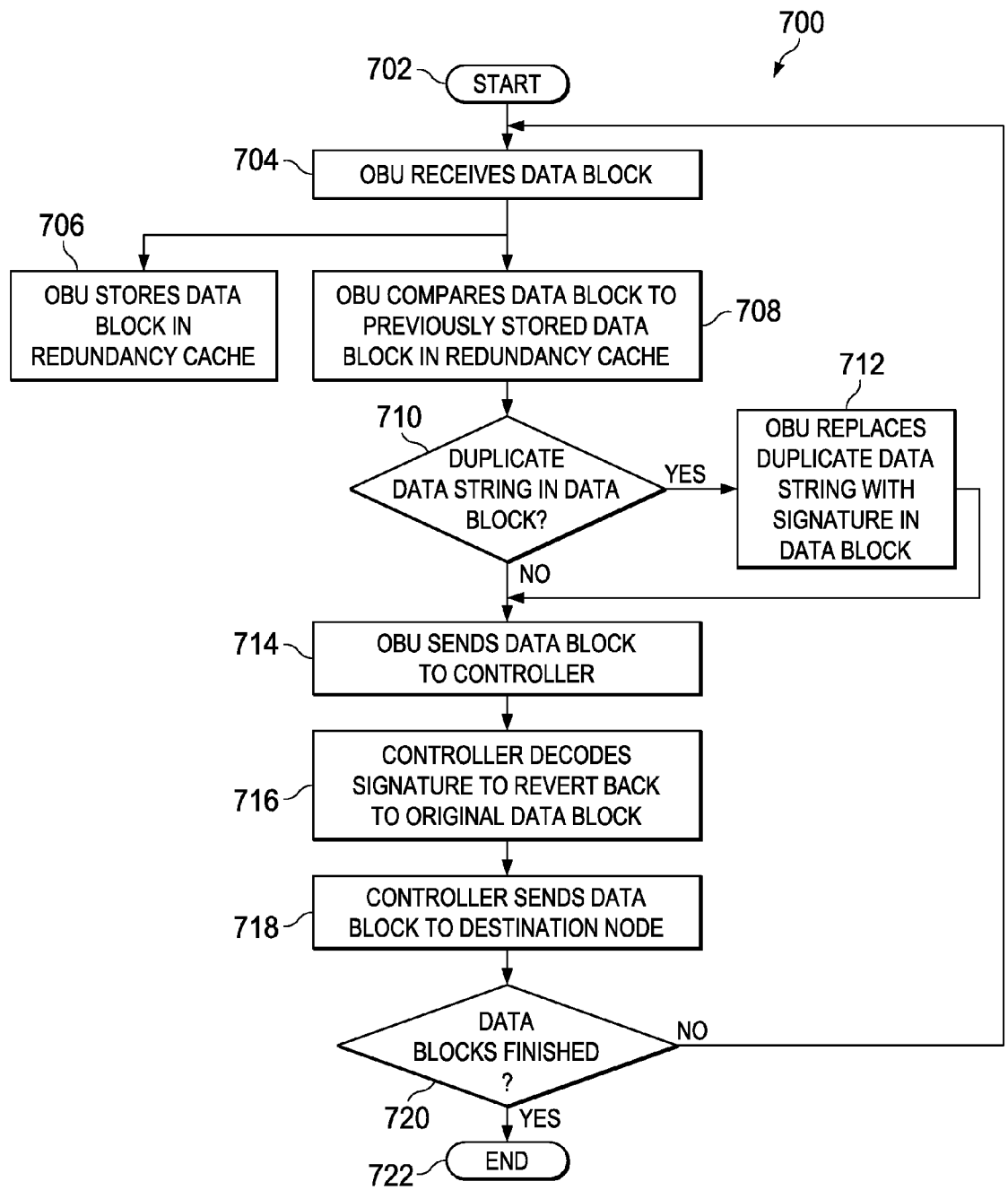
FIG. 27 is a is a flowchart illustrating a data optimization method, according to yet another embodiment of the present disclosure.

Turning to FIG. 27, FIG. 27 is a flowchart illustrating a data optimization method 700 using a redundancy cache 688, according to an embodiment of the present disclosure. The data optimization method starts in step 702. In step 704, OBU 684 receives a data block comprising data strings from an in-vehicle device or application.

OBU 684 stores the data block in its redundancy cache 688a in step 706. OBU 684 also compares the data block to previously stored data blocks in its redundancy cache 688a in step 708. If a criterion is met, i.e., OBU 684 determines that one or more of the data strings in the data block is identical to one or more of the data strings in the previously stored data blocks in its redundancy cache 688a in step 710, OBU 684 replaces such duplicate data strings in the data block with a signature as described above in connection with FIG. 26 in step 712. OBU 684 sends the data block comprising the modified data string to controller 682 in step 714. If there are no redundant data strings in the data block, OBU 684 forwards the data block comprising the unmodified data string to controller 682 in step 714. Controller 682 decodes the data according to the signature rule and converts the signature back to the original data in step 716. Controller 682 sends the data block comprising the data strings to a destination node in step 718. The process is repeated for all data blocks in a network session as indicated by step 720. When the data blocks comprising the data strings are over, the process ends in step 722.

It will be appreciated that although the method has been described above in a situation where OBU 684 receives the initial data block from an in-vehicle device, the method is applicable to the situation where controller 682 receives the initial data block from a remote node, for example, a data center or cell phone. In such situation, controller 682 replaces redundant data strings with signatures and sends the compressed data string to OBU 684, which decodes the compressed data string to revert to the original message before sending it to the in-vehicle device.

Figure 28:
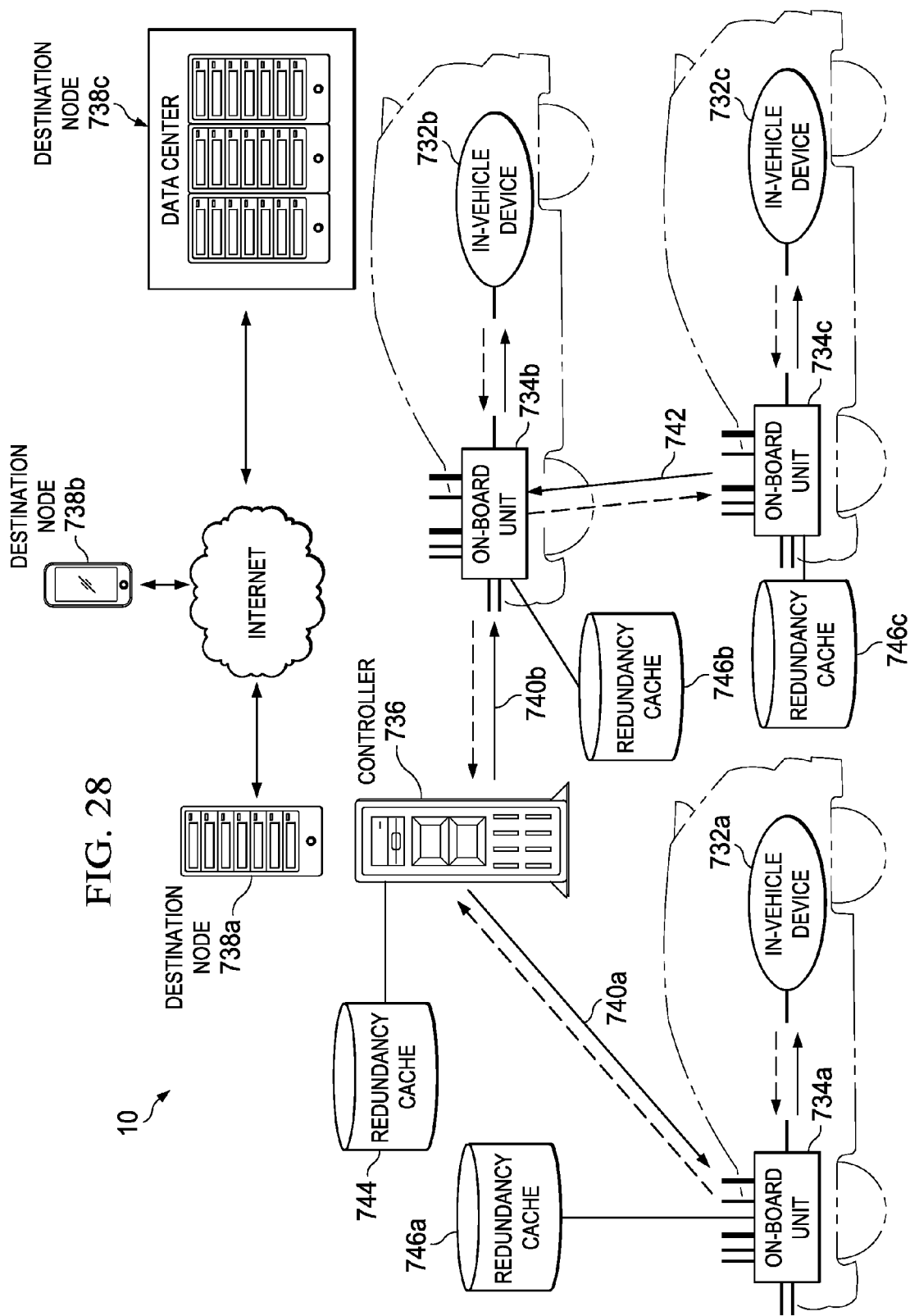
FIG. 28 is a simplified schematic diagram illustrating an exemplary network environment in accordance with embodiments of the present disclosure.

Turning to FIG. 28, FIG. 28 shows the interaction between multiple OBUs and a network controller 736. In-vehicle devices 732a-c connect through OBU 734a-c and network controller 736 to reach destination nodes 738a-c. Destination nodes 738a-c may be servers, devices and/or data centers residing remotely, for example, on Enterprise or Internet clouds. OBU 734a and OBU 734b may reach controller 736 through multiple wireless links 740a and 740b respectively. For example, wireless link 740a may be WiFi and wireless link 740b may be 3G. OBU 734c is not directly connected to controller 736, but can connect to controller 736 indirectly through OBU 732b via peer-to-peer link 742. Controller 736 can aggregate information from multiple OBUs, and stores the information in its redundancy cache 744 for future use. OBUs 734a-c can have associated redundancy caches 746a-c respectively. Controller's redundancy cache 744 may contain a large amount of information, which can enable controller 736 to identify redundant data fast and efficiently. In contrast, OBU 732a may have only information from multiple sessions with in-vehicle device 732a, for example. Therefore, its redundancy cache 746a can contain much less information and historical patterns than controller's redundancy cache 744. Thus, in comparison to a controller that aggregates information from multiple OBUs, an OBU that aggregates information only from in-vehicle devices may not perform traffic redundancy elimination as efficiently. On the other hand, with peer-to-peer networking as between OBU 734b and OBU 734c, an OBU, for example, OBU 734b, may also be able to aggregate information from other OBUs, similar to a controller, and improve its redundancy recognition capability.

Figure 29:
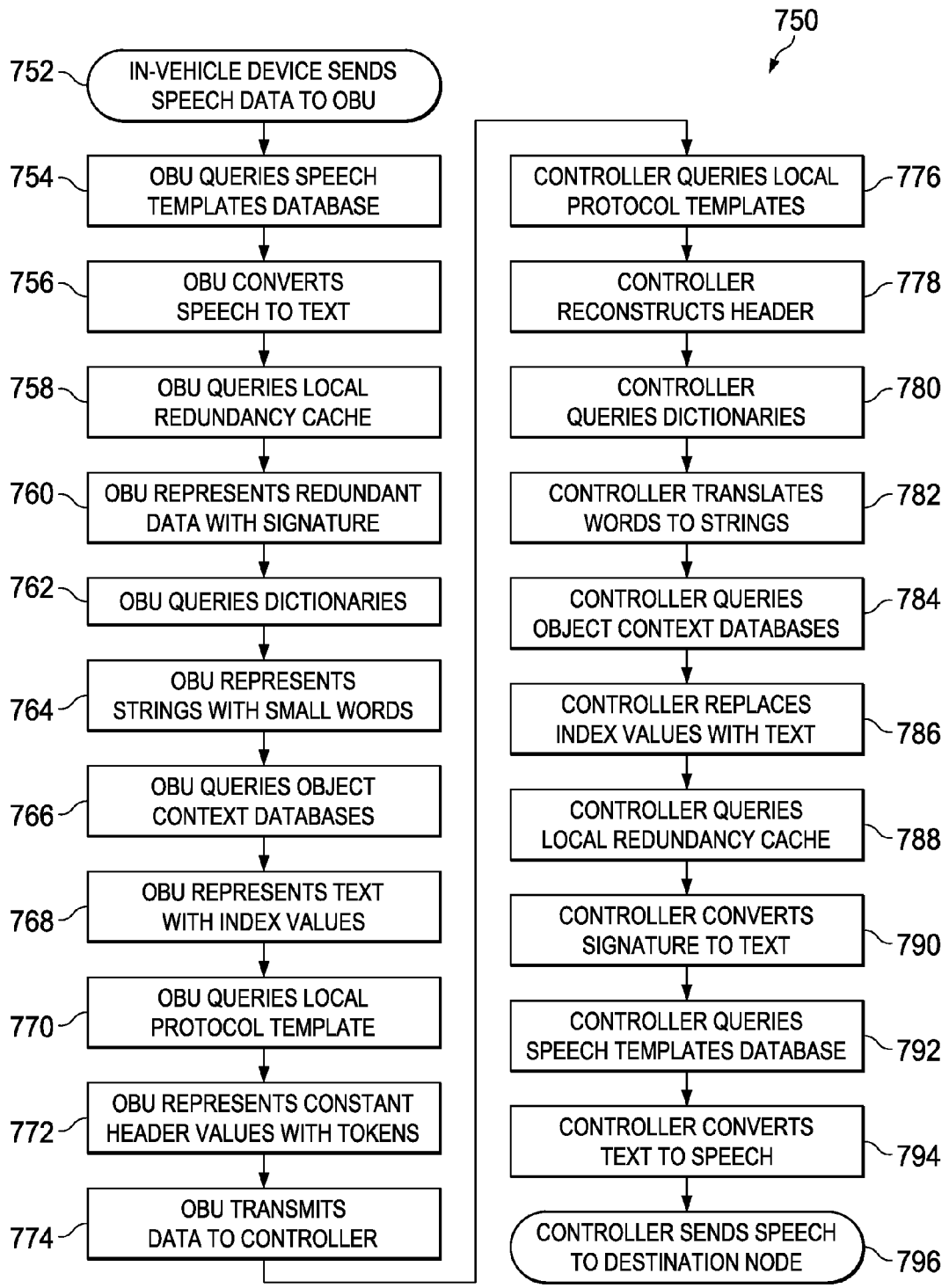
FIG. 29 is a is a flowchart illustrating a data optimization method, according to an embodiment of the present disclosure.

Turning to FIG. 29, FIG. 29 illustrates an example data optimization method 750. The techniques described above with reference to FIGS. 21 through 28 may be used simultaneously. An in-vehicle device, for example, a cell phone, may transmit speech to a destination node, which may be another cell phone through OBU 522 and controller 530 in step 752. When OBU 522 receives the traffic from the in-vehicle device 528, it queries speech template database 540 to determine whether appropriate conversion mechanisms exist in step 754. If appropriate conversion mechanisms exist, OBU 522 converts the audio data into text in step 756. If appropriate conversion mechanisms do not exist, OBU 522 may dynamically modify speech templates database 540 to add the user's speech. OBU 522 compares the text data to data blocks in its redundancy cache 532a to eliminate redundant data in step 758 and replaces redundant data with signatures in step 760. OBU 522 queries dictionaries 536 in step 762 and translates appropriate text strings into smaller words in step 764. OBU 522 queries an object context database 538 in step 766 and if appropriate object contexts exist, OBU 522 modifies the text strings appropriately with a small index value in step 768. If appropriate translations and object contexts do not exist in dictionaries 536 and object context databases 538, OBU 522 may dynamically cause dictionaries 536 and object context databases 538 to add new translations and object contexts. Finally, OBU 522 queries its local protocol header template database 534a in step 770 and replaces constant header values with small tokens in step 772. OBU 522 sends the converted and compressed text to controller 530 in step 774.

When controller 530 receives the converted and compressed text, it queries its local protocol header template database 534b in step 776 and reconstructs the header in step 778. Controller 530 queries dictionaries 536 in step 780 and replaces words with the appropriate strings in step 782. Controller 530 queries object context databases 538 in step 784 and replaces index values with appropriate text in step 786. Controller 530 queries its local redundancy cache 532b in step 788 and converts all the compressed signatures back to text in step 790. Controller 530 queries suitable speech template databases 540 in step 792, and uses other methods described above in connection with compressing audio data, to re-convert the text back to its original audio form in step 794. Controller 530 sends the reconstructed and decompressed speech to destination nodes in step 796.

Although the method above has been described as being implemented in a specific sequence of steps, it will be appreciated that the sequence and/or order of steps may be changed without changing the scope of the method. For example, OBU 522 or controller 530 may query object contexts database 538 before querying dictionaries 536, or OBU 522 or controller 530 may compress headers simultaneously as it replaces redundant data with signatures. It will also be appreciated that although the method has been described above in a situation where OBU 522 receives the initial data block from an in-vehicle device 528, the method is applicable to the scenario where controller 530 receives the initial data block from a remote node, for example, a data center or cell phone.

Figure 30:
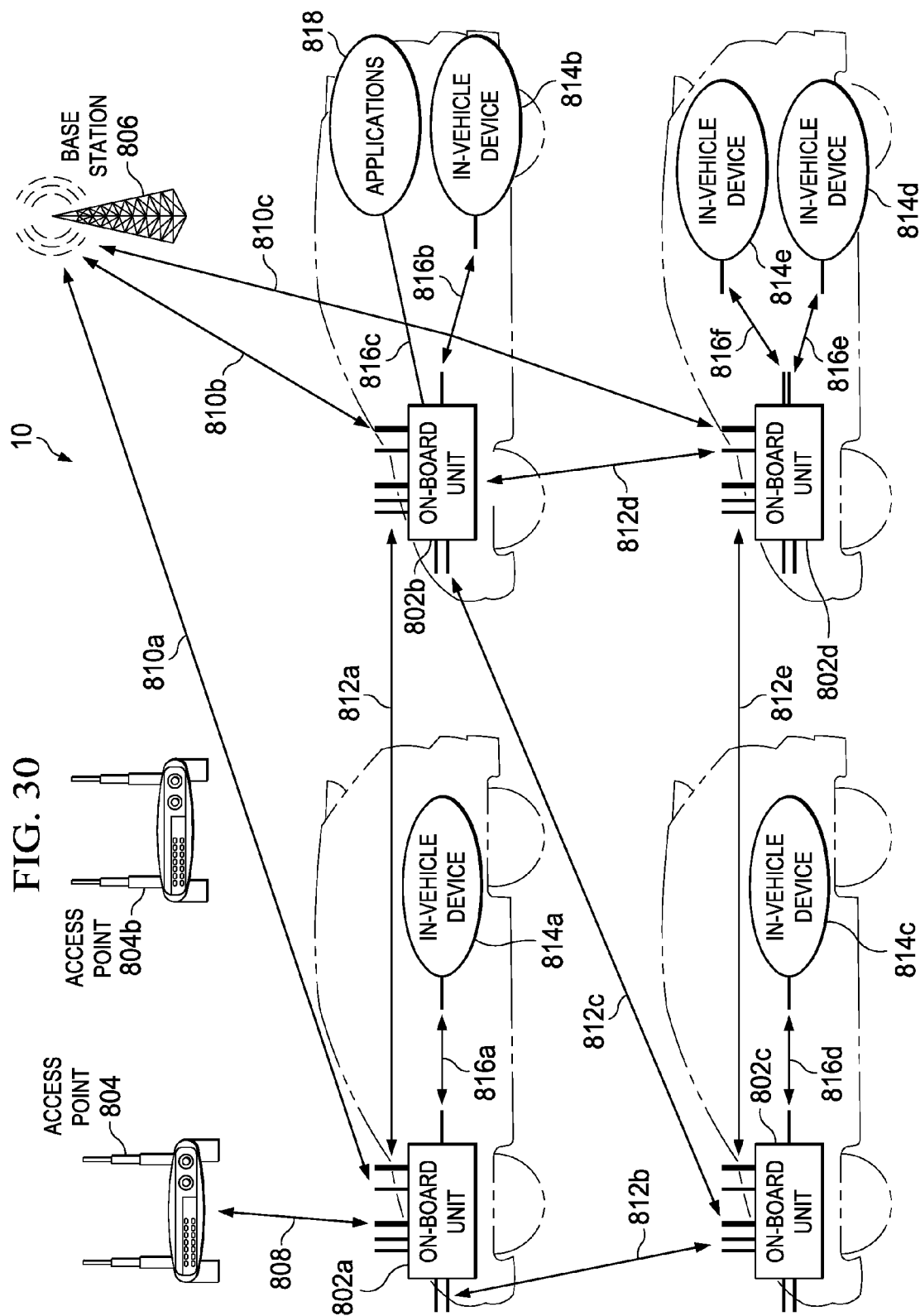
FIG. 30 is a simplified schematic diagram illustrating an exemplary network according to embodiments of the present disclosure.

Turning to FIG. 30, FIG. 30 is a simplified schematic diagram illustrating an ad hoc network of a communication system 10 according to embodiments of the present disclosure. Each OBU 802a-d (referred to collectively herein as OBU 802) may include a plurality of wireless interfaces (e.g., WiFi, 3G, 4G, 802.11p, Bluetooth, etc.) including internal interfaces connecting OBUs 802a-d to in-vehicle devices 814a-e (referred to collectively herein as in-vehicle devices 814) via internal links. The interfaces of each OBU 802a-d may also include external interfaces connecting OBUs 802a-d to road-side infrastructure devices 804 and 804b and/or base station 806 and to other vehicles via external links. Road-side infrastructure devices may provide coverage for communications from OBUs to Internet clouds and/or other OBUs. In example embodiments, road-side infrastructure device 804 may include access technologies covering a localized area (e.g., along a road-side) such as, for example, Femto, Pico, Micro and IEEE 802.11a/b/g/n/ac/ad technologies. In one example implementation, many road-side infrastructure devices with localized technologies (e.g., WiFi, etc.) may not initially be wired with back end connectivity to the Internet, but rather, could operate primarily to provide Layer 2 (L2) coverage to enable communication between OBUs. However, these devices could be subsequently wired for back end connectivity, thereby providing scalability.

OBU 802a is connected one-hop to road-side infrastructure device 804 and one hop to base station 806 through external links 808 and 810a, respectively, through corresponding external interfaces. In an example embodiment, link 808 could be WiFi and link 810a could be 3G. OBU 802a is also connected to OBUs 802b and 802c via external links 812a and 812b respectively. Internally, OBU 802a is connected to in-vehicle devices 814a, for example, vehicle centric units such as camera, infotainment systems, and sensors, and smart devices such as smart phones and laptops via internal link 816a through a corresponding internal interface. In an example embodiment, link 816a could be IEEE 802.11.

OBU 802b is connected internally to in-vehicle devices 814b through internal link 816b. In one example, link 816b may be an Ethernet connection. Applications 818 may be running on OBU 802b, and it will be apparent that applications may also be running on other OBUs and in-vehicle devices associated with OBUs. OBU 802b is connected externally to base station 806 through external link 810b and to OBUs 802a, 802c and 802d through external links 812a, 812c and 812d respectively. OBU 802c is connected externally to OBUs 802a, 802b and 802d through external links 812b, 812c and 812e respectively. Internally, OBU 802c is connected to in-vehicle devices 814c via internal link 816d. OBU 802d is connected to in-vehicle devices 814d and 814e through internal links 816e and 816f respectively. OBU 802d is connected externally to OBUs 802b and 802c through external links 812d and 812e respectively and to base station 806 through external link 810c.

In the above described example network, OBUs, in-vehicle devices and applications may connect multi-hop to road-side infrastructure devices, base stations, other OBUs and other in-vehicle devices or road-side infrastructure devices. For example, OBU 802d may connect to road-side infrastructure device 804 through multi-hop connections, for example, through link 812e to OBU 802c, link 812b to OBU 802a, and link 808 to road-side infrastructure device 804. OBU 802c may connect multi-hop to base station 806 via link 812c to OBU 802b and link 810b to base station 806. Application 818 may communicate with base station 806 through link 816c to OBU 802b and link 810b to base station 806. The interfaces shown on OBUs 802 and in-vehicle devices 814 are shown for example purposes, and these OBUs and devices may each be alternatively configured with more or less interfaces based on particular component configurations and/or needs. It will be appreciated that various other combinations of one-hop and multi-hop connections are possible through the interfaces described above. Other combinations of interfaces and connections not described herein are also possible, as will be evident to a person of ordinary skill in the art. Additional road-side infrastructure devices and base stations and/or other network access points may also be connected to the network described above without changing the scope of the disclosure. The devices, applications and interfaces are shown for example purposes only, and not as limitations.

A frequency channel of an external vehicle-to-road-side infrastructure connection is often dictated by the frequency channel assigned to the road-side infrastructure device, for example, road-side infrastructure device 804. Multihop communication between vehicles (i.e., ad hoc networking) often uses a predetermined set of frequency channels or bands. In an exemplary embodiment located in the United States, non-overlapping channels 1, 6 and 11 corresponding to 2412 MHz, 2437 MHz and 2462 MHz respectively can be used by WiFi road-side infrastructure devices out of eleven (11) available channels in the wireless spectrum for wireless LAN. If internal link 816a is operating in the same frequency channel as external link 808, it may lead to severe interference between the internal and external links as OBU 802a approaches road-side infrastructure device 804.

To minimize interference, OBU 802a can dynamically terminate link 808 to road-side infrastructure device 804 and select only link 810a to base station 806 as its exclusive external communication link. Thus, according to embodiments of the present disclosure, OBUs may have the ability to selectively turn external interfaces off for interference mitigation. Alternatively, and aside from signal separation in spatial, temporal, and coding dimensions, OBU 802a can operate on multiple links and corresponding interfaces simultaneously by dynamically adjusting the frequency channel of internal link 816a to avoid the frequency channel used by external link 808. However, if there are other road-side infrastructure devices operating near by, for example, road-side infrastructure device 804b, the frequency channels of those road-side infrastructure devices should be avoided as well to minimize interference.

Additionally, as OBU 802a moves from a coverage area of road-side infrastructure device 804 to a coverage area of road-side infrastructure device 804b, the frequency channel of the external connection may change. Dynamic frequency assignment in such ad hoc networking between vehicles is a challenging problem due to the constantly and potentially rapidly changing network topology. The ad hoc wireless interfaces may be configured to transmit and receive on the same frequency channel, alternatively, if multiple frequency channels are available, network throughput can be improved by assigning different frequency channels to nearby interfaces. However, these methods may rely on either centralized assignment, which is impractical for large networks, or local coordination, which may take a long time to converge. In particular, optimal frequency selection is an NP complete problem (i.e., nondeterministic polynomial time problem, which is difficult to solve, according to computational complexity theory), making it difficult to converge to a solution. Alternatively, heuristic frequency channel assignment may reduce computational burden, but it is not optimal.

Figure 31:
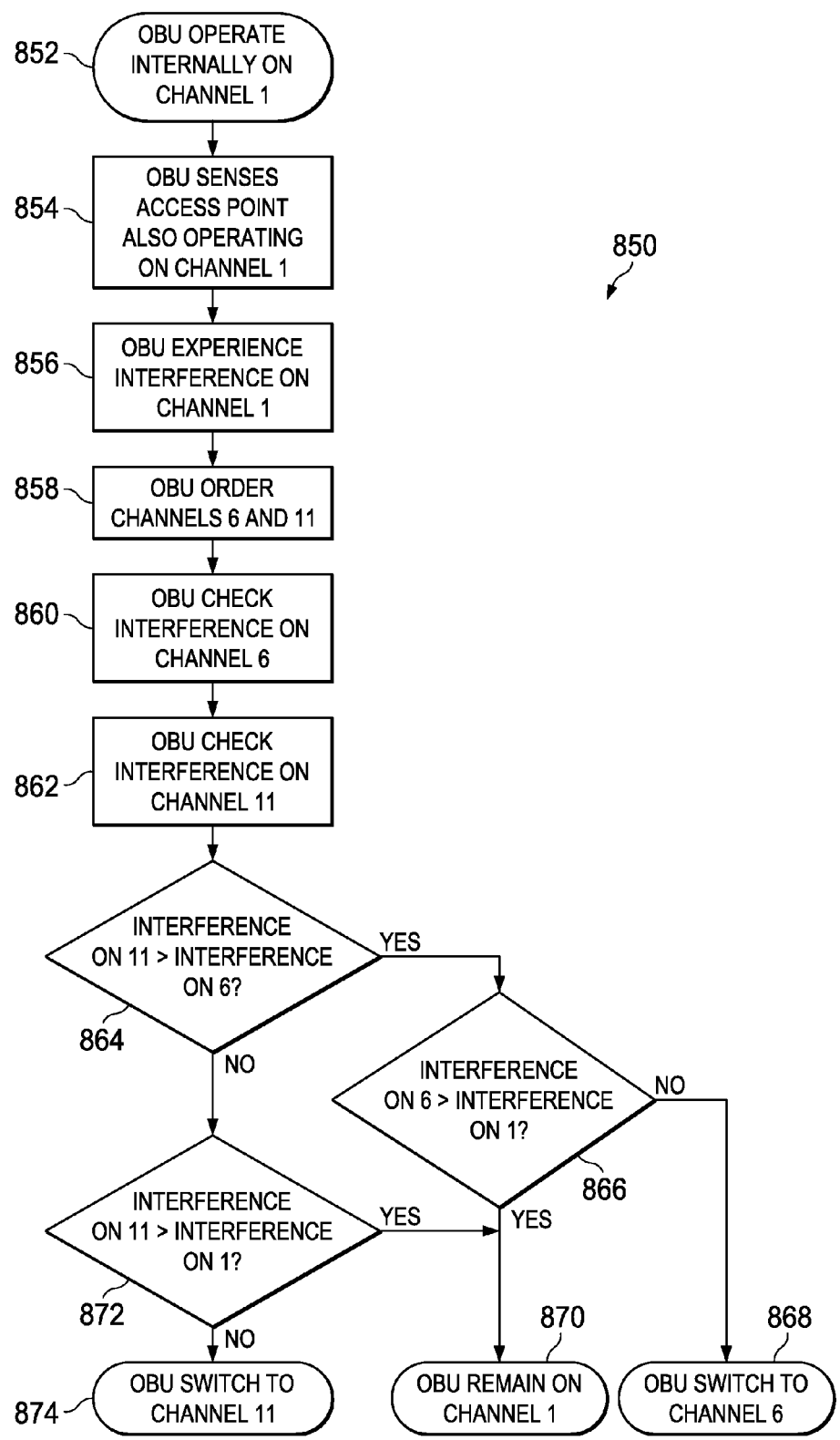
FIG. 31 is a flow chart for a method for location-aware spectrum sensing and dynamic frequency tuning, according to an embodiment of the present disclosure.
Figure 32:
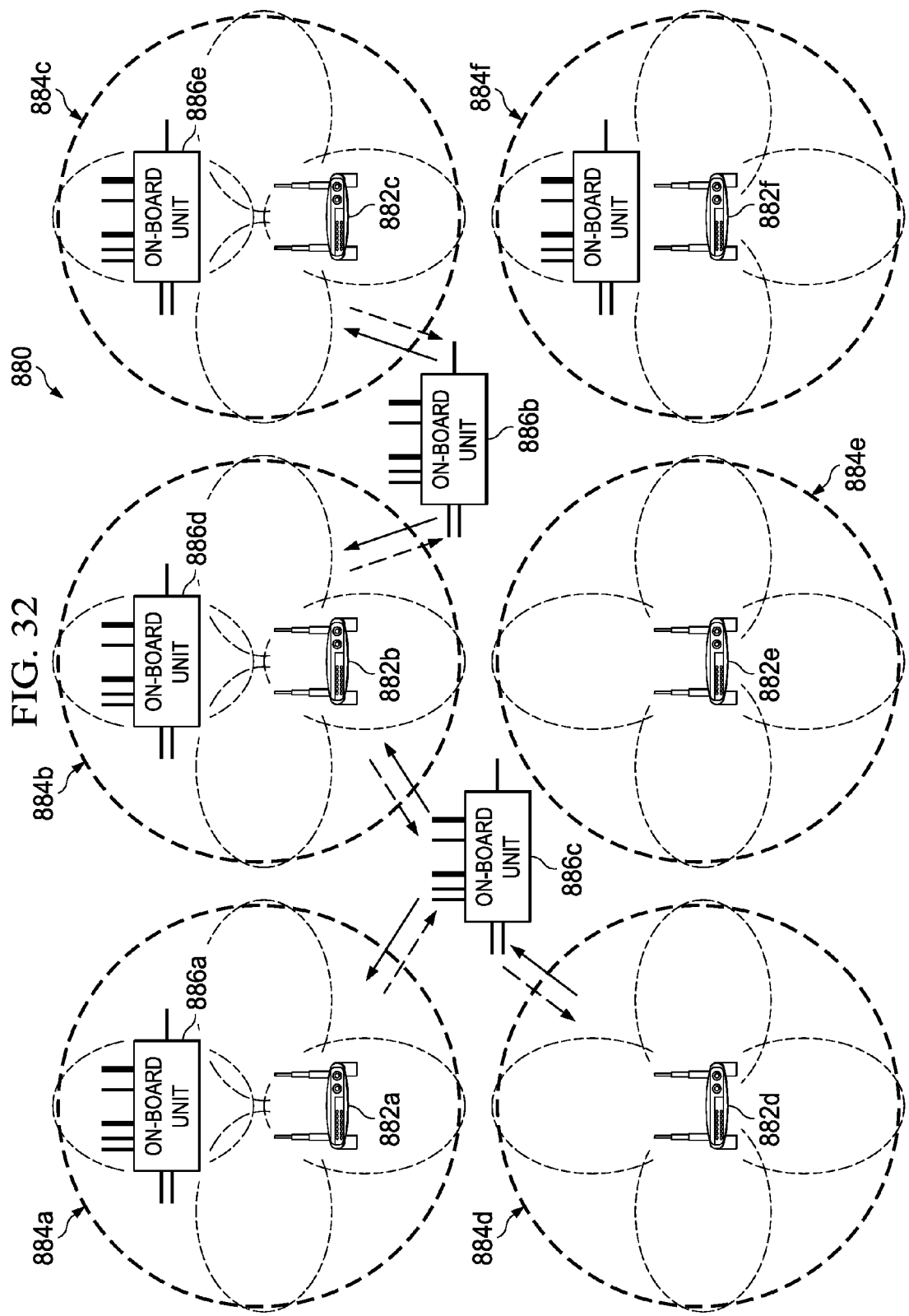
FIG. 32 is a simplified schematic diagram of a frequency map associated with multiple road-side infrastructure devices associated with embodiments of the present disclosure.

According to an embodiment of the present disclosure, OBU 802a dynamically selects a frequency channel based on spectrum sensing and dynamic frequency tuning as described herein with reference to FIGS. 31 and FIGS. 32. In particular, dedicated road-side infrastructure devices may be used as frequency assignment anchors for external connections and a greedy algorithm may be used for internal frequency assignment in response to external frequency assignment changes.

Turning to FIG. 31, FIG. 31 illustrates a flow diagram for a method 850 for internal connection frequency channel selection. In step 852, an OBU 802 operates its internal interface on channel 1, for example, when communicating with an in-vehicle device 814. Internal connection frequency channel selection of FIG. 31 may be initiated when OBU 802 is powered ON and when an external link selects a new frequency channel. For illustration purposes, specific non-overlapping channels (i.e., channels 1, 6, and 11) are used in particular steps of the method of FIG. 31. In step 854, OBU 802 approaches an access point, for example, road-side infrastructure device 804, and senses that it also operates on channel 1. OBU 802 senses this information when an internal link of OBU 804, for example, link 816, listens to the channel and determines which channels are occupied. OBU 802 experiences and measures interference on channel 1 in step 856.

OBU 802 may utilize a greedy algorithm, which orders the remaining available channels 6 and 11 in step 858. OBU 802 checks interference on channel 6 in step 860 and on channel 11 in step 862. OBU 802 compares interference on channel 6 with interference on channel 11 in decision step 864. If interference on channel 11 is greater than interference on channel 6, OBU 802 compares interference on channel 6 with interference on channel 1 in decision step 866. If interference on channel 6 is lower, OBU 802 switches to channel 6 in step 868, otherwise, OBU 802 remains in channel 1 in step 870. On the other hand, if interference on channel 11 is lower than interference on channel 6 from decision step 864, OBU 802 compares interference on channel 11 with interference on channel 1 in decision step 872. If interference on channel 11 is lower, OBU 802 switches to channel 11 in step 874, otherwise, OBU 802 remains in channel 1 in step 870. Thus, in this embodiment, one of the free channels from the ordered list, having the lowest interference, is selected.

Other factors may also be considered in selecting a frequency channel. If an error rate on a current frequency channel exceeds a predetermined threshold, then OBU 802 may select a new frequency channel. In addition, if other types of external interfaces are available on OBU (e.g., 3G, 4G, etc.), the OBU 802 may turn off the external WiFi interfaces, for example, interface to external link 808, and only allow external communication through the other available external interfaces, for example, interface to external link 810. As a result, the internal WiFi links can be assigned non-interfering frequency channels and/or achieve better performance.

Turning to FIG. 32, FIG. 32 is a simplified diagram of a frequency map associated with multiple road-side infrastructure devices or access points over ad hoc network 880. Adjacent access points are assigned different and non-overlapping channels to act as anchor points for frequency selection. In one embodiment, these adjacent road-side access points may be dedicated as frequency channel anchors for ad hoc networks and may or may not be connected to wide area networks such as the Internet. Initially, as an OBU 886 enters network environment 880, it can associate with the nearest road-side access point (AP) or with the road-side AP that has the best wireless performance characteristics and can adopt the associated AP's frequency. OBUs 886a-e that have multiple ad hoc network interfaces can be associated with more than one AP simultaneously as depicted in FIG. 32. These OBUs 886a-e can bridge connectivity between multiple AP coverage areas and their associated OBUs 886a-e, thereby achieving multi-hop communication between OBUs 886a-e, without the complexity of ad hoc network dynamic frequency channel assignment.

For illustration purposes in FIG. 32, assume access point 882a operates on channel 1, access point 882b operates on channel 6, access point 882c operates on channel 11, access point 882d operates on channel 11, access point 882e operates on channel 1, and access point 882f operates on channel 6 and so on. No two adjacent access points would have the same frequency. Frequencies may be assigned according to pre-planned maps or via intelligent frequency channel selection, based on network interference. Coverage areas 884a-f of these dedicated access points 882a-f can be non-overlapping as long as the coverage is distributed over a geographical area. For example, the coverage area of each access point can be 100-300 meters. Also, access points 882*a-f* need not be connected to the Internet, however, they have to be powered for operation. Therefore, they can be deployed cost-effectively and in large numbers. For example, they can be deployed on traffic lights or light poles in a city.

Assume OBU 886*a* is operating internally on channel 1, and approaches coverage area 884*a* of access point 882*a*, also operating on channel 1. OBU 886*a* can dynamically change its internal operating channel to available channel 6 that has the least interference as described in connection with FIG. 25. OBU 886*b* may simultaneously detect multiple access points, for example, access point 882*b* and 882*c*, which operate on channels 6 and 11 respectively. Therefore, OBU 886*b*, which may be internally operating on channel 6, can switch to the only other available channel, namely, channel 1. OBU 886*c*, which may have an internal operating channel of 1, approaches access points 882*a*, 882*b* and 882*d* operating on channels 1, 6 and 11 respectively. Because there are no other available operating channels, OBU may dynamically select the channel that has the least interference according to the method described in FIG. 25. Further, OBU 886*d* can communicate with OBU 886*b* through access point 882*b*. OBU 886*b* can act as a bridge between non-overlapping coverage areas, for example, to connect OBU 886*d* with OBU 886*e*. OBU 886*d* connects to access point 882*b*, then to OBU 886*b*, then to access point 882*c*, and finally to OBU 886*e*. Thus, even if the access points do not have connectivity to the Internet, OBUs may communicate with each other and with other access points through the ad hoc network described herein. It will be appreciated that although the communication system has been described with OBUs communicating with static wireless access points, OBUs may also communicate with other OBUs within wireless range of each other.

Figure 33:
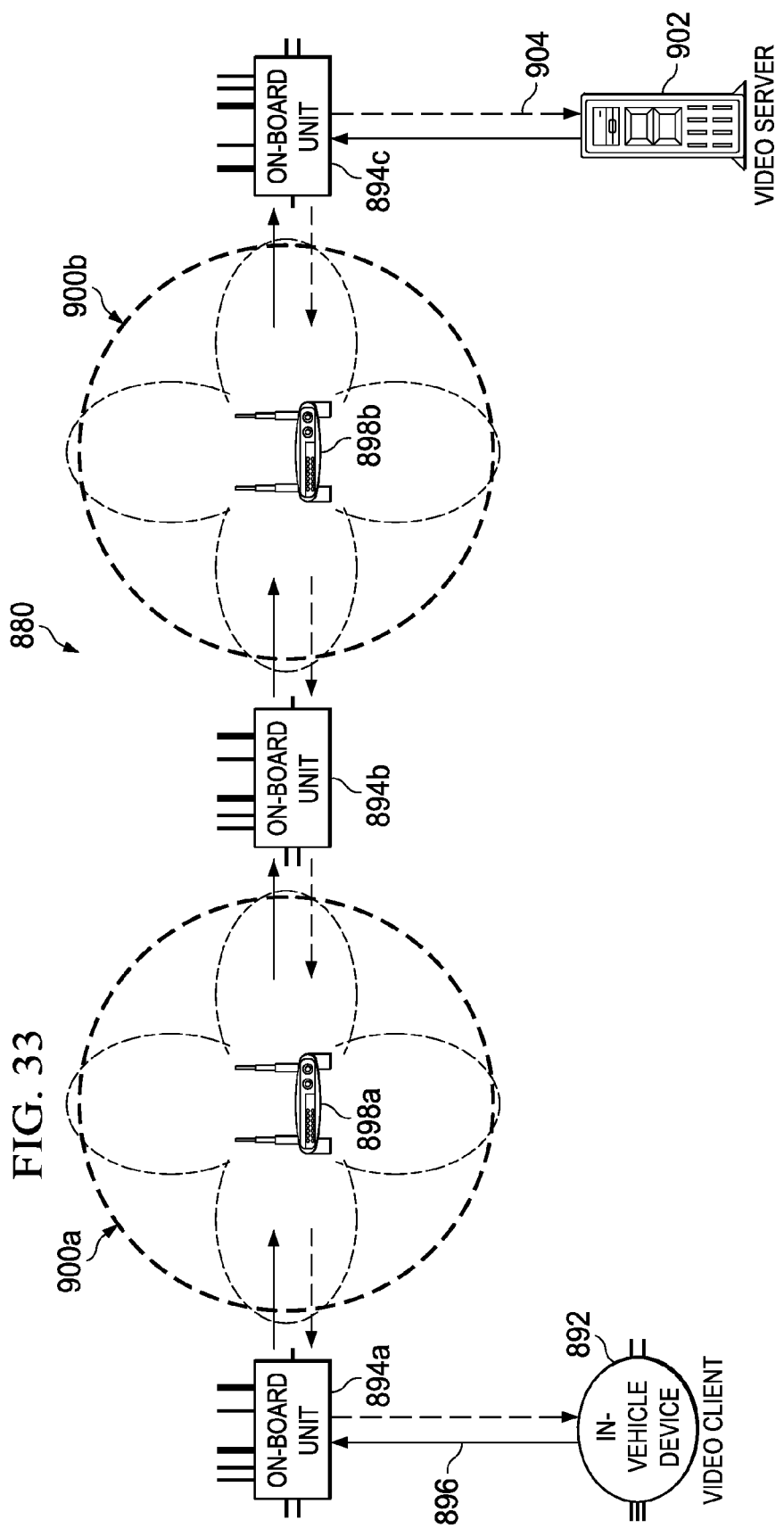
FIG. 33 is a simplified schematic diagram of an exemplary network associated with embodiments of the present disclosure.

Turning to FIG. 33, an example scenario with illustrative channel assignments of ad hoc network 880 is depicted in a simplified diagram. In-vehicle device 892, for example, a video client, communicates with OBU 894*a* through link 896, operating on channel 6. Assume access point 898*a* with coverage area 900*a* operates on channel 1. Access point 898*b* with coverage area 900*b* operates on channel 6. OBU 894*b* accesses both coverage area 900*a* and coverage area 900*b* and operates on channel 11. OBU 894*c* operates on channel 1 and communicates with video server 902 via internal link 904, operating on channel 11. Interference between internal and external communication links is reduced in this network. Video client 892 sends video traffic to OBU 894*a* via link 896. OBU 894*a* connects to OBU 894*b* through access point 898*a*. OBU 894*b* in turn communicates the video traffic to OBU 894*c* through access point 898*b*. Finally, OBU 894*c* sends the video traffic to video server 902 via link 904. Traffic back from video server 902 to video client 892 can follow the same path of least interference.

In certain implementations and numerous examples provided herein, vehicle 10 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In one example implementation, the on-board unit (OBU) (e.g., OBUs 30, 130*a-d*, 302, 328, 522, 684, 734*a-c*, 802*a-d*, 886*a-e*, 894*a-c*) and controller (e.g., controllers 145*a-b*, 310, 530, 682, 736) are network elements that facilitate or otherwise help coordinate mobility events, network connectivity, and the transmission of data packets (e.g., for mobile devices, for machine devices, for nodes, for end users, or for a network such as those illustrated in the FIGURES herein) associated with a vehicular network environment. As used herein, the term 'network element' is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In example implementations, at least some portions of the internal networking, data optimization and dynamic frequency selection activities outlined herein may be implemented in software in, for example, the OBU and/or controller. In some embodiments, one or more of these features may be implemented in hardware, provided external to these elements, or consolidated in any appropriate manner to achieve the intended functionality. The OBU and controller may include software (or reciprocating software) that can coordinate in order to achieve the operations, as outlined herein. In still other embodiments, one or both of these elements may include any suitable algorithms, hardware, software, components, modules, interfaces, or objects that facilitate the operations thereof. Furthermore, OBUs described and shown herein may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements.

It is imperative to note that, because of the inherent properties of the technologies being leveraged by the present disclosure, the terms 'node', 'network element', 'OBU', and 'controller' are broad and, therefore, inclusive of many of the equipment examples discussed herein (e.g., a router, a wireless mobile device, a gateway, etc.). Such expansive breadth is afforded to this terminology due to the flexibility of the presented architectures (e.g., components can be readily exchanged for alternatives). Moreover, there are countless possible design configurations that can be used to achieve the operational objectives outlined here. Accordingly, the associated infrastructure has a myriad of substitute arrangements, design choices, device possibilities, hardware configurations, software implementations, equipment options, etc. In addition, the terms 'node', 'network element', 'OBU', and 'controller' share overlapping definitions as used herein in this Specification, where particular scenarios and environments may require these elements to be extended to specific device provisioning that is atypical. At least in a general sense, these terms are interchangeable due to the limitless schemes in which they can be deployed.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An on-board unit (OBU) of a vehicle, the OBU comprising:
    at least one database for storing content; and
    a hardware processor configured to execute instructions to:
        receive a first data block from a first node in a vehicular network, the first data block including a header portion and a data portion;
        access the content in the database;
        compare the data portion of the first data block to the content;
        determine whether a criterion is met, wherein the criterion is based, at least in part, on a type of data contained in the data portion of the first data block;
        compress the first data block to a second data block if the criterion is met, wherein compression of the first data block includes compression of the data portion of the first data block based, at least in part, on the content; and
        send, via a wireless communication link, the second data block to a controller.

2. The OBU of claim 1, wherein the controller is configured to:
    receive a third data block from a second node;
    access second content in a second database;
    compare the third data block to the second content;
    determine whether a second criterion is met, wherein the second criterion is based, at least in part, on a type of data contained in the third data block;
    compress the third data block to a fourth data block if the second criterion is met, wherein compression of the third data block is based, at least in part, on the second content; and
    send the fourth data block to the OBU.

3. The OBU of claim 1, wherein:
    the content comprises a plurality of previously stored data blocks;
    when the first data block is compressed to the second data block, a first data string in the first data block is replaced with a signature containing instructions to convert the second data block back to the first data block; and
    the criterion is met if the first data string in the first data block corresponds to a second data string in one of the plurality of previously stored data blocks.

4. The OBU of claim 1, wherein the processor is configured to execute the instructions to:
    compare the header portion of the first data block to second content;
    determine whether a second criterion is met based, at least in part, on the comparison, wherein the second content comprises a plurality of protocol header templates containing previously stored protocol header information associated with corresponding tokens; and
    when the first data block is compressed to the second data block, replace a protocol header information in the header portion of the first data block with a corresponding token from the second content,
    wherein the criterion is met if the protocol header information in the header portion of the first data block corresponds to at least one protocol header template in the second content.

5. The OBU of claim 1, wherein:
    the content comprises translations of a plurality of phrases to corresponding words;
    when the first data block is compressed to the second data block, a phrase in the first data block is replaced with corresponding words from the content; and
    the criterion is met if the phrase in the first data block corresponds to at least one phrase in the content.

6. The OBU of claim 1, wherein:
    the content comprises a plurality of speech templates containing representations of audio from a plurality of users by corresponding index values;
    when the first data block is compressed to the second data block, an audio from a user in the first data block is replaced with corresponding index values from the content; and
    the criterion is met if the audio from the user in the first data block corresponds to at least one speech template in the content.

7. The OBU of claim 6, wherein when the first data block is compressed to the second data block, other audio in the first data block is replaced with corresponding text.

8. The OBU of claim 1, wherein the OBU communicates with a remote transaction system via the controller.

9. The OBU of claim 1, wherein the first node is an in-vehicle device.

10. At least one non-transitory machine-readable medium comprising instructions stored thereon that, when executed, cause at least one processor to:
receive, on an on-board unit (OBU) of a vehicle, a first data block from a first node in a vehicular network, the first data block including a header portion and a data portion;
access content in a database;
compare the data portion of the first data block to the content;
determine whether a criterion is met, wherein the criterion is based, at least in part, on a type of data contained in the data portion of the first data block;
compress the first data block to a second data block if the criterion is met, wherein compression of the first data block includes compression of the data portion of the first data block based, at least in part, on the content; and
send, via a wireless communication link, the second data block to a controller.

11. The at least one non-transitory machine-readable medium of claim 10, wherein the instructions, when executed, cause the at least one processor to:
receive a third data block from the controller;
access the content in the database;
compare the third data block to the content;
determine whether another criterion is met;
decompress the third data block to a fourth data block if the other criterion is met; and
send the fourth data block to the first node.

12. The at least one non-transitory machine-readable medium of claim 10, wherein:
the content comprises a plurality of previously stored data blocks;
when the first data block is compressed to the second data block, a first data string in the first data block is replaced with a signature containing instructions to convert the second data block back to the first data block; and
the criterion is met if the first data string in the first data block corresponds to a second data string in one of the plurality of previously stored data blocks.

13. The at least one non-transitory machine-readable medium of claim 10, wherein the instructions, when executed, cause the at least one processor to:
compare the header portion of the first data block to second content;
determine whether a second criterion is met based, at least in part, on the comparison, wherein the compression of the first data block includes compression of the header portion of the first data block based, at least in part, on the second content.

14. The at least one non-transitory machine-readable medium of claim 10, wherein:
the content comprises a plurality of speech templates containing representations of audio from a plurality of users by corresponding index values;
when the first data block is compressed to the second data block, an audio from a user in the first data block is replaced with corresponding index values from the content; and
the criterion is met if the audio from the user in the first data block corresponds to at least one speech template in the content.

15. The at least one non-transitory machine-readable medium of claim 14, wherein when the first data block is compressed to the second data block, other audio in the first data block is replaced with corresponding text.

16. A method comprising:
receiving, by a hardware processor of an on-board unit (OBU) of a vehicle, a first data block from a first node in a vehicular network, the first data block including a header portion and a data portion;
accessing content in a database;
comparing the data portion of the first data block to the content;
determining whether a criterion is met, wherein the criterion is based, at least in part, on a type of data contained in the data portion of the first data block;
compressing the first data block to a second data block if the criterion is met, wherein compression of the first data block includes compression of the data portion of the first data block based, at least in part, on the content; and
sending, via a wireless communication link, the second data block to a controller.

17. The method of claim 16, wherein the controller is configured to:
receive a third data block from a second node;
access second content in a second database;
compare the third data block to the second content;
determine whether a second criterion is met, wherein the second criterion is based, at least in part, on a type of data contained in the third data block;
compress the third data block to a fourth data block if the second criterion is met, wherein compression of the third data block is based, at least in part, on the second content; and
send the fourth data block to the OBU.

18. The method of claim 16, further comprising:
comparing the header portion of the first data block to second content;
determining whether a second criterion is met based, at least in part, on the comparison, wherein the second content comprises a plurality of protocol header templates containing previously stored protocol header information associated with corresponding tokens,
wherein the compressing includes replacing a protocol header information in the header portion of the first data block with a corresponding token from the second content, and
wherein the criterion is met if the protocol header information in the header portion of the first data block corresponds to at least one protocol header template in the second content.

19. The method of claim 16, wherein:
the content comprises a plurality of speech templates containing representations of audio from a plurality of users by corresponding index values;
the compressing includes replacing an audio from a user in the first data block with corresponding index values from the content; and
the criterion is met if the audio from a user in the first data block corresponds to at least one speech template in the content.

20. A system, comprising:
an internal subsystem in a vehicle comprising a plurality of sensors, actuators and vehicle controllers adapted to control the vehicle; and
an on-board unit (OBU) in communication with the internal subsystem on a first network, and a node on a second network, wherein the first network comprises at least one Ethernet network including a first Ethernet switch coupled to the OBU, wherein the first Ethernet switch is adapted to facilitate communication between the plurality of sensors, actuators and vehicle controllers in the internal subsystem; and the second network comprises a wireless network, wherein the OBU is configured to:
facilitate a Transmission Control Protocol (TCP) connection between a sender and a receiver;
forward data packets from the sender to the receiver;
receive a first acknowledgement packet from the receiver, wherein the first acknowledgement packet contains a first receiver window size;
modify the first acknowledgement packet to a second acknowledgement packet based on a criterion, wherein the modifying the first acknowledgement packet comprises changing the first receiver window size to a second receiver window size; and
forward the second acknowledgement packet to the sender.

* * * * *